United States Patent
Huffman et al.

(10) Patent No.: US 8,671,871 B2
(45) Date of Patent: Mar. 18, 2014

(54) TEMPERATURE-ACTIVATED TIME-TEMPERATURE INDICATOR

(75) Inventors: Brian S. Huffman, Belle Mead, NJ (US); Dawn E. Smith, Martinsville, NJ (US); Carl M. Lentz, Cedar Knolls, NJ (US)

(73) Assignee: Temptime Corporation, Morris Plains, NJ (US)

(*) Notice: Subject to any disclaimer, the term of this patent is extended or adjusted under 35 U.S.C. 154(b) by 327 days.

(21) Appl. No.: 13/238,686

(22) Filed: Sep. 21, 2011

(65) Prior Publication Data

US 2012/0079981 A1    Apr. 5, 2012

Related U.S. Application Data

(60) Provisional application No. 61/470,169, filed on Mar. 31, 2011, provisional application No. 61/387,845, filed on Sep. 29, 2010.

(51) Int. Cl.
*G01K 11/12* (2006.01)
*G01K 3/04* (2006.01)
*G01K 11/06* (2006.01)

(52) U.S. Cl.
USPC ........... 116/216; 116/219; 116/207; 374/106; 374/162

(58) Field of Classification Search
USPC .............. 116/206, 207, 216, 217, 218, 219; 374/106, 160, 162; 252/962
See application file for complete search history.

(56) References Cited

U.S. PATENT DOCUMENTS

| | | | |
|---|---|---|---|
| 3,420,205 A | 1/1969 | Morison | |
| 3,999,946 A | 12/1976 | Patel et al. | |
| 4,189,399 A | 2/1980 | Patel | |
| 4,384,980 A | 5/1983 | Patel | |
| 4,428,321 A | 1/1984 | Arens | |
| 4,788,151 A | 11/1988 | Preziosi et al. | |
| 4,789,637 A | 12/1988 | Preziosi et al. | |
| 4,830,855 A | 5/1989 | Stewart | |
| 5,045,283 A | 9/1991 | Patel | |

(Continued)

FOREIGN PATENT DOCUMENTS

WO    2010/068279    6/2010

OTHER PUBLICATIONS

S.H. Lee et al., Viscosity and Diffusion Constants Calculation of n-Alkanes by Molecular Dynamics Simulations, Bull. Korean Chem. Soc., 2003, vol. 24, No. 11, pp. 1590-1598.

(Continued)

*Primary Examiner* — R. A. Smith
(74) *Attorney, Agent, or Firm* — K&L Gates LLP

(57) ABSTRACT

A temperature-activatable time-temperature indicator that can be used to monitor the historical exposure of a host product to ambient temperatures includes an optically readable, thermally sensitive indicator element. The indicator element can be inactive below a base temperature and is intrinsically thermally responsive at or above an activation temperature which is equal to or greater than the base temperature. The indicator can record cumulative ambient temperature exposure above the activation temperature irreversibly with respect to time. The indicator element can include a synthetic polymeric material, and optionally, a dye. A side-chain crystallizable polymer such as poly(hexadecylmethacrylate), that is solid below the base temperature and is a viscous liquid above the activation temperature can be employed. Intense indicator element colors can be obtained using an appropriate dye or dyes. Various structural configurations of indicator are described and illustrated.

42 Claims, 8 Drawing Sheets

(56) References Cited

U.S. PATENT DOCUMENTS

| | | |
|---|---|---|
| 5,053,339 A | 10/1991 | Patel |
| 5,057,434 A | 10/1991 | Prusik et al. |
| 5,120,349 A | 6/1992 | Stewart et al. |
| 5,156,911 A | 10/1992 | Stewart |
| 5,254,473 A | 10/1993 | Patel |
| 5,368,905 A | 11/1994 | Ohno |
| 5,602,804 A | 2/1997 | Haas |
| 5,667,303 A | 9/1997 | Arens et al. |
| 5,686,153 A * | 11/1997 | Heynderickx et al. ....... 428/1.32 |
| 5,709,472 A | 1/1998 | Prusik et al. |
| 5,783,302 A | 7/1998 | Bitler et al. |
| 5,964,181 A | 10/1999 | Pereyra et al. |
| 5,997,927 A | 12/1999 | Gics |
| 6,042,264 A | 3/2000 | Prusik et al. |
| 6,544,925 B1 | 4/2003 | Prusik et al. |
| 6,614,728 B2 | 9/2003 | Spevacek |
| 6,741,523 B1 | 5/2004 | Bommarito et al. |
| 6,916,116 B2 | 7/2005 | Diekmann et al. |
| 6,924,148 B2 | 8/2005 | Prusik |
| 6,957,623 B2 | 10/2005 | Guisinger et al. |
| 7,019,172 B2 | 3/2006 | Joshi et al. |
| 7,161,023 B2 | 1/2007 | Prusik et al. |
| 7,209,042 B2 | 4/2007 | Martin et al. |
| 7,490,575 B2 | 2/2009 | Taylor et al. |
| 7,517,146 B2 | 4/2009 | Smith et al. |
| 7,682,830 B2 | 3/2010 | Prusik et al. |
| 8,067,483 B2 | 11/2011 | Prusik et al. |
| 8,142,072 B2 | 3/2012 | Kinami |
| 2005/0211153 A1 | 9/2005 | Ribi et al. |
| 2007/0076779 A1 | 4/2007 | Haarer |
| 2008/0269050 A1 | 10/2008 | Azizian et al. |
| 2009/0092519 A1 | 4/2009 | Stewart et al. |
| 2009/0131718 A1 | 5/2009 | Baughman et al. |

OTHER PUBLICATIONS

The International Search Report dated Jan. 18, 2012 for PCT Application No. PCT/US11/53416.

Dow Polyethylene—CARBOWAX PEGs, downloaded on Mar. 9, 2012 from http://www.dow.com/polyglycols/polyethylene/products/carbowaxp.htm and list of products.

* cited by examiner

Dyed Alkane Wax

Dyed Polymer

TEMPERATURE-ACTIVATED TIME-TEMPERATURE INDICATOR

CROSS-REFERENCE TO RELATED APPLICATIONS

This application claims the benefit of provisional patent Application No. 61/470, 169, filed on Mar. 31, 2011 and the benefit of provisional patent Application No. 61/387,845, filed on Sep. 29, 2010. The entire disclosures of each of these two provisional applications are incorporated by reference herein for all purposes.

STATEMENT REGARDING FEDERALLY SPONSORED RESEARCH OR DEVELOPMENT (Not applicable.)

The present invention relates, inter alia, to a time-temperature indicator for providing optically readable indications of the cumulative past exposure of the indicator to ambient temperature conditions. More particularly, but not exclusively, the invention relates to a time-temperature indicator that is useful for monitoring the temperature exposure history of various heat-sensitive host products, for example, heat-sensitive drugs, vaccines, medications, foodstuffs, and other products. The invention also relates to a combination of such a time-temperature indicator with one or more host products with which the time-temperature indicator is associated to monitor the thermal exposure of the one or more host products.

BACKGROUND OF THE INVENTION

Many vaccines, drugs, foodstuffs and other products are temperature-sensitive, or perishable, and can lose quality with time at rates which are influenced by ambient temperatures. Time-temperature indicators are known which can provide a simple visual indication of the cumulative historical exposure of a host product to heat. The visual indication can be used to provide a signal of when a product may have lost quality, or freshness. Such time-temperature indicators can integrate over time historical temperature exposure to various conditions in a predictable, quantitative manner and can be used to monitor the useful shelf life of perishable host products, or for other purposes.

Known time-temperature indicators can provide a color change at a predetermined end point to indicate possible loss of quality, or freshness, of the host product. The color change can be displayed in a suitable label, or the like, to be read optically, for example, visually by a human viewer. The color change can be chromatic or achromatic or provided by another visually detectable optical parameter change. The temperature-response parameters over time of the time-temperature indicator can be correlated with a deterioration characteristic of the host product to coordinate the color change appropriately with the likely condition of the host product.

Some known time-temperature indicators employ diacetylenic monomer compounds that polymerize in response to environmental conditions such as temperature exposure to provide a color change. See, for example, U.S. Patent Application Publication No. 2009/0131718 by Baughman et al., U.S. patent application Ser. No. 12/730,835 by Castillo-Martinez, U.S. Patent Application Publication No. 2008/0004372 by Prusik et al., U.S. Pat. Nos. 4,789,637 and 4,788,151 to Preziosi et al., and U.S. Pat. Nos. 5,254,473; 5,053,339; 5,045,283; 4,189,399; 4,384,980, and 3,999,946 to Patel.

Some other time-temperature indicators employ diffusion technology, for example, U.S. Pat. No. 6,741,523 to Bommarito, et al.; U.S. Patent Application Publication No. 20030053377 and U.S. Pat. No. 6,614,728, both by and to Spevacek, respectively; and U.S. Pat. No. 5,667,303 to Arens.

Also, certain perishable products, for example, vaccines and sensitive medications, as well as some foodstuffs and other products, including some industrial products can have their quality or safety compromised by relatively brief exposures to a temperature in excess of a predetermined threshold. Various proposals are known for monitoring such temperature exposures, including those in U.S. Pat. No. 7,517,146 to Smith et al. ("Smith et al." herein), U.S. Pat. No. 5,709,472 to Prusik et al. ("Prusik '472" herein) and its divisional patent, U.S. Pat. No. 6,042,264.

Such known temperature exposure indicators generally appear to be satisfactory for their intended purposes. However, for some purposes there is a need for a time-temperature indicator that has new properties.

BRIEF SUMMARY OF THE INVENTION

Some time-temperature indicators, or their active elements, require special storage conditions before use, for example, deep freeze storage at a temperature significantly below the temperature to be monitored. Other time-temperature indicators require external intervention for activation, for example, removal of an activation member such as a protective strip. Further time-temperature indicators have limited abilities to monitor cumulative time-temperature exposure over a range of temperatures, quantitatively, and with reasonable accuracy. In some situations, these requirements can be drawbacks to the commercial deployment of known time-temperature indicators.

To overcome one or more of these drawbacks, the present invention generally provides a temperature-activatable time-temperature indicator intended to be associated with a host product to monitor the historical exposure of the host product to ambient temperatures.

The time-temperature indicator includes an optically readable, thermally sensitive indicator element. The indicator element can be inactive below a base temperature and can be thermally responsive at or above an activation temperature. Once activated, the time-temperature indicator can record irreversibly, with respect to time, cumulative ambient temperature exposure above the activation temperature. The activation temperature can be equal to or greater than the base temperature.

Embodiments of time-temperature indicator according to the invention, being temperature-activated, or temperature-activatable, are effectively self-activating. Generally, such time-temperature indicators require no user or other intervention to initiate recording of cumulative ambient temperature exposure. Instead, when ambient temperature conditions raise the temperature of the indicator element above the activation temperature, the indicator element automatically can begin to respond to the temperature exposure and to record cumulative temperature exposure.

The indicator element can include an optically detectable indicator material. The thermal response of the indicator element to temperature can be an optically readable geometric displacement of the indicator material or another suitable thermal response that provides an irreversible record of ambient temperature exposure. The geometric displacement can correlate with the cumulative ambient temperature exposure of the time-temperature indicator above the activation temperature, optionally with a quantitative relationship.

Some useful indicator materials can provide a geometric displacement in response to temperatures above the activation temperature that is progressive, measurable and consistent during a time period of interest.

Suitable indicator materials include synthetic polymeric materials which are solid below the base temperature and are, or can become, a viscous liquid when at or above the activation temperature. Such synthetic polymeric materials are melt able. Useful synthetic polymers can also be hydrophobic, if desired. Dyes can be dissolved in such hydrophobic polymers to provide an intense color. An intense color can help provide a strong end point signal with good contrast between an end point condition and a prior condition of the indicator. A time-temperature indicator embodiment of the invention employing such an indicator material can provide a useful alerting signal or warning signal.

The indicator element can include a transport member, and the indicator material can be supported by the transport member. In such embodiments of the invention, the indicator response can be a displacement of the indicator material with respect to the transport member, although other arrangements are also possible.

If desired, the transport member can extend to an optical reading location, for example, a viewing window. The displacement of the indicator material can be a displacement along the transport member toward the optical reading location for optical detection of the indicator material at the optical reading location. The degree of indicator material displacement can relate to the cumulative temperature over time of the indicator material above the activation temperature. Other indicator material displacements are also possible, some of which are described herein.

The indicator material can have temperature-related viscosity characteristics providing appropriate rates of displacement of the indicator material at temperatures of interest above the activation temperature. For example, the viscosity of the indicator material, above the activation temperature, can decline with increasing temperature.

In some embodiments of the invention, a relatively high proportion of a strongly colored dye can be dissolved in the synthetic polymeric material to give the indicator material an intense color that contrasts well with a light transport member, for example, a white absorbent paper or the like. If desired, a suitable synthetic polymeric material having side chain crystallinity can be selected to provide a viscosity giving the indicator material an appropriate rate of displacement at a temperature of interest above the activation temperature.

In another aspect, the invention provides a temperature-activatable time-temperature indicator intended to be associated with a host product to monitor the historical exposure of the host product to ambient temperatures. The time-temperature indicator includes an optically readable, thermally sensitive indicator element, which indicator element is inactive below a base temperature and is thermally responsive at or above an activation temperature. The indicator element can include an optically detectable indicator material which is in a solid state at or below the base temperature and is in a liquid state and is viscous at or above the activation temperature and a light-colored transport member supporting the indicator material.

Furthermore, in this aspect of the invention, the indicator material can include a synthetic polymeric material having side chain crystallinity and a dye dissolved in the synthetic polymeric material. The dye can color the synthetic polymeric material so that the synthetic polymeric material contrasts optically with the transport member. The indicator response includes displacement of the indicator material with respect to the transport member.

In a further aspect, the invention provides a temperature-activatable time-temperature indicator for monitoring past exposure of a host product to ambient temperatures, which includes an optically readable, thermally sensitive indicator element that is inactive below a base temperature and is thermally responsive at or above an activation temperature. The indicator can record irreversibly with respect to time cumulative ambient temperature exposure above the activation temperature. The activation temperature can be equal to or greater than the base temperature. In this further aspect, the indicator element can comprise a side-chain crystallizable polymer having a melting temperature equal to or greater than the activation temperature of the time-temperature indicator. Liquid-flow related movement of the molten polymer can be optically read.

The indicator material employed in this aspect of the invention can have a weight average molecular weight of at least about 1,000 Da. In addition, or as an alternative, the indicator material can have a particular viscosity at temperatures within a few degrees above the melting point of the indicator material, as is further described herein and/or can have particular melt flow rate, as is also described herein. Further, the indicator material can have a temperature-viscosity profile useful for monitoring and/or recording a particular cumulative time-temperature exposure.

A time-temperature indicator according to the invention can include a substrate supporting the indicator element. The time-temperature indicator can be configured as a label, a flexible label, a tag, a package insert, or a package component.

Embodiments of activatable time-temperature indicators of the invention can be associated with a host product that the time-temperature indicator is intended to monitor for ambient temperature exposure, for example, by attachment to or association with the host product, or with packaging for the host product. Certain embodiments include a time-temperature indicator attached to or associated with a host product or its packaging.

Embodiments of time-temperature indicator according to the invention include time-temperature indicators that do not generally require special storage conditions, or external activation. Some time-temperature indicator embodiments of the invention can monitor cumulative time-temperature exposure over an extended time period and/or a wide temperature range, quantitatively, and with reasonable accuracy and reasonable consistency, with little variation from one time-temperature indicator unit to the next. Further, the invention includes embodiments that are useful for monitoring and/or recording heat exposures of several degree-days, or more, for example heat exposures above a threshold temperature in the vicinity of room temperature (about 20° C. to 25° C.), and that can be stored, for future use, under ordinary refrigerated conditions.

BRIEF DESCRIPTION OF THE SEVERAL VIEWS OF THE DRAWING

Some embodiments of the invention, and ways of making and of using one or more embodiments of the invention, are described in detail herein and by way of example, with reference to the several views of the accompanying drawing (which are not necessarily drawn to scale with regard to any internal or external structures shown) and in which like reference characters designate like elements throughout the several views, and in which.

DETAILED DESCRIPTION OF THE INVENTION

Figure 1:
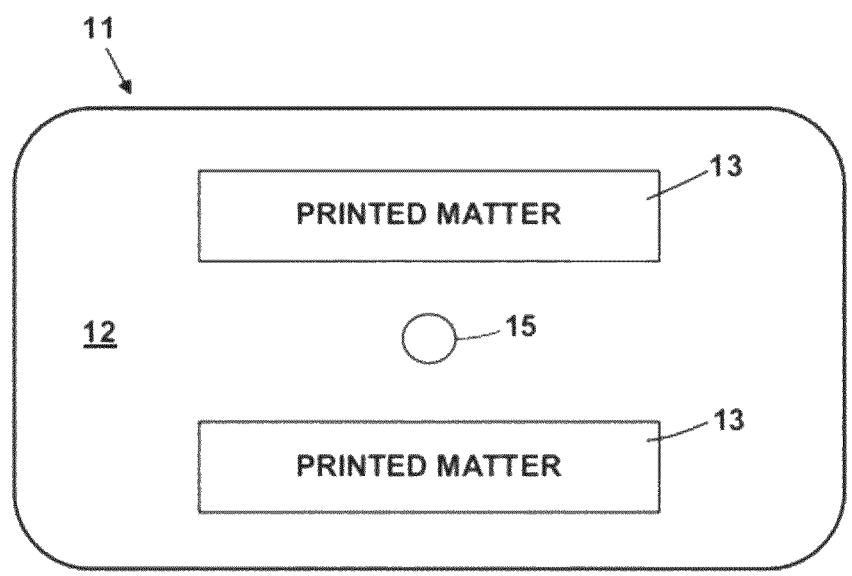
FIG. 1 is a plan view of one embodiment of a temperature-activatable time-temperature indicator according to the invention.

Time-temperature indicators using diacetylenic compounds as active indicator agents have long been employed to monitor heat-sensitive products such as vaccines for adverse temperature exposure. Often, heat-sensitive products are sensitive to cumulative temperature exposure, losing freshness, potency, or some other quality at the end of a relatively short period of exposure to a higher temperature, or at the end of a longer period of exposure to a lower temperature. Certain diacetylenic compounds can behave as monomers that undergo a solid-state polymerization reaction and change color in a predictable and irreversible manner in response to thermal stimuli. Such diacetylenic monomers can be useful active indicator components of time-temperature indicators.

Time-temperature indicators employing a diacetylenic monomer as an active indicator agent can integrate temperature exposure over time in a predictable, quantitative manner and can be used to monitor the useful shelf life of perishable, heat-sensitive host products. Such indicators can provide an optically readable signal, for example, a color change, at a predetermined end point to indicate possible loss of freshness of the host product, or loss of another host product quality characteristic.

To provide a meaningful end point signal, the active indicator agent temperature response characteristics, or temperature-related response algorithm, desirably can be configured to correspond reasonably closely with the temperature response characteristics of the host product. Such configuration can be effected, for example, by selection of an appropriate indicator agent according to its chemistry and, in some cases by physical or chemical manipulation of the indicator agent, or both.

As used herein, the term "end point" refers to the point at which an indicator exhibits an externally detectable, unmistakable optical change, for example, a change in color from white to red. The display of an end point can constitute an indicator signal. The end point can be defined in terms of an optical density change, if desired. For example, the end point can be the point at which the optical density of an optically active area of the temperature-activatable time-temperature indicator displays an increase, or decrease, in optical density of a specified number of optical density points, as optical density points are defined in U.S. Patent Application Publication No. 2008/0004372 (application Ser. No. 11/427,589) to Prusik et al. The specified number can be 10 points, 20 points, 30 points, 40 points, or 50 points, or another suitable value.

Under some ambient temperature conditions, an end point can develop slowly over a period of days or weeks that can cause uncertainty as to the condition indicated, as indicator material flows into an optical reading location, for example, a viewing window. If the material flow is relatively slow, some time may elapse from the time when the indicator material first appears at the optical reading location to the time when a clear end point is displayed, for example, by the indicator material filling the viewing window. The invention includes configurations of time-temperature indicators wherein the transition from first appearance of an indicator material to a clear end point can occur rapidly, possibly within a few hours, for example, within about 1 hr, about 3 hr, about 6 hr, about 12 hr or about 24 hr, notwithstanding that the indicator material flow rate is relatively slow. Sharp end points, which occur quickly, are sometimes desirable.

Diacetylenic monomers useful in time-temperature indicators are often inactive in solution but active in the solid state, for example, after an indicator ink containing a diacetylenic monomer has been printed onto an indicator label or other indicator substrate. When the indicator ink has dried on the label or substrate, the diacetylenic monomer can begin to polymerize in response to ambient temperatures or other ambient conditions. To avoid premature display of an end point condition, time-temperature indicator labels containing such diacetylenic monomers, can be stored at low temperatures, for example, −30° C., prior to being associated with a host product. Similar considerations can apply to other configurations of time-temperature indicators that include a polymerizable diacetylenic monomer.

For some time-temperature indicator applications, avoidance of a need for cold storage of indicator labels prior to use would be desirable. For this and other reasons, time-temperature indicators which can be activated when associated with a host product also have been proposed. Some activatable time-temperature indicators require intervention to remove a separator between two indicator components, thereby enabling contact between the two indicator components to initiate an indicator reaction. Other indicator activation techniques are known that also require intervention to effect activation. Such interventionist activation techniques can be inconvenient and can be unreliable.

Moreover, some otherwise temperature-sensitive host products are relatively insensitive to heat at moderate temperatures at which useful indicator agents such as diacetylenic monomers are responsive. In such circumstances, a time-temperature indicator that responds to the moderate temperature could record inappropriate temperature exposures and become inaccurate for such a host product.

A temperature-activatable, or self-activatable, time-temperature indicator could be useful for any or all of these purposes. Some useful temperature-activatable time-temperature indicator embodiments of the invention have an ability to respond effectively to relatively large cumulative time-temperature exposures above an activation temperature, for example, a temperature exposure of 1.5 degree-days or more, referring to a degree Celsius.

As used herein, "cumulative time-temperature" refers to the integral of temperature variation with respect to time, unless the context indicates otherwise. The varying temperature can be a temperature above a fixed temperature, if desired. The fixed temperature can be an arbitrary temperature or can be a specific temperature, for example, the activation temperature of a time-temperature indicator embodiment of the invention. Thus, "cumulative time-temperature" refers to an accumulation, or sum, of temperature variations over time, in integrated form, as a single value. The integral can be determined as the area under a graph of temperature variation with respect to time, or in another suitable manner, as will be known or apparent to a person of ordinary skill in the art, in light of this disclosure.

As used herein, "ambient temperature" refers to the temperature to which a time-temperature indicator is exposed, unless the context indicates otherwise. An ambient temperature can be an environmental temperature prevailing in a storage room, in a warehouse, in a retail store, an outdoor location, a transport vehicle, or any other location in which the time-temperature indicator is situated.

The particular ambient temperatures that a time-temperature indicator experiences after association with a host product sometimes can be unforeseeable and/or unpredictable. Unforeseeable or unpredictable temperature spikes can occur as a result of a product or package being exposed carelessly to hot sun, a heating system, heat from a vehicle engine, or the like. The ambient temperatures can be largely or entirely beyond the control of individuals associated with the production and supply of the time-temperature indicators. In most cases, the time-temperature indicators are not intended to monitor and/or record elevated ambient temperature exposure occurring before the time-temperature indicator is associated with a host product.

Depending upon the ambient temperatures and packaging, a temperature-sensitive commercial host product can lose quality during the course of ordinary distribution and handling, if the cumulative time-temperature exposure is excessive for that host product. Thus, the temperature exposures to be monitored can depend upon the characteristics of a particular host product. For some host products, lower ambient temperatures can have relatively small effects that can be ignored.

Some time-temperature indicator embodiments of the invention can monitor, and/or be configured to monitor, ambient temperature exposures in a range of from about −10° C. to about 60° C., with the possibility of higher temperature exposures occurring. In some embodiments, ambient temperatures exposures in a range of from about 5° C. or about 10° C. up to about 50° C., with the possibility of higher temperature exposures occurring. Temperatures up to about 40° C. can be encountered in the ordinary course of mass distribution of commercial products in hot climatic conditions, and even higher temperatures can be encountered in some circumstances.

Some host products can deteriorate if exposed to an unduly low temperature, for example, a temperature below freezing. A freeze indicator can be employed to monitor exposure to freezing events, for example, a freeze indicator such as described and claimed in one of U.S. Pat. Nos. 7,343,872 and 7,571,695, or one of U.S. Patent Application Publication Nos. 2008/0257251 and 2010/0162941. If desired, a time-temperature indicator of the present invention can be combined with a freeze indicator and/or another useful indicator, for example, as described and claimed in U.S. Pat. No. 7,490,575 or U.S. Patent Application Publication No. US 2010/0024714.

Furthermore, a self-activated time-temperature indicator that is small and has an indicator element, which provides a good optical signal contrasting with a surrounding or adjacent background can be useful for some purposes.

Accordingly, as previously described herein, the invention provides, inter alia, a temperature-activatable time-temperature indicator which employs an optically readable, thermally sensitive indicator element that can be inactive below a base temperature and can be thermally responsive at or above an activation temperature. The activation temperature can be equal to, or higher than, the base temperature. The indicator element can include an optically detectable indicator material The time-temperature indicator can have an optical reading direction for a viewer or an optical device to read the state of the time-temperature indicator. The state of the time-temperature indicator can be read by detecting a geometric displacement of the indicator material that occurs in response to exposure to a temperature at or above the activation temperature. The geometric displacement can be predictable and/or measurable. The geometric displacement can relate quantitatively to the cumulative temperature exposure above a threshold temperature, for example, the activation temperature, or another suitable temperature. In some embodiments of the invention, multiple geometric displacements of the indicator material of a particular time-temperature indicator that occur at different times as a result of continuing or continual exposure to a temperature or temperatures, above the activation temperature, can be read optically.

The geometric displacement can be a flow of liquid indicator material induced by melting of the indicator material in response temperature change. The geometric displacement can take any desired geometric form that provides a spatial displacement of some or all of the indicator material that can be read or observed by an optical reading device or a human viewer and detected as a displacement indicative of a change of state of the time-temperature indicator. For example, the geometric displacement can be a flow of liquid indicator material. The flow of liquid indicator material can be linear or two-dimensional. The flow can be transverse to the optical reading direction or opposite to the optical reading direction or can proceed in multiple directions. Alternatively, the flow can spread out across an area from a source. For example, the flow can be along an elongated transport member that supports the indicator material. Alternatively the flow can be through a porous material and can occupy a volume presenting a viewing area transverse to the direction of flow.

The time-temperature indicator can include a reservoir of the indicator material. The time-temperature indicator can include a mask to conceal the reservoir of the indicator material and can prevent the indicator material from being read or viewed in the optical reading direction. The mask can be provided by an opaque layer or region of the time-temperature indicator covering the reservoir in a viewing direction. In some embodiments of the invention, no mask is present. A transport member can extend away from the reservoir. Optionally, the time-temperature indicator can include a scale to demark progress of the indicator material with respect to the transport member.

The indicator material can be, or can include, a synthetic polymeric material. The synthetic polymeric material can be solid when at or below the base temperature and can be a viscous liquid when at or above the activation temperature. The viscous liquid can have any of a wide range of viscosities.

As used herein, the term "polymer", and its linguistic variations, refer to copolymers, and higher order polymers, as well as homopolymers, unless the context indicates otherwise, for example, by describing or referencing one or more specific homopolymers.

When solid, the synthetic polymeric material can be crystalline or partially crystalline. Crystalline or partially crystalline synthetic polymeric materials can have desirably sharp transitions from a solid state to a liquid state. When in the liquid state, the synthetic polymeric material can transport itself in contact with, on, or through a transport member. Transport of the liquid synthetic polymeric material can be effected by material flow, or in another suitable manner. The transport member can be configured to enable self-transport, or self-flow, of the liquid synthetic polymeric material, for example, by being porous, or wettable by the synthetic polymeric material, or both.

Figure 2:
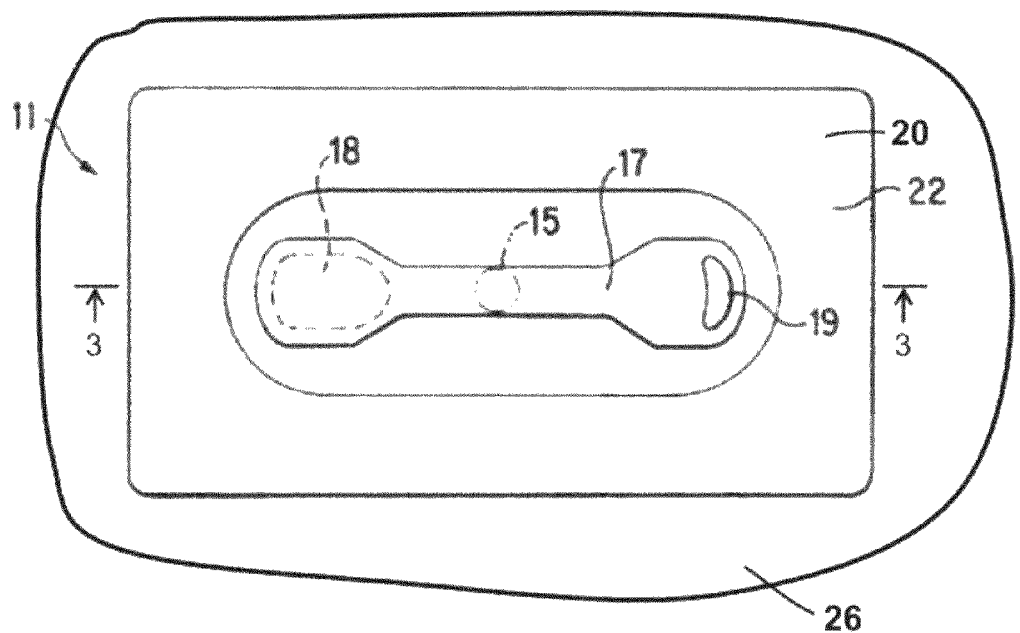
FIG. 2 is a further plan view of the time-temperature indicator shown in FIG. 1 with an upper layer of the time-temperature indicator removed, wherein the time-temperature indicator is shown attached to a host product after removal of a protective liner.
Figure 3:
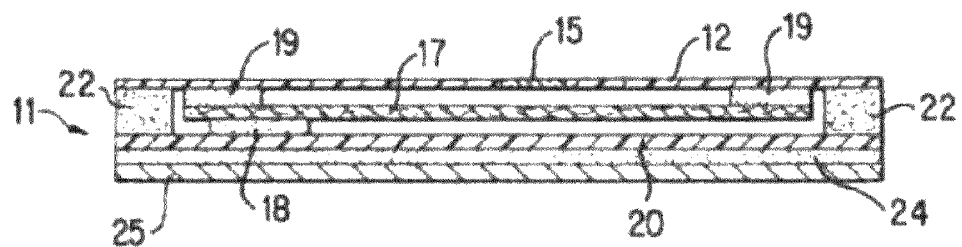
FIG. 3 is a sectional view on the line 3-3 of FIG. 2.

An example of one possible construction of a temperature-activatable time-temperature indicator embodiment of the invention is shown in FIGS. 1-3 of the accompanying drawings. Other possible constructions will be known or apparent to a person of ordinary skill in the art, in light of this disclosure, or will become known or apparent in the future, as the art develops.

Referring now to FIGS. 1-3 of the drawings, the illustrated temperature-activatable time-temperature indicator, referenced 11, is configured as a thin label suitable for application to a host product, or a host product package or container. Time-temperature indicator 11 includes an upper layer 12 which can be clear or opaque. Upper layer 12 can be, for example, an imprintable sheet or film of plastic material on which is applied printed information, referenced as 13, for example, directions for use of time-temperature indicator 11. Other time-temperature indicator embodiments of the invention can be configured without such an upper layer, if desired.

As used herein, "upper", "upward", "beneath" and similar directional terms are used for convenience to the orientation of a time-temperature indicator as shown in the drawings. A person of ordinary skill in the art will understand that a time-temperature indicator can have any desired orientation in practice and may move through a variety of different of orientations during its life. In general, unless the context indicates otherwise, "upper" and "upward" can refer to a direction toward a notional viewer or optical reading device, and opposite to the optical reading, or viewing, direction.

As shown, time-temperature indicator 11 has a generally rectangular shape, with rounded corners. As will be understood, time-temperature indicator 11 can have other suitable shapes, for example, circular, oval, angular, square, triangular, polygonal, hexagonal and strip-like.

Upper layer 12 has a window 15 overlooking a wick member 17 at an intermediate location along the length of wick member 17, or at another location, if desired, for example, at one end of wick member 17. Wick member 17 is an example of an indicator transport member that can be employed in some time-temperature indicator embodiments of the invention. Window 15 can function as a viewing port for optically reading or displaying the indicator signal generated by time-temperature indicator 11, in an optical reading direction which can be generally downward, or at a downward angle, as viewed in FIG. 3 toward upper layer 12.

As shown in FIGS. 2 and 3, upper layer 12 can have any desired structure and configuration. For example, upper layer 12 can be a sheet or film of a flexible, imprintable plastic material. Suitable materials for upper layer 12 include polyethylene, polypropylene, a polycarbonate, a polyester, a polyamide, a polyurethane, a polyvinyl chloride, a cellulosic, a cellophane, and other plastic materials. If desired, upper layer 12 can be a laminate of two or more materials, for example a lidding film. To facilitate attachment of upper layer 12 to other components of time-temperature indicator 11, upper layer 12 can be formed of a material suitable for heat-sealing to bottom layer 20, if desired. Optionally, upper layer 12 can bear a heat-sensitive coating on its underside to facilitate heat sealing. Also, upper layer 12 can be untreated, or can be treated on one or both surfaces to increase printability, if desired.

Time-temperature indicator 11 generates an indicator signal from an indicator element which includes wicking member 17 and an indicator material. The indicator material can be solid and unresponsive when below a base temperature and liquid at or above an activation temperature, the activation temperature being above the base temperature. When in a liquid state, the indicator material can advance along wicking member 17 which functions as a transport member for the fluid indicator material.

In practicing the invention, the indicator material can have a viscosity which is temperature related in a suitable manner so that the displacement or transport, of the indicator material along a transport member such as wicking member 17 relates to a desired integral of temperature over time in the liquid state. The relationship can be quantitative and predictable, and, optionally, can be measurable and/or quantitatively demarked on the time-temperature indicator, for example, by a scale. For example, the indicator material viscosity can have a simple mathematical relationship to temperature. As already stated, the viscosity of the indicator material can decline with increasing temperature.

The relationship of the viscosity of the indicator material to temperature, in a temperature range of interest, can provide a smooth curve when plotted as a graph, which curve, desirably, is free of inflexions and discontinuities. The temperature range of interest can be from the melting point of the indicator material to an arbitrary maximum temperature, which can be the highest temperature the time-temperature indicator is likely to encounter in normal use, for example, about 50° C. or about 60° C., or another suitable temperature.

The indicator material can have a temperature-related viscosity profile, or algorithm, which provides a rate of transport at a temperature, or within a temperature range, which is useful for monitoring the intended host product. The rate of transport can vary with temperature.

For example, the indicator material can have temperature-related viscosity characteristics that yield a rate of transport at a temperature of interest, or a temperature range of interest, that is such as to provide a conveniently detectable displacement of the indicator material at the end of a particular cumulative exposure at the temperature of interest, or in the temperature range of interest. The cumulative temperature exposure can be such as to be sufficient to induce a change in the host product that is to be monitored, for example, a loss of quality. The temperature range can be a range in which the host product can suffer a loss of quality, or other deleterious effects, in ordinary commercial circumstances, for example, the distribution, of a host product from a supplier to end users. The commercial circumstances can sometimes include conditions of storage by the end users prior to consumption or use of the host product.

The indicator material can have a viscosity, or viscosity profile, at a particular temperature, or a temperature range, that provides a rate of transport of the indicator material that is convenient for detection over a time period relevant to the host product, for example, an hour, a day, a week, a month, or more. The time period can relate to the time from the manufacture of the host product to its end use, including a possible storage period, or periods, during distribution, or can be determined in another suitable manner.

As illustrated in FIGS. 2 and 3 wick member 17 has a "dogbone", or dumbbell, shape and is secured beneath upper layer 12 in the optical reading direction. Wick member 17 can have any suitable configuration which provides a flow path, or flow paths, for the indicator material. For example, wick member can have an elongated shape, as shown, or an arcuate shape, or a ring-like shape, or can be configured as a longitudinal strip. Wick member 17 can be affixed to the underside of upper layer 12 in any suitable manner, for example, by adhesive contact areas 19 (only the righthand one of which is shown in FIG. 2) located at the extremities of wick member 17. Alternatively, wick member 17 can be secured or located in time-temperature indicator 11 by attachment to, or contact with, other structure.

As shown in FIGS. 2 and 3, a reservoir 18 of initially solid indicator material is located in contact with wick member 17 at the lefthand end of wick member 17, as viewed in FIGS. 2 and 3. Alternatively, reservoir 18 can be disposed at another suitable location. Reservoir 18 can be, for example, a bead-like mass of solid indicator material deposited on wick member 17 in contact with the wick material. Other configurations of wick member 17 and dispositions of one or more reservoirs 18 are possible, some of which are described herein. However, reservoir 18 need not be in physical contact with wick member 17 provided that the indicator material can contact wick member 17 when liquid. For example, reservoir 18 can constitute a solid mass of indicator material that deforms, drips or drops to contact wick member 17, when the indicator material melts, if desired.

Wick member 17 is constructed to permit travel, or geometric displacement, of liquid indicator material along wick member 17 toward window 15 for optical detection of the indicator material at window 15, or in optical alignment with window 15. For example, wick member 17, can be formed of a porous and absorbent material, such as filter paper, that permits the indicator material, when liquid, to permeate along wick member 17.

Suitable wick member materials include: various opaque or transparent papers, such as different grades of filter paper, including fine-pored and coarse-pored papers, non-woven fibrous materials formed of natural or synthetic fibers; pulverized filter paper; fine silica gel; porous films containing polytetrafluoroethylene resin or silica gel; TESLIN® microporous synthetic sheet (PPG Industries, Pittsburgh, Pa.); non-woven, spun bonded materials, including non-woven, spun-bonded high-density-polyethylene, polypropylene, and polyester; other non-woven, spun-bonded synthetic polymers; and non-woven, spun-bonded blends of any two or more such polymers.

Any suitable spacing can be employed between reservoir 18 and window 15, for example, a spacing of from about 1 mm to about 50 mm, or from about 3 mm to about 25 mm, or from about 5 mm to about 15 mm. Such spacings are illustrative of spacings that can be provided in time-temperature indicator embodiments of the invention between a reservoir of indicator material and an optical reading location, for example, window 15. The spacing can constitute a distance to be traveled by indicator material to provide an indicator signal. The spacing can be determined based on various parameters, for example, the rate of travel of the indicator material, the time-temperature response profile of the host product, the expected ambient temperature conditions, and the like.

In time-temperature indicator embodiments of the invention, the time for indicator material to permeate from a reservoir such as reservoir 18 to a window such as window 15 can relate to the viscosity of the indicator material when liquid. The permeation time can also relate to the cumulative ambient exposure of the indicator material to temperatures above the melting point of the indicator material.

As already noted, some other possible arrangements for configuring the indicator material with a transport member include providing a plurality of reservoirs 18 each including solid indicator material. For example, a reservoir 18 can be provided at each end of wick member 17, equi-distant from window 15. Such a configuration of two or more reservoirs can supply liquid indicator material in two flows to arrive nearly simultaneously at a viewing window such as window 15, filling the window more quickly than would a single flow. Such an indicator can have a sharper end point wherein the time from commencement of an indicator signal when indicator material first appears at the viewing window, to display of a complete or full signal, when the viewing window is filled with indicator material, is shorter.

As shown in FIGS. 1 and 2, when read together, to facilitate reading of a clear indicator signal in window 15, by concealing unnecessary information, upper layer 12 can be opaque in a region extending over reservoir 18, or over reservoir 18 and the portion of wick member 17 along which the indicator material travels to reach window 15, if desired. The entire extent of upper layer 12, can be opaque, if desired, with the exception of window 15.

The clarity of the indicator signal can be enhanced by employing optically contrasting materials for wick member 17 and the indicator material. For example, wick member 17 can be white, or another light color, and the indicator material can be a dark or an intense color, for example black, red or blue. Any other suitable color combinations can be employed, if desired. For example, the wick member can be dark colored and the indicator material can be light. However, an indicator signal which changes from light to dark may be more readily understood as an alert to a possible loss of quality. One or more background components optically contrasting with the indicator material can be provided at the viewing location, if desired.

As an alternative to a reflective optical signal, as is described elsewhere herein, the indicator material can generate another kind of optical signal, for example, a polarizing, fluorescent or holographic signal, or the like.

Again referring to FIGS. 2 and 3 time-temperature indicator 11 also includes a bottom layer 20 which, in various embodiments, can be a sheet or film formed of a plastics material, for example one of the materials described for upper layer 12. Bottom layer 20 can be formed of the same material as upper layer 12 or of a different material or materials. Bottom layer 20 can be opaque, if desired, to conceal the inner components of the indicator device. Bottom layer 20 can be sealed to the upper layer 12 in a suitable pattern that surrounds wick member 17 and indicator material 18. For example, bottom layer 20 can be adhered to upper layer 12 with adhesive or by heat sealing to form a perimeter seal extending around wick member 17 and indicator material 18. If desired, bottom layer 20 can form a pouch sealingly enclosing the operational elements of the indicator device.

As shown in FIG. 3, the outer surface of bottom layer 20 can be coated with an adhesive layer 24 of pressure-sensitive adhesive, or other suitable adhesive, to permit attachment of time-temperature indicator 11 to a host product or a host product container or associated package or the like (none of which are shown). A removable release liner 25 can cover and protect adhesive layer 24 prior to attachment of time-temperature indicator 11 to a host product, or an associated package or the like.

FIG. 2 shows time-temperature indicator 11 adhered to an outer surface of a host product 26 by means of adhesive layer 24 (not visible in FIG. 2), after removal of release liner 25 (also not visible in FIG. 2). Structure 26 can alternatively indicate a package containing a host product.

In other respects the construction of time-temperature indicator 11 can be similar to, and/or include various design features of the indicators shown and/or described in Prusik '472, if desired. Also, embodiments of time-temperature indicator according to the invention can include structure to resist color fading and/or other features described in Smith et al. For example, any one or more of upper layer 12, printed matter 13, window 15, wick member 17, reservoir 18, adhesive areas 19, and bottom layer 20 can be constructed as described at column 5, line 51 to column 9, line 7 of Smith et al., if desired.

The indicator element can have a thermal response algorithm that relates quantitatively to a time-temperature quality characteristic of the intended host product. The thermal response algorithm can be determined, and/or is defined, by the response of the indicator material to the temperature conditions it encounters when in the liquid state. Various embodiments of the invention include a host product and a time-temperature indicator according to the invention, such as time-temperature indicator 11, which is associated with the host product and which has a time-related thermal response algorithm that is related to the time-temperature quality characteristic of the host product.

One use of the time-temperature indicator 11 shown in the drawings will now be described, for illustrative purposes. The exemplary embodiment of time-temperature indicator 11 employs a white wick member 17, and a red-dyed indicator material, wherein the indicator material has a base temperature of 20° C. and an activation temperature of 30° C. These parameters are intended to be merely illustrative and indicator materials with other colors and other temperature characteristics can be employed pursuant to this description.

While the ambient temperature of the time-temperature indicator remains below the base temperature of the indicator material, the indicator material remains solid and does not travel along wick member 17. Transparent window 15, which provides a view of wick member 17, accordingly has a white appearance provided by white wick member 17. The appearance can be determined visually, or by a camera, or in another suitable manner, by optically reading wick member 17 through viewing window 15 in the optical reading direction.

At ambient temperatures above the activation temperature, the indicator material becomes a viscous liquid that migrates along wick member 17 and quantitatively can record cumulative time-temperature exposure above the activation temperature. Thus, when experiencing a temperature above the activation temperature, the time-temperature indicator self activates because the indicator material becomes a flowable viscous liquid that begins to migrate.

Depending upon the indicator material employed, at intermediate temperatures between the base temperature and the activation temperature, in some embodiments, the indicator material can advance slowly along wick member 17. The rate, or rates, of advance at intermediate temperatures can be slower than at temperatures at or above the activation temperature. For example, the advance at intermediate temperatures can be so slow as to be immaterial to the monitoring of temperature exposure above the activation temperature. Alternatively, the advance at intermediate temperatures can be useful for monitoring a host product parameter that is subject to slow change at intermediate temperatures, and to more rapid change at higher temperatures above the activation temperature.

The liquid indicator material has a viscosity which determines the rate of transport of the indicator material along wick member 17. The rate of transport of liquid indicator material on a wick member also can be referred to as the "wicking rate". The viscosity can vary with temperature. For example, the viscosity can decrease with temperature so that at higher temperatures the indicator material moves more quickly with respect to wick member 17, or another suitable transport member. At lower temperatures, the viscosity is higher, and the indicator material moves more slowly. Thus, the indicator material displacement can be indicative of the duration of the exposure to different temperatures and the indication is cumulative because the indicator material cannot retreat. If the ambient temperature falls below the melting temperature of the indicator material, the indicator material solidifies, remaining stationary, until the temperature rises again.

The temperature-related viscosity profile of the indicator material can determine the total displacement, or degree of advance, of the indicator material with respect to wick member 17, or another suitable transport member, under a given pattern of time-related temperature conditions. Time-temperature indicator embodiments of the invention can employ indicator materials having a temperature-related viscosity profile that provides a predictable displacement in response to a desired cumulative temperature exposure over time. The viscosity of the indicator material, and the distance traveled by the indicator material with respect to the transport member can vary with temperature, in a consistent manner, to provide a quantitative record of cumulative time-temperature exposure, according to the nature of the indicator material employed.

The liquid indicator material can advance a fixed distance in response to a particular cumulative time-temperature exposure above the activation temperature of time-temperature indicator 11. The fixed distance can be the distance from reservoir 18 to window 15, a particular distance along a graduated displacement scale (not shown) that can be marked on time-temperature indicator 11, or another fixed distance.

The particular cumulative time-temperature exposure value for which a time-temperature indicator embodiment can be calibrated, or otherwise provided, can be determined by the heat-response characteristics of the host product. The time-temperature indicator can signal when the exposure value has been reached as a result of ambient conditions experienced by the time-temperature indicator. The ambient conditions can be unpredictable and can comprise a longer period at a steady temperature slightly above the activation temperature, a shorter period at a higher temperature, or various periods at different temperatures at or above the activation temperature. The indicator material can advance to provide a particular displacement indicative of the sum over time of the ambient temperature conditions to which the time-temperature indicator and the indicator material are exposed.

The indicator material can be selected in accordance with the temperature-response properties of a host product to be monitored, so that indicator material can fill window 15 substantially or completely following a cumulative time-temperature exposure likely to cause a loss of host product quality.

Ambient temperatures above the activation temperature cause the indicator material to continue to migrate along wick member 17 until it reaches window 15, changing the appearance of window 15 from white to red, and signaling that an end point has been reached. At a temperature just above the activation temperature, the indicator material can move relatively slowly and at higher temperatures the indicator material can move more rapidly as the viscosity of the indicator material declines with increasing temperature. Thus, the displacement of the molten indicator material along wick member 17 from reservoir 18 to window 15 can be a measure of the cumulative temperature exposure above the activation temperature over time. The appearance change of window 15 from white to red can indicate that the historical temperature conditions experienced by a host product with which the indicator is associated may have impaired the quality of the host product.

Once the appearance of wick member 17 at window 15 has changed, cooling of time-temperature indicator 11 below the activation temperature or the base temperature does not reverse the appearance change. The exemplary indicator cannot change back from red to white. Rather, cooling causes the indicator material to solidify in place, for example, spread out along wick member 17, "locking in" the historical record of temperature exposure. If wick member 17 is porous, the indicator material can be impregnated into the pores in an effectively permanent manner.

If the temperature of the indicator material drops below the activation temperature before the indicator material progresses to the viewing window, the indicator material can solidify and cease to flow along the wick member 17 or other transport member. If the ambient temperature then returns to a level above the activation temperature, the indicator material again can melt and continue to advance along wick member 17 or other transport member, recording the new time-related exposure to an elevated temperature or temperatures. In this way, the time-temperature indicator can monitor fluctuations in ambient temperature and record cumulative time-temperature exposure.

Predictable time- and temperature-related flow of the indicator material along a transport member such as constituted by wick member 17 can be obtained by employing an appropriate indicator material Useful indicator materials can have various physical and/or chemical characteristics such as a polymeric structure and/or certain molecular weight and/or certain viscosity characteristics. In contrast, some small-molecule materials, for example, alkanes can exhibit unpredictable melt flow on a wick member such that displacement cannot be reliably correlated with some cumulative temperature exposures to be monitored, in a quantitative manner.

Many variations of the structure of a time-temperature indicator embodiment of the invention are possible, only some of which are described herein. For example, a transport member, if employed, can have an arcuate configuration, a convoluted configuration, or another shape. Two, or more than two, indicator material reservoirs can be employed, for example, three or four indicator material reservoirs. Furthermore, multiple indicator material reservoirs, if employed, can supply the indicator material, when liquid, to a single optical reading location. For this, or other purposes, the transport member, or transport members can provide multiple pathways along which the indicator material can advance, for example, multiple pathways along the radii of a circle, or of a ring, or polygon, extending towards a viewing location at the center of the circle, or of the ring or the like. Such embodiments can provide a sharp end point at the viewing location as multiple indicator flows converge and fill the window.

Figure 4:
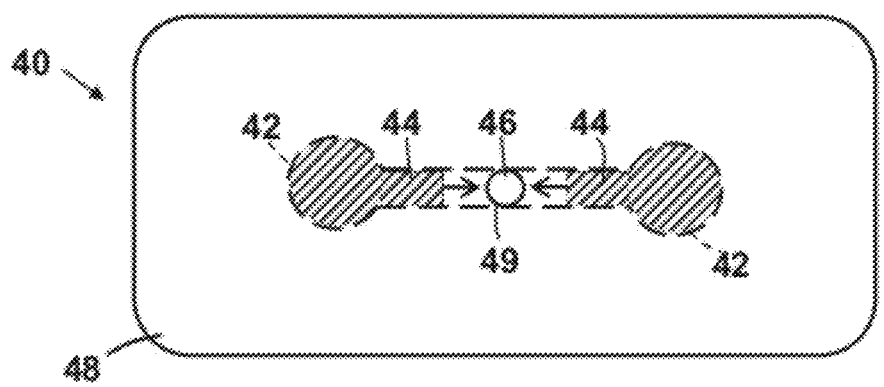
FIG. 4 is a top plan view of another embodiment of temperature-activatable time-temperature indicator according to the invention, which embodiment employs two reservoirs of indicator material.

FIG. 4 illustrates an embodiment of temperature-activatable time-temperature indicator according to the invention, referenced 40 in FIG. 4 that employs two indicator material reservoirs. Time-temperature indicator 40 includes an indicator element that comprises two reservoirs 42 of colored indicator material 44. Reservoirs 42 are located at the opposite ends of a light-colored, dogbone-shaped wick member 46 that is disposed beneath an opaque upper layer 48 of the indicator. Indicator material 44 is supported by wick member 46 and is in contact with it.

A window 49 is formed in upper layer 48 and is located approximately equidistantly between reservoirs 42 to permit a central zone of wick member 46 to be viewed. Time-temperature indicator 40 has a base temperature and an activation temperature determined by the nature of indicator material 44. In use, when time-temperature indicator 40 is exposed to an ambient temperature above its activation temperature, indicator material 44 melts and flows away from reservoirs 42 towards window 49, in two opposed, convergent streams moving in the direction of the arrows shown in the center of FIG. 4. Shortly after reaching the perimeter of window 49, the two streams of indicator material 44 can rapidly fill window 49 with colored indicator material 44, providing a sharp end point. For example, all or some of the flows can arrive at the window at about the same time, rapidly filling the window and providing a sharp end point wherein the time from the first appearance of indicator material at the viewing window to filling of the window area is short.

Instead of two reservoirs 42, other embodiments of time-temperature indicator 40 can have three, or four, or more, reservoirs of indicator material, each with its own flow pathway to a viewing window, provided by a wick member, or other suitable transport member. Each of the flow pathways can be essentially straight, as shown in FIG. 4, if desired. Alternatively, the flow pathways can be curved, or otherwise configured, to extend the distance between each respective reservoir and the viewing window thereby delaying the arrival of the indicator material at the viewing window. The flow paths can have equal flow lengths so that each flow arrives at the viewing window at about the same time.

Time-temperature indicator 40 is illustrative of some of the variations that can be made to time-temperature indicator 11 shown in FIGS. 1-3, and in the several elements of time-temperature indicator 11. Such variations can also be made to other embodiments of time-temperature indicator according to the invention, if desired, unless they would appear to be impractical.

Figure 5:
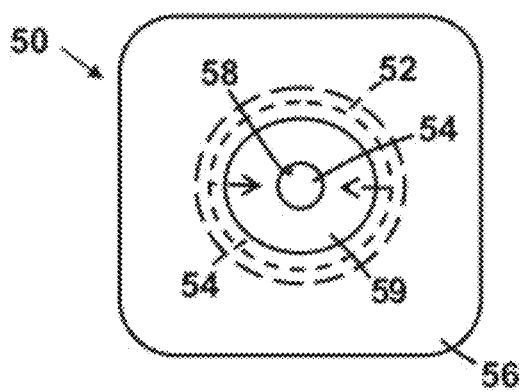
FIG. 5 is a top plan view of a further embodiment of temperature-activatable time-temperature indicator according to the invention, which embodiment employs a ring of indicator material.

FIG. 5 illustrates a further embodiment of temperature-activatable time-temperature indicator according to the invention, which is referenced 50 in FIG. 5, and which is configured to promote the display of a sharp end point signal. Time-temperature indicator 50 has an indicator element that comprises a ring of colored indicator material 52 that extends around the perimeter of a disc-shaped wick member 54, at or near the outer peripheral edge of wick member 54.

Wick member 54 supports indicator material 52 in contact with the wick material and is disposed beneath an opaque upper layer 56 of time-temperature indicator 50. A window 58 is provided in upper layer 56 approximately in the center of wick member 54. Window 58 is disposed approximately centrally of the ring of indicator material 52. Window 58 can permit a central zone of wick member 54 to be optically displayed externally of time-temperature indicator 50 for viewing by a human observer, or by a viewing device. Upper layer 56 can bear a reference ring 59, showing the end point appearance of the indicator material, to facilitate the reading of the signal given by time-temperature indicator 50, if desired.

At temperatures above the activation temperature, the indicator material 52 melts and flows inwardly towards window 58, as shown by the arrows in FIG. 5. The configuration of indicator material 52 in a ring around wick member 54 can cause a front of molten indicator material 52, which front can be approximately ring-shaped, to converge on the center of wick member 54, providing a sharp end point as the indicator material 52, reaching window 58 from multiple directions, or as a continuous ring, quickly fills the viewing zone provided by window 58.

By disposing the ring of indicator material 52 at or near the outer periphery of the disc provided by wick member 54, the molten indicator material 52 is unable to flow outwardly and is thus constrained to flow inwardly towards the middle of the disc, toward the center of wick 54, i.e., in the case of a circular ring of indicator material 52, approximately radially.

Indicator material 52 can be configured as a circular ring, as shown or can have other another shape that encourages a convergent flow of the indicator material 52 toward a central location on wick member 54 for example a triangle, a square, a hexagon or another regular polygon. The ring can be continuous or can be formed by a number of ring portions separated by spaces, for example, discrete dots and/or dashes.

Wick member 54 can have an outer perimeter approximately conforming to the outer periphery of the indicator material, if desired. Modified wick shapes are possible. For example, wick member 54 can resemble a spoked wheel and comprise a number of spokes to support travel of liquid indicator material from ring 52 toward a central region viewable through window 58.

Time-temperature indicator 50 is also illustrative of variations that can be made to time-temperature indicator 11 shown in FIGS. 1-3, and in the several elements of time-temperature indicator 11. Such variations can be made to other embodiments of time-temperature indicator according to the invention, if desired, unless they would appear to be impractical.

Some embodiments of time-temperature indicator according to the invention can include a reservoir of indicator material disposed directly beneath an optically contrasting, absorbent transport member, for example a white porous material. A window can be provided to permit the optical properties of the transport member to be read or viewed. The transport member can be disposed beneath the window and over the indicator material reservoir, masking the indicator material reservoir from view. In the initial state of the time-temperature indicator, when the indicator signal is read through the window, only the transport member is viewed giving, for example, a white signal. When the indicator material melts as a result of heat exposure, the liquid indicator material advances upwardly through the transport member toward the window in a direction opposite to the viewing direction. When the indicator material reaches the upper surface of the transport member, the signal read through the viewing window changes to the appearance of the indicator material, for example, to red.

Optionally, in such embodiments of time-temperature indicator, the transport member can be formed of a fine-pored transport material having a high opacity to visible light, for example, a paper of suitable grade, to help provide a sharp optical end point. A compatible indicator material can sometimes diffuse more quickly through a fine-pored transport material than through a transport material with coarser pores. A suitable high-opacity transport material can prevent the optical character of the indicator material from being displayed at the upper surface of the transport material until shortly before the indicator material reaches the upper surface.

The transport member can be formed with a layer of fine-pored transport material of high opacity providing the upper surface and supported on a layer of a coarser-pored transport material to provide relatively slow indicator material progress followed by faster progress near the end point, if desired.

Figure 6:
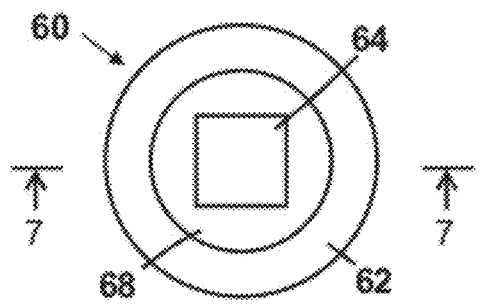
FIG. 6 is a top plan view of a still further embodiment of temperature-activatable time-temperature indicator according to the invention, which embodiment employs a transverse flow of indicator material.
Figure 7:
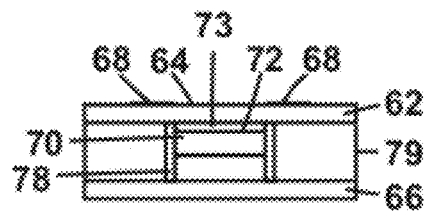
FIG. 7 is a vertical section on the line 7-7 of FIG. 6.

FIGS. 6 and 7 illustrate an embodiment of time-temperature indicator where an referenced 60 in FIGS. 6 and 7 and is configured to provide a sharp end point. Time-temperature indicator 60 has an indicator element wherein colored indicator material, when liquid, can flow to a viewing surface in a direction transverse to the plane of the viewing surface and can emerge at the viewing surface from that direction. For example, the indicator material can flow perpendicularly towards the plane of the viewing surface, from behind the viewing surface, with respect to a viewer.

Referring to FIGS. 6 and 7, time-temperature indicator 60 comprises an upper layer 62 provided with an approximately central viewing window 64 and a bottom layer 66 which can carry a liner-protected adhesive, or other suitable means for associating or attaching time-temperature indicator 60 with, or to, a host product.

Upper layer 62 can be transparent and can have an opaque reference ring 68, or another opaque structure, defining window 64. Alternatively, upper layer 62 can be opaque and can have a central opening providing window 64.

Window 64 is shown as being square in FIG. 6, but can have another shape.

A wick member 70 is disposed directly beneath window 64 and has an upper surface 72 that can be viewed through window 64 thereby providing a viewing surface. A small air gap 73 can be provided between upper surface 72 of wick member 70 and upper layer 62, by downward projections (not shown) or one or more spacers (also not shown) or other suitable structure, if desired.

Downwardly of wick member 70, with respect to upper layer 62, a reservoir 74 comprising a mass of normally solid indicator material is disposed in contact with the lower surface 76 of wick member 70. Wick member 70 and reservoir 74 can have any suitable cross-sectional-shape, referring to the plan view of FIG. 6. For example, wick member 70 and reservoir 74, or both wick member 70 and reservoir 74, can have a cross-sectional-shape approximately corresponding with, or overlapping, the shape of window 64 to permit the indicator material, when liquid, to flow to upper surface 72 of wick member 70 across the entire viewable area of wick member 70. Alternatively, wick member 70 can have a laterally extended upper surface 72, of greater area than other cross-sections of wick member 70 and/or of reservoir 74.

A tubular support 78 can contain and locate wick member 70 and reservoir 74, and can connect upper layer 62 and bottom layer 66, if desired. The portion of support 78 surrounding wick member 70 can alternatively be formed by multiple struts, if desired. Support 78 can be formed of metal, another heat-conductive material, or another suitable material.

Additional structural support can be provided between upper layer 62 and bottom layer 66, if desired, in the form of a peripheral member 79 extending between upper layer 62 and bottom layer 66 at a suitable location, for example at or near the outer edges of upper layer 62 and bottom layer 66. Peripheral member 79 can include openings (not shown) to permit ambient air to reach reservoir 74 and condition reservoir 74 to the ambient air temperature, if desired. Alternatively, peripheral member 79 can comprise a series of struts.

Wick member 70 can be formed of a porous and opaque wick material. For example, the wick material employed can have a porosity that causes liquid indicator material to diffuse through the wick material, for example, by capillary action. Wick member 70 can be sufficiently opaque to mask the appearance of colored indicator material within the wick from view prior to arrival at upper surface 72. Wick member 70 can be white and the indicator material can be red, if desired, or wick member 70 and the indicator material can have other suitable contrasting colors or appearances.

In use, when time-temperature indicator 60 is exposed to an ambient temperature above its activation temperature, as determined, in this case, by the melting point of the indicator material, the indicator material liquefies and begins to diffuse through wick member 70, traversing wick member 70 upwardly, as viewed in FIG. 7, from lower surface 76 toward upper surface 72. After a certain cumulative time-temperature exposure above its melting point, the indicator material emerges at upper surface 72 of wick member 70, causing a change in the appearance of wick member 70, as viewed through window 64. The rate, or rates, of diffusion of indicator material through wick member 70 may be different from the rate, or rates, of viscous flow along a transport member, of the same indicator material, under the same conditions.

With evenly distributed travel of the indicator material through wick member 70, moving in an approximately perpendicular direction towards upper surface 72 of wick member 70, the entire upper surface of wick member 70 can change color in the time required for travel through a thin top layer of wick member 70, from a point where the indicator material is masked by the wick material above it to a point where the indicator material is fully visible. This travel time can be short.

Upper surface 72 of wick member 70 can have an optically opaque non-clogging coating of white ink or the like that enhances masking while leaving the pores of the wick material open, if desired. Optionally, wick member 70 can have an outermost layer (not shown) at upper surface 72 formed of an optically more opaque material than the remainder of the wick member.

Time-temperature indicator 60 is also illustrative of variations that can be made to time-temperature indicator 11 shown in FIGS. 1-3, and in the several elements of time-temperature indicator 11. Such variations can also be made to other embodiments of time-temperature indicator according to the invention, unless they would appear to be impractical. Time-temperature indicators 40, 50, and 60 shown in FIGS. 4-7 can provide a binary, or "on/off" type of temperature exposure signal. Each indicator has a viewing window that displays either a wick member or an optically contrasting indicator material. The display of a wick member signals the likelihood of a fresh or safe condition of an appropriately matched host product with which the wick member is associated. The display of indicator material signals the possibility that the host product may lack freshness and/or may no longer be safe as a result of exceeding a particular predetermined cumulative temperature exposure.

Some embodiments of time-temperature indicator according to the invention can give a nuanced signal, indicating a number of stages of cumulative temperature exposure over time. The indications of the multiple stages can be displayed for reading by a human viewer or an optical device, For example, instead of, or in addition, to a window for viewing an end point event, such embodiments can include an elongated transport member along which an indicator material can flow and, optionally, graduations can be marked adjacent to the transport member, to quantify the advance of the indicator material along the transport member and relate specific displacements of the indicator material along the transport member to the likely condition of a host product experiencing the temperature exposure. In such embodiments, an upper layer of the time-temperature indicator, can be sufficiently transparent in a region or regions aligned with the transport member to permit progress of the indicator material along the transport member to be read optically through the upper layer.

Such a multi-stage time-temperature indicator can be quantitatively correlated with the temperature response characteristics of the host product to provide a suitable relationship between indicator material displacement and the likely condition of the host product. A suitable relationship can be provided by appropriate selection of indicator material, transport member and indicator geometry, including distances to be traveled by the indicator material along the scale, or other markings, referring to relevant teaching herein.

Figure 8:
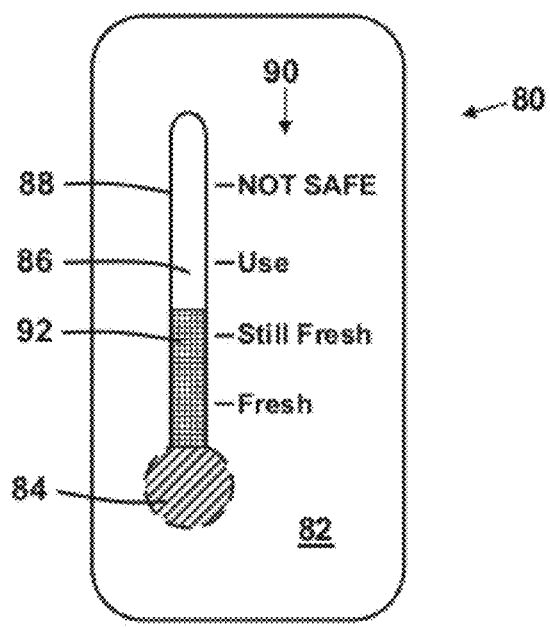
FIG. 8 is a top plan view of a still further embodiment of temperature-activatable time-temperature indicator according to the invention, which embodiment employs a graduated flow of indicator material.

For example, FIG. 8 illustrates a further temperature-activatable time-temperature indicator, referenced 80 in FIG. 8, that can indicate a number of stages of the condition of a host product. Time-temperature indicator 80 has an indicator element that can display an extended flow of indicator material along a linear flow path, for example, a rectilinear or curved flow path, in response to an appropriate temperature exposure over time. The indicator element can include multiple markings spaced along the flow path to indicate the progress of the indicator material along the flow path. For example a linear flow can be viewed against a graduated scale.

For this and other purposes, time-temperature indicator 80 includes an upper layer 82, a reservoir 84 of solid indicator material, and an elongated transport member 86 that is externally viewable for a substantial part of its length, or throughout its length.

As shown, upper layer 82 is opaque and conceals reservoir 84 from view. An elongated window 88 permits transport member 86 to be viewed. However, upper layer 82 can be transparent, or transparent in an appropriate region of transport member 86, so that transport member 86 is externally visible, or optically readable, and no window 88 is required. Also, reservoir 84 can be exposed to view, if desired, by configuring upper layer 82 to be transparent over reservoir 84, or configuring window 88 to extend over reservoir 84, if desired.

Upper layer 82 bears markings, labeled generally by arrow 90 in FIG. 8, adjacent transport member 86 to demark the progress of the indicator material along transport member 86. Markings 90 are spaced at graduated intervals along transport member 86, corresponding with specific stages of cumulative temperature exposure, and each marking is labeled with a likely condition that a host product with which time-temperature indicator 80 is intended to be used will have as a result of the cumulative temperature exposure indicated. Four exemplary condition descriptions are shown in FIG. 8, namely, "Fresh", "Still Fresh", "Use", and "NOT SAFE", which condition descriptions are self-explanatory. Other conditions, and/or other labels can be employed, if desired.

Window 88 can be configured to extend only over the region of transport member 88 that is adjacent to markings 90, if desired, or can have any other suitable configuration. For example, instead of providing a continuous view of an extended region of transport member 86 in the vicinity of markings 90, as shown in FIG. 8 and described herein, window 88 can be configured with multiple ports, one for each marking 90 to provide an "on/off" indication for the temperature exposure stage represented by each marking.

Employing an indicator material that has predictable temperature-viscosity characteristics, such as described herein, the spacings of markings 90 along transport member 86 can be determined to correspond approximately with particular cumulative time-temperature values. Markings 90 are shown with approximately regular spacings in FIG. 8, but other spacings can be employed, if desired.

Indicator materials with various temperature response characteristics can be employed to correlate with, or match, different host products having different temperature response characteristics to enable the same configuration of time-temperature indicator 80, with the same set of markings 90, to be employed with the different host products. Alternatively, different indicator materials can be employed with different indicator configurations having sets of markings 90 with different geometries, to provide a diversity of indicators useful for monitoring the same host product while providing different information.

In use, time-temperature indicator 80 can be associated with a host product, for example by being incorporated into a label that is adhered to the host product or to host product packaging. As the host product experiences an extended exposure, or repeated exposures to a temperature or temperatures above the respective activation temperature for time-temperature indicator 80, the indicator material advances along transport member 86 indicating the cumulative temperature exposure. A strip 92 of indicator material is shown in FIG. 8 as having advanced to a point between the "Still Fresh" marking and the "Use" marking.

Time-temperature indicator 80 is also illustrative of variations that can be made to time-temperature indicator 11 shown in FIGS. 1-3, and in the several elements of time-temperature indicator 11. Such variations can also be made to other embodiments of time-temperature indicator according to the invention, if desired, unless they would appear to be impractical.

Other structural and operational characteristics of time-temperature indicators 40, 50, 60, and 80, that are not described explicitly here, will be apparent to a skilled person or can be similar to the described structural and operational characteristics of time-temperature indicator 11, or can be modifications of, or alternatives to, structural and operational features of time-temperature indicator 11, or of any other time-temperature indicator embodiment of the invention described herein, as will be apparent to a person of ordinary skill in the art, in light of this disclosure.

A reference marking can be provided, if desired, which has a similar appearance to the end point appearance of the indicator, to facilitate reading of the indicator signal. The reference marking can be, for example, a ring around the optical reading location, or another shaped marking on the indicator which is colored red or has another optical character similar to the optical characteristic or characteristics the indicator employs for signaling.

This description contemplates, for simplicity, that the indicator material is at the prevailing ambient temperature at any given moment. A person of ordinary skill in the art will understand that, in practice, the actual temperature of the indicator material can be slightly different from ambient and/or can lag ambient temperature changes with a small time delay. However, these differences are unlikely to be significant to the practice of the invention. Moreover, depending upon the physical arrangement of the time-temperature indicator in relation to an associated host product, the host product can experience similar temperature differences, or lags, from ambient temperatures.

A thin label, or other suitable thin configuration of time-temperature indicator according to the invention, can be useful to reduce such temperature differences or lags. When secured to a host product, or a host product container, or a host product packaging, in close proximity to the ambient environment and to the host product, the container, or the packaging, a thin time-temperature indicator can provide good thermal communication between the time-temperature indicator and the host product and between the time-temperature indicator and the ambient environment. Other configurations that permit the time-temperature indicator to undergo rapid thermal change and correlate with the ambient environment can also be useful. Such good thermal communication can help the time-temperature indicator to monitor accurately the ambient thermal conditions in a manner simulating those experienced by the host product, the host product container, or the host product packaging.

As already described, a time-temperature indicator according to the invention can be configured to have a rate of indicator material displacement along a transport member, when liquid, that is suitable for monitoring the cumulative time-temperature exposure of a particular host product to be monitored. For example, the indicator material displacement along the transport member, at a response temperature in the range of from about the activation temperature of the indicator to about 5° C. above the activation temperature, can proceed at a rate of from about 0.005 mm/hr to about 5 mm/hr; a rate of from about 0.05 mm/hr to about 1 mm/hr; or a rate of from about 0.1 mm/hr to about 0.5 mm/hr. The liquid indicator material displacement rate can be referenced as a melt flow rate if desired. The transport member along which the indicator material is displaced can be elongated or can have another suitable shape.

The response temperature at which the displacement of the indicator material is measured can be in the range of from about 2° C. to about 5° C. above the activation temperature, for example, about 3° C. above the activation temperature.

Some further examples of useful rates of indicator material displacement along the transport member, at a temperature at least about 10° C. above the activation temperature, include a rate of at least about 0.5 mm/hr; a rate of at least about 2 mm/hr; a rate of at least about 5 mm/hr; and a rate of at least about 10 mm/hr.

At temperatures below the base temperature, a time-temperature indicator according to the invention can have a rate of indicator material displacement which is less than about 0.005 mm/hr, or less than about 0.001 mm/hr, or is effectively zero.

At temperatures that are intermediate between the base temperature and the activation temperature, a time-temperature indicator according to the invention can exhibit an indicator material rate of displacement which is less than that above the activation temperature. For example, the intermediate displacement rate can be from about 0.005 mm/hr to about 5 mm/hr. The displacement rate at intermediate temperatures can be greater than that below the base temperature.

Some time-temperature indicator embodiments of the invention can record irreversibly a cumulative temperature exposure period of at least 1.5 degree-days at a temperature or temperatures above a threshold temperature, for example, the activation temperature. Also, such time-temperature indicators can exhibit an end point at the end of 1.5 degree-days of temperature exposure above the activation temperature, for example a color change exhibited at an optically readable location, if desired. In such embodiments, the end point is not optically present prior to the expiry of the degree-day period. Thus, the time-temperature indicator can indicate that no undesired cumulative time-temperature exposure has occurred prior to the elapse of the degree-day period because the end point change has not been displayed.

As used herein, temperature degrees are degrees Celsius ("° C." herein). A "degree-day" is to be understood as a cumulative time-temperature value equivalent to one degree for a period of one day and includes, for example, two degrees for half a day and half a degree for two days, and other such combinations of time and temperature.

In addition, or alternatively, some time-temperature indicator embodiments of the invention can record irreversibly a cumulative temperature exposure over time of at least 1.5 degree-days at a temperature or temperatures above the base temperature. Also, such time-temperature indicators can exhibit an end point at some time after 1.5 degree-days of temperature exposure above the base temperature, according to the heat exposure received by the indicator. The end point can be, for example, a color change exhibited at an optically readable location, if desired. Again, in such embodiments, the end point is not optically present prior to the elapse of the degree-day period. Thus, the time-temperature indicator can indicate that no undesired cumulative time-temperature exposure has occurred prior to the elapse of the degree-day period, because the end point change has not been displayed.

The time-temperature indicator can be configured to monitor a longer degree-day period of exposure above the activation temperature of the time-temperature indicator, for example, 2 degree-days, 5 degree-days, 10 degree-days, 20 degree-days, 50 degree-days, 100 degree-days, or more than 100 degree days. Also, the time-temperature indicator can be configured to display an end point at about the end of the degree-day period monitored, or shortly after the expiry of the degree-day period monitored.

The time-temperature indicator can respond continuously throughout any period or periods of exposure to temperatures above the activation temperature, for example, with an ongoing displacement of an indicator material with respect to a transport member that is quantitatively related to cumulative time-temperature exposure and proceeds at different rates according to the prevailing temperature.

Activation Temperature. A time-temperature indicator according to the invention can be configured to have an activation temperature which is relevant to the temperature response characteristics of the host product, for example, by selection of a suitable indicator material. The activation temperature can correspond with a threshold temperature at, or above, which the host product can deteriorate, or risks deterioration, or another suitable temperature.

Some examples of activation temperatures for which a time-temperature indicator according to the invention can be configured have already been described. These and other examples include an activation temperature in a range of from about −10° C. to about 60° C. and; an activation temperature in a range of from about −10° C. to about 5° C.; an activation temperature in a range of from about −3° C. to about 5° C.; an activation temperature in a range of from about 5° C. to about 50° C.; an activation temperature in a range of from about 10° C. to about 40° C.; and an activation temperature in a range of from about 20° C. to about 30° C. Time-temperature indicators with other activation temperatures can be provided, if desired. For example, lower activation temperatures, including sub-zero temperatures down to about −34° C. can be obtained using a suitable indicator material one example of which is a side-chain crystallizable polymer such as poly (dodecylmethacrylate). The activation temperature can be below 50° C., for example, below about 40° C.

Furthermore, the activation temperature can be close to the base temperature or can be somewhat above the base temperature, if desired, depending upon the particular indicator material employed. For example, the activation temperature can exceed the base temperature by a temperature in a range of from about 1° C. to about 50° C.; a range of from about 3° C. to about 20° C.; or a range of from about 5° C. to about 15° C. In some cases, the activation temperature can be the same as the base temperature.

Base Temperature. A time-temperature indicator according to the invention can be configured to have a base temperature which is relevant to the temperature response characteristics of the host product, for example, by selection of a suitable indicator material. The base temperature can be a temperature below which the host product is unlikely to deteriorate during a period of possible usefulness of the time-temperature indicator, or another suitable temperature. The period of possible usefulness of the time-temperature indicator can be about one week, about one month, about one year, from about two years to about five years, or more, or another suitable period.

Some examples of base temperatures for which a time-temperature indicator according to the invention can be configured include a base temperature in a range of from about −5° C. to about 40° C.; a base temperature in a range of from about 0° C. to about 30° C.; and a base temperature in a range of from about 10° C. to about 20° C.

Some host products can be stable at cool temperatures, for example, at a cool temperature below a range of from about 10° C. to about 15° C., for extended periods, for example, for 20 days to 100 days or more. However, the host product can deteriorate rapidly at room temperatures of about 25° C. or higher, for example in a period of from about 12 hr to about 72 hr or less, and can deteriorate even more rapidly at higher temperatures, of about 35° C. or higher, for example, in about 0.5 to about 5 hr or less. At intermediate temperatures in the range of from about 15° C. to about 25° C., the host product may deteriorate slowly, for example, in about 3 days to about 20 days, or more.

Using a suitable indicator material, a time-temperature indicator embodiment of the invention can be designed to correlate with such host product temperature response characteristics by configuring the time-temperature indicator with a base temperature in the range of from about 15° C. to about 20° C. and an activation temperature of about 25° C. For example, the time-temperature indicator can employ an indicator material having a melt onset temperature of about 15° C. to about 20° C., a melting temperature of about 25° C., and a viscosity, when liquid, that declines with increasing temperature.

Below the base temperature, the indicator material does not flow significantly. At intermediate temperatures above the melt onset temperature, the indicator material can flow slowly and provide an end point after an appropriate number of days, for example, after about 3 days to about 20 days. At about 25° C., the indicator material can melt, and while the temperature remains above 25° C. can flow more quickly on or through the transport member, generating an end point signal in about 12 hr to about 72 hr or less depending upon the ambient temperatures. If the temperature rises above about 35° C. for long enough, the viscosity of the indicator material drops and an end point signal can be generated more quickly in about 0.5 to about 5 hr or less.

Transport Member. As already exemplified herein, in the practice of the invention, the transport member can be porous and/or absorbent and the indicator material can be absorbable by the transport member, for example, by capillary attraction of the transport member material for the liquid indicator material. The indicator material, when in the liquid state, can contact the transport member. Desirably, the transport member has affinity for the indicator material. For example, some useful transport member materials can be wetted by the indicator material. Some examples of suitable materials that can be employed for the transport member, as sole or partial components of the transport member, include: Ahlstrom 601 and 631 paper (Ahlstrom Corp. at www.ahlstrom.com), Whatman grade 1 qualitative paper and chromatography paper 1 Chr, 2 Chr, and 3 Chr (Whatman Inc. of Clifton, N.J. and www.whatman.com.) Other woven, nonwoven, fibrous, non-fibrous reticulated, or non-reticulated, porous materials can be employed, if desired.

Alternatively the transport member can comprise or consist of a nonporous material. For example, the indicator material can be hydrophobic, and the transport member can also be hydrophobic so that the liquid indicator material can adhere to a surface of the transport member by hydrophobic-hydrophobic attraction and flow across the transport member surface toward a viewing location, for example, viewing window 15. Some examples of suitable hydrophobic transport member materials include hydrophobic polymers and copolymers of olefins, ethylene, propylene, vinyl chloride, carbonates, urethanes, acrylics, vinyls, vinyl chlorides, vinylidene chlorides, styrenes, amides, imides, esters, ethers, and fluorocarbons.

If desired, the transport member can be hydrophilic, for example, for use with a hydrophilic transport material.

The transport member can be configured with structures to guide and facilitate the indicator material flow, if desired, for example, matt surfacing, surface texturing or roughening, one or more surface grooves and/or capillary channels extending toward the viewing location or combinations of two or more of the foregoing structural features. Optionally, the transport member can be configured to provide multiple material flow paths. Multiple transport members can be employed in a single time-temperature indicator, if desired.

Indicator Material. The indicator material can be an individual material or a composition, or combination of two or more materials. For example, the indicator material can include a transport material and, optionally, an optically distinctive material. The indicator material can consist solely of the transport material or solely of the transport material and the optically distinctive material. A transport material having an optically distinctive characteristic of its own, for example, an intense color, in comparison with the indicator component that provides a viewing background, such as a transport member, can be used without an additional optically distinctive material, if desired. Either or both the transport material and the optically distinctive material can consist of one or more ingredients.

The transport material can provide the indicator material with desired mechanical characteristics such as remaining solid below the base temperature and melting or otherwise changing to a flowable phase of appropriate viscosity above the activation temperature. The liquid indicator material viscosity can vary with temperature, decreasing with temperature increase, if desired. The optically distinctive material, if employed, can provide one or more useful optical characteristics which help the time-temperature indicator generate a distinct end point signal.

Indicator materials useful in the practice of the invention, in which multiple ingredients are employed, can be formulated with any of a wide range of proportions of those ingredients. The indicator material can include a major proportion of transport material, for example, a proportion of transport material of at least about 60 percent by weight, at least about 80 percent by weight, at least about 90 percent by weight, at least about 95 percent by weight, or at least about 98 percent by weight, based on the weight of the indicator material. Optionally, the indicator material can include from about 0.05 percent to about 10 percent by weight, based on the weight of the indicator material of an optically distinctive material. If desired, the proportion of optically distinctive material can be from about 0.1 percent to about 5 percent by weight, or from about 0.5 percent to about 2 percent by weight, the proportions being based on the weight of the indicator material. The indicator material can include from 0 to about 20 percent by weight, based on the weight of the indicator material, of one or more performance modifiers and/or from about 0 to about 10 percent by weight, based on the weight of the indicator material, of one or more other ingredients that do not have an adverse effect upon the indicator material properties, the balance being transport material.

The indicator material can have a viscosity at, or near, the activation temperature, for example, within 2° C. of the activation temperature, when the indicator material is liquid, which facilitates monitoring cumulative time-temperature exposure. For example, the indicator material viscosity at the activation temperature, when the indicator material is liquid, can be in a range of from about 20 cP, or 25 cP, to about 100,000 cP; a range of from about 50 cP to about 5,000 cP; or a range of from about 100 cP to about 500 cP, or a range of from about 40 cP to about 1,000 cP.

By way of further example, the indicator material can have a viscosity, when liquid, that is at least 20 cP, at least 25 cP, at least about 50 cP, or at least about 100 cP. Alternatively, or in addition, the indicator material can have a viscosity, when liquid, that is not greater than about 500 cP, not greater than about 5,000 cP, or not greater than about 100,000 cP, if desired. Further, the indicator material can have a viscosity, when liquid, that is in a range from any one of said lower viscosity limits to any one of said higher viscosity limits, if desired.

Depending upon the application, i.e. the nature of the host product to be monitored, the indicator material can be solid or can be a viscous liquid at room temperature. For example, at a room temperature of 20° C., the indicator material, if liquid, can be a material having a viscosity of at least about 20 cP, or at least about 100 cP. In this case, the indicator will have self-activated and will be monitoring ambient conditions as the indicator material undergoes liquid-flow induced displacement.

If the viscosity of the liquid indicator material is too low, the rate of advance of the indicator material on, or through, the transport member can be too rapid to correlate satisfactorily with the temperature response characteristics of a particular host product, or can cause inconsistent or unpredictable advance of the indicator material on, or through, the transport member. If the viscosity of the liquid indicator material is too high, the rate of advance of the indicator material on the transport member can be too slow to correlate satisfactorily with the temperature response characteristics of a particular host product.

At a temperature 5° C. above the activation temperature, the liquid indicator material can have a lower viscosity than the viscosity of the liquid indicator material at the activation temperature, for example, a viscosity at least 50 cP less, or at least 500 cP less, than the viscosity of the indicator material at the activation temperature, so long as the viscosity is at least about 20 cP, or at least about 50 cP.

The rate of change of viscosity with temperature can also change with temperature in some instances, for example, some useful indicator materials can exhibit a rate of change of viscosity with temperature that decreases with increasing temperature.

Various rates of change of viscosity with temperature can be useful in an indicator material employed in a time-temperature indicator according to the invention to monitor and/or record cumulative temperature exposure over time. For example, the viscosity of the indicator material can decrease at a relatively low rate of at least about 20 cP/° C., or at least about 50 cP/° C., or at least about 100 cP/° C., as the temperature of the indicator material increases. Alternatively, the viscosity of the indicator material can decrease at a relatively high rate of at least about 100 cP/° C., or at least about 500 cP/° C., or at least about 1000 cP/° C., as the temperature of the indicator material increases. The rate of decrease of viscosity with temperature can lie in a range extending between any one of said relatively low rates and any one of said relatively high rates.

Thus, at elevated ambient temperatures, useful indicator materials can have a viscosity which is lower than their room-temperature viscosity, or lower than the viscosity of the indicator material at a temperature a few degrees above the melting point of the indicator material. At a temperature of 40° C., some useful indicator materials have a viscosity of at least about 10 cP, or at least about 100 cP, or at least about 500 cP. The viscosity at a temperature of 40° C. can be not more than about 50,000 cP, or can have another suitable value. At a temperature of 50° C., some useful indicator materials have a viscosity of at least about 10 cP, or at least about 20 cP, or at least about 200 cP. The viscosity at a temperature of 50° C. can be not more than about 20,000 cP, or can have another suitable value. At a temperature of 60° C., some useful indicator materials have a viscosity of at least about 5 cP, or at least about 20 cP, or at least about 50 cP. The viscosity at a temperature of 60° C. can be not more than about 5,000 cP or can have another suitable value. At a temperature of 70° C., some useful indicator materials have a viscosity of at least about 1 cP, or at least about 5 cP, or at least about 10 cP. The viscosity at a temperature of 70° C. can be not more than about 1,000 cP or can have another suitable value.

The temperature-viscosity characteristics of the indicator material can determine, partially, largely or entirely, the relationship between the ambient temperature conditions to which the indicator material is exposed over a period of time and the distance traveled by a front of indicator material moving with respect to a transport member supporting the indicator material. Indicator materials providing various relationships between the ambient temperature conditions and the distance traveled by the indicator material can be employed in time-temperature indicators according to the invention provided that the distance traveled provides a reliable indication of the temperature exposure over a useful range of temperature conditions. Desirably, the indication provided should be consistently reproduced by multiple samples of the time-temperature indicator under the same temperature conditions.

For example, employing a suitable synthetic polymeric material as an indicator material, or as a transport material component of an indicator material, optionally, a side-chain crystallizable polymer, the distance traveled by the indicator material, referring to an advancing front of indicator material supported on a porous transport member, can be proportional to the square root of the duration of the exposure at a constant temperature above the activation temperature of the indicator material. A suitable indicator material can travel a distance that increases with temperature. For example, the rate of increase of the square of the distance traveled can increase approximately proportionately with temperature. Other indicator materials providing other relationships between the ambient temperature conditions and the distance traveled by the indicator material can also be employed. The particular mathematical nature of the relationship may not be significant, and can be determined heuristically, if desired, if the indicator material exhibits progressive, measurable and consistent travel during a time period of interest.

With some indicator materials, a plot of the square of the distance traveled against time can provide a reasonably straight line. Also, the gradient of the straight line obtained by plotting the squared distance versus time can increase with temperature. By way of illustration, some simple examples of indicator material travel, in accordance with these relationships, under idealized temperature conditions, are shown in Table 1.

TABLE 1

Examples of Indicator Material Travel

| Indicator Material | Exposure at 35° C. | | Exposure at 50° C. | | Total | |
|---|---|---|---|---|---|---|
| | Time | Displacement Rate | Time | Displacement Rate | Time | Displacement |
| Sample 1 | 4 hr | 5 mm$^2$/hr | — | — | 4 hr | $\sqrt{(4 \times 5)}$ = 4.5 mm |
| Sample 2 | — | — | 4 hr | 10 mm$^2$/hr | 4 hr | $\sqrt{(4 \times 10)}$ = 6.3 mm |
| Sample 3 | 4 hr (1) | 5 mm$^2$/hr | 4 hr (2) | 10 mm$^2$/hr | 8 hr | $\sqrt{[(4 \times 5) + (4 \times 10)]}$ = 7.7 mm |
| Sample 4 | 4 hr (2) | 5 mm$^2$/hr | 4 hr (1) | 10 mm$^2$/hr | 8 hr | $\sqrt{[(4 \times 10) + (4 \times 5)]}$ = 7.7 mm |

Referring to Table 1, Table 1 provides hypothetical data for a colored indicator material, for example, a dyed synthetic polymeric material, that moves at a rate of 5 mm$^2$ (distance squared units) per hour at 35° C., and at a rate of 10 mm$^2$ (distance squared units) per hour at 50° C. Sample 1 is exposed at 35° C. for four hours. Sample 2 is exposed at 50° C. also for four hours. Sample 3 is first exposed at 35° C. for four hours and then at 50° C. for four hours. Sample 4 is exposed in the opposite manner, being first exposed at 50° C. for four hours and then at 50° C. for four hours. The parenthetical references adjacent the durations given for Samples 3 and 4 indicate which exposure is first and which is second.

As shown in the last column of Table 1, the displacement is calculated as the square root of the product of the displacement rate and the duration of the exposure. For multiple exposures at different temperatures, the total displacement, in this hypothetical example, is calculated as the square root of the sum of the products of the rate of movement and the duration of each exposure. In this case, the calculation yields a total displacement that is less than the sum of the individual displacements because the viscosity of the synthetic polymer is temperature-related, being lower at higher temperatures.

Samples 1 and 2 in Table 1 are exposed to different temperatures for the same duration. Sample 2 yields a greater displacement of 6.3 mm versus 4.5 mm for Sample 1, indicating the higher temperature to which sample 2 is exposed.

Sample 3 is exposed first to a lower temperature and then to a higher temperature. Sample 4 experiences opposite exposures. The total displacements yielded by Samples 3 and 4 are the same in each case. Samples 3 and 4 show that the indication of cumulative temperature exposure over time can be the same regardless of the sequence in which higher and lower temperatures are encountered.

To avoid impeding displacement of the indicator material with respect to a transport member, if employed, the indicator material can have a low degree of tack, if desired. For example, the indicator material can have a degree of tack of less than about 10 g/cm², or less than about 5 g/cm², as determined by ASTM D2979. ASTM D2979 refers to the force required to remove the end of a 5 mm diameter stainless steel rod from the surface of an adhesive coating to which the rod has been adhered for 1.0 second, at a speed of 10 mm/sec. See U.S. Pat. No. 5,156,911, column 5, lines 27-46.

One or more performance modifiers can be added to the indicator material to modify one or more physical characteristics of the indicator material, if desired. Such performance modifiers can enhance the temperature response characteristics of the indicator material to better relate the temperature response characteristics to the temperature sensitivity characteristics of an intended host product, or perform some other useful function. A performance modifier, or performance modifiers, if employed, can generally comprise a minor proportion by weight of the indicator material. For example, the indicator material can comprise a proportion of performance modifier, or performance modifiers, from 0 to about 20 percent by weight, or a proportion of from 0 to about 10 percent by weight, or a proportion of from about 0.5 percent to about 5 percent by weight, based on the weight of the indicator material.

If the indicator material includes one or more performance modifiers, the balance of the indicator material can be made up by one or more transport materials. The indicator material balance optionally can include an optically distinctive material in a proportion as described herein. The balance of the indicator material can consist entirely of transport material and optically distinctive material, if present, or can include up to about 10 percent, or up to about 5 percent by weight, based on the weight of the indicator material, of one or more other ingredients that do not adversely affect the properties of the indicator material. Some examples of useful performance modifiers include viscosity modifiers, plasticizers, and diluents.

Examples of viscosity modifiers that can be employed, alone or in combination, include: polyisobutylene; olefin copolymers; acrylic resins; vinyl acetate resins; ELVAX™ ethylene-vinyl acetate/acid copolymer resin (E.I. duPont de Nemours and Company, Wilmington Del.), for example, ELVAX products nos. 210, 410, 40W, 150, 350, and 4310; PARALOID acrylic resins (The Dow Chemical Company (Midland, Mich.); VANTACK™ viscosity modifiers, for example, products nos. 105, and 85, from R.T. Vanderbilt Company Inc. (Norwalk, Conn.); polyisobutylene products nos. PIB85MM, and PIB100MM (Soltex Houston, Tex.); and poly(alpha-olefins), including any one or more of products nos. PAO 2 to PAO 100 from Soltex.

Examples of plasticizers that can be employed, alone or in combination, include glycerol esters, alkyl phthalates, polyethylene glycols, polyethylene glycols having a molecular weight of from about 2,000 to about 20,000. Other examples include; ADMEX® plasticizers (ADMEX 523, 6696, 770) from EASTMAN, PALATINOL® and PALAMOLL® plasticizers from BASF and Jayflex™ from EXXON Mobile.

Examples of diluents that can be employed, alone or in combination, include polyols, glycerol oil, and POLYALDO™ polyglycerol ester diluents (Lonza Group Ltd., Basel, Switzerland).

To provide time-temperature indicators suitable for monitoring a diversity of host products, indicator materials having a variety of temperature response characteristics can be useful. For example, indicator materials that can be chemically tailored, or tuned to have a particular activation temperature or a particular temperature-viscosity profile above the activation temperature can be useful to provide a good correlation with the temperature sensitivity characteristics of a particular host product.

Optically Distinctive Material. An optically distinctive material, if employed, can give the indicator material optical characteristics that are distinctly different from the optical characteristics of surrounding structure of the time-temperature indicator, as detected from a location outside the indicator, for example, by a human viewer or a camera. The surrounding structure can be an outer surface of the time-temperature indicator or an internal surface if the time-temperature indicator permits light reflected from the internal surface to be detected externally of the time-temperature indicator. For example, the optically distinctive material can provide a contrasting appearance to that of the surrounding structure, optionally by providing a bright, contrasting color.

In some embodiments of the invention the indicator material comprises a dye dissolved in a synthetic polymeric transport material, for example, dissolved in a side-chain crystallizable polymer. More than one dye can be employed, if desired, and the dye or dyes can have good color intensity. One example of a suitable dye is Oil Red O dye (Sigma-Aldrich, St. Louis, Mo.). Other suitable dyes will be apparent to a person of ordinary skill in the art. For an indicator signal with good color intensity, the dye can be dissolved in the polymer to saturation. The dye can have any suitable hue, for example, red or orange, or another hue, some of which are described elsewhere herein.

Some examples of useful optically distinctive materials include colorants, dyes, pigments, fluorescent materials, optical phase modifying materials, liquid crystals, infrared-reflecting materials, ultraviolet-reflecting materials, infrared-absorbing materials, ultraviolet-absorbing materials optically refractive materials, optically diffractive materials, holographic materials, and mixtures of two or more of the foregoing optically distinct materials. For a distinct indicator signal, intense, or strong, tints of red, orange, blue, violet, purple or black can be employed, in combination with a white or light-colored background appearance provided by a transport member supporting the indicator material, or in another suitable manner. Other colors can be employed for the indicator material, if desired, including light hues or tints. For example, a yellow, orange, or red indicator material can be employed, optionally, with a dark or black background. Such an indicator also can bear a dark or black mask, provided, for example, by printing, surrounding a viewing window for viewing the indicator material, if desired, to provide a distinct warning signal, or alerting signal, when the yellow, orange or red indicator material appears in the viewing window.

The term "color" is used herein to include achromatic visual appearances such as black, gray, and white, as well as primary, secondary and other color hues, such as, without limitation, red, yellow, green, blue, purple, orange, brown and other hues.

Transport Material. Various materials can be employed as a transport material. Optionally, the transport material can be hydrophobic. As stated, the transport material can have affinity for the transport member. For example, the transport material and the transport member can both be hydrophobic. In this case, the transport material, when liquid, can wet the transport member, if desired. The transport material can form a suitable contact angle with the transport member, for example, a contact angle of less than 90°, less than 45°, or less than 30°. In some embodiments, the transport member and the transport material can be hydrophilic or have some hydrophilic character.

The transport material can be, or can include, a suitable synthetic polymeric material, if desired. The synthetic polymeric material can be solid when at or below the base temperature and can be a viscous liquid when at or above the activation temperature. The synthetic polymeric material can include one or more polymers, one or more copolymers or a mixture of one or more polymers with one or more copolymers. Also, the synthetic polymeric material can provide any one or more of the transport material properties described herein, if desired. The synthetic polymeric material can have any suitable molecular weight. As used herein, the term "molecular weight" references a weight average molecular weight, unless the context indicates a number average molecular weight.

For example, the synthetic polymeric material can have a molecular weight in a range of from about 1,000 Da to about 300,000 Da, or in a range of from about 1,500 Da, or in a range of from about 5,000 Da, to about 100,000 Da, or in a range of from about 5,000 Da to about 20,000 Da.

By way of further example, the synthetic polymeric material can have a molecular weight of at least about 1,000 Da, at least about 1,500 Da, at least about 2,000 Da, or at least about 5,000 Da. Alternatively, or in addition, the synthetic polymeric material can have a molecular weight that is not greater than about 50,000 Da, not greater than about 100,000 Da, or not greater than about 300,000 Da, if desired. Furthermore, the synthetic polymeric material can have a molecular weight that is in a range from any one of said lower molecular weight limits to any one of said higher molecular weight limits, if desired.

In general, a higher molecular weight synthetic polymeric material can have a higher viscosity when in the liquid state at a temperature near its melting point than the corresponding synthetic polymeric material with a lower molecular weight. Thus, the response parameters of a time-temperature indicator including a suitable synthetic polymeric material configured to flow on or through a transport member can be tuned, or adjusted, by varying the molecular weight of the synthetic polymeric material.

The synthetic polymeric material, or other transport material, can have a melting temperature selected to be the same as, or close to, an activation temperature of a time-temperature indicator according to the invention, or can have another suitable melting temperature. Thus, the synthetic polymeric material can have a melting temperature which is in or close to any one of the activation temperature ranges described herein, for example, in a temperature range of from about 10° C. to about 60° C., or in another suitable temperature range.

As used herein, the term "melting temperature", or "melting point" refer to the temperature at which a material exhibits peak unit heat absorption per degree Celsius, as determined by differential scanning calorimetry. Above its melting temperature, the transport material can exhibit liquid properties and can move, for example, flow or diffuse.

The synthetic polymeric material, or other indicator material, can have a melt onset temperature selected to be the same as, or close to, a desired base temperature of a time-temperature indicator according to the invention, or can have another suitable melt onset temperature. Thus, the synthetic polymeric material, or other indicator material, can have a melt onset temperature which is in or close to any one of the base temperature ranges described herein, for example, in a temperature range of from about −5° C. to about 60° C., or in another suitable temperature range.

As used herein, the term "melt onset temperature" refers to the temperature at which the meltable material begins to exhibit an increase in unit heat absorption per degree Celsius, as determined by differential scanning calorimetry. Below its melt onset temperature, the transport material can be solid.

As used herein, the term "melting temperature range" refers to the temperature range from the melt onset temperature to the melting temperature of a material.

At temperatures in the melting temperature range, the synthetic polymeric material can be softer than it is below the melt onset temperature and may or may not move perceptibly in a relevant time scale, depending upon the nature of the particular synthetic polymeric material. Some synthetic polymeric materials useful in the practice of the invention can exhibit a low flow rate in the melting temperature range, which flow rate is so slow as to be immaterial for the purposes of the present invention.

For some applications, the synthetic polymeric material, or other indicator material, can have a relatively narrow melting temperature range, for example, a melting temperature range of not more than about 30° C., a melting temperature range of not more than about 10° C., a melting temperature range of not more than about 5° C., a melting temperature range of not more than about 2° C., or a melting temperature range of from about 0° C. to about 30° C.

In some embodiments of the invention, the transport material can have flow properties at temperatures between the base temperature and the activation temperature of the time-temperature indicator that are useful for monitoring a host product. For example, the transport material can have a limited flow rate that is less than the flow rate of the transport material above the activation temperature.

The viscosity of the transport material above the base temperature can be less than the viscosity below the base temperature. In some embodiments of the invention, the viscosity of the transport material above the activation temperature can be less than the viscosity below the activation temperature. Further, the viscosity of the transport material above the base temperature can be less than the viscosity below the base temperature and greater than the viscosity above the activation temperature.

A synthetic polymeric material employed in the practice of the invention can have any suitable chemistry that will enable the synthetic polymeric material to fulfill one or more of the objectives, or requirements, of the invention as described herein. For example the synthetic polymeric material can include a side chain crystallizable polymer.

Polymers that have ordered regions in the solid state, wherein their molecular chains are partial aligned, are described herein as "crystalline" polymers. Above their melting temperatures, such polymers are "crystallizable". The terms "crystalline" and "crystallizable" are used herein in relation to certain polymers with the understanding that the respective polymer can be "crystalline" below its melting temperature and "crystallizable" above. The term "crystalline" as used herein does not necessarily imply one hundred percent crystallinity, although one hundred percent crystallinity can be included, and also includes the concept of "semi-crystalline". In other words, a "crystalline" or "crystallizable" polymer can be a polymer that includes a region that is crystalline or crystallizable and has another region that is not, or regions that are not, crystalline or crystallizable.

Crystallinity can be localized in particular regions of a given polymer or can be associated with particular chemical structural characteristics of the polymer. Various methods of measuring the degree of crystallinity of a polymer are known and include density measurement, differential scanning calorimetry (DSC), X-ray diffraction (XRD), infrared spectroscopy, and nuclear magnetic resonance (NMR). The measured value can vary according to the method used.

The properties of crystalline polymers can differ from those of amorphous polymers. For example, some crystalline polymers can resist softening above their glass transition temperatures, can be harder and more brittle than amorphous polymers, and can be opaque to visible light.

Side-chain crystallizability in a polymer useful in the practice of the invention can provide a relatively sharp transition from the solid state to the liquid state. A sharp transition can be useful in correlating the temperature response characteristics of the polymer with those of a host product to facilitate monitoring the temperature exposure of the host product. The polymer's melting range is usually indicative of the sharpness of the solid state to liquid state transition. Depending upon the properties of the intended host product, a relatively narrow melting range can be useful, for example, a melting range of about 10° C. or about 5° C. or about 2° C.

Some side-chain crystallizable polymers have temperature-related melting and viscosity properties that make them useful as transport materials, or components of transport materials, in the practice of the invention. Thus, some useful side-chain crystallizable polymers have relatively low melting temperatures, for example, below about 60° C. Also, some side-chain crystallizable polymers, upon melting, transition from a soft solid which softens further as it melts, to a high-viscosity molten material that decreases in viscosity slowly as temperature increases.

Useful side-chain crystallizable polymers include polymers having regions of crystallizability, or the ability to form crystallites, in side chains of the polymer molecule. Some useful side-chain crystallizable polymers lack crystallinity in the backbone of the polymer molecule, but backbone crystallinity can be present in other cases, if desired.

Side-chain crystallizable polymers employed in the practice of the invention can have alkyl side chains, or the side chains can have another suitable chemical structure or structures. The backbone can be constituted by hydrocarbon groups or have can have another suitable chemical structure.

Various substituent groups are possible. Some useful side-chain crystallizable polymers are described in more detail elsewhere herein.

A side-chain crystallizable polymer employed in a time-temperature indicator embodiment of the invention can have any suitable degree of crystallinity. The degree of crystallinity can be expressed in terms of a weight percent crystallinity, if desired. For example, the polymer can have a percent crystallinity, as determined by differential scanning calorimetry, that is selected from the group consisting of: from about 5 percent to about 85 percent by weight; from about 10 percent to about 55 percent by weight; and from about 20 percent to about 40 percent by weight; based on the weight of the polymer.

Some side-chain crystallizable polymers that have a higher degree of crystallinity when crystallized can advance, or migrate, more slowly on a suitable transport member than polymers having a lower crystallinity. Accordingly, the rate of advance, or migration, of a side-chain crystallizable polymer on a transport member employed in a time-temperature indicator embodiment of the invention can be chosen, or adjusted, by employing a side-chain crystallizable polymer having a suitable crystallinity.

Many synthetic polymers having side chain crystallinity are known, from which suitable polymers having characteristics such as melting temperature, melting temperature ranges, molecular weights, and viscosities useful for the purposes of the invention can be selected by a person of ordinary skill in the art. Other side-chain crystallizable polymers that can be employed in the practice of the invention will be known or apparent to a person of ordinary skill in the art, in light of this disclosure, or will become known or apparent in the future, as the art develops, or can be prepared by a person of ordinary skill in the art.

Some side-chain crystallizable polymers useful in the practice of the invention, alone or in combination, and methods that can be employed for preparing them, are described in O'Leary et al. "Copolymers of poly(n-alkyl acrylates): synthesis, characterization, and monomer reactivity ratios" in *Polymer* 2004 45 pp 6575-6585 ("O'Leary et al." herein), and in Greenberg et al. "Side Chain Crystallization of n-Alkyl Polymethacrylates and Polyacrylates" *J. Am. Chem. Soc.*, 1954, 76 (24), pp 6280-6285 ("Greenberg et al." herein.). The disclosure of each of O'Leary et al. and Greenberg et al. is incorporated by reference herein for all purposes.

Polymers described in O'Leary et al. and Greenberg et al. include homopolymers of methacrylates, homopolymers of acrylates and various copolymers of methacrylates and acrylates. The described polymers also include polymers having n-alkyl groups with from 12 to 18 carbon atoms. Further, the polymers described in O'Leary et al. include various copolymers of poly(n-alkylacrylates.)

Some polymers described in Greenberg et al. and O'Leary et al. that can be employed in time-temperature indicator embodiments of the invention are shown in Table 2. Such polymers are exemplary of side-chain crystallizable polymers that can be employed in the practice of the invention.

The various columns in Table 2, reading from left to right, show a chemical name for a side-chain crystallizable polymer, and the number of carbon atoms in the side chain of the monomer unit, if the polymer is a homopolymer, or in a first monomer unit if the polymer is a copolymer. The next column shows the proportion of the first monomer unit in the polymer in mole percent, the proportion being 100 for a homopolymer. Subsequent columns show the number of carbon atoms in the side chain of a second monomer unit, if the polymer is a copolymer, and the melting point of the polymer. The side chains are all straight-chain n-alkyl groups having the number of carbon atoms indicated in Table 2.

proportions, of monomer units in the copolymer, as well as the chain lengths of the polymer side chains can be varied to

TABLE 2

Examples of side-chain crystallizable polymers

| n-alkylpolymer | Monomer 1 Carbons | Monomer 1 Percent | Monomer 2 Carbons | Melting Point |
|---|---|---|---|---|
| Acrylic homopolymers | | | | |
| Poly(dodecylacrylate) | 12 | 100 | — | 2° C. |
| Poly(tetradecylacrylate) | 14 | 100 | — | 22° C. |
| Poly(hexadecylacrylate) | 16 | 100 | — | 33° C. |
| Poly(octadecylacrylate) | 18 | 100 | — | 42° C. |
| Acrylic copolymers | | | | |
| Copolymer of hexylacrylate and dodecylacrylate | 6 | 25 | 12 | 7.6° C. |
| Copolymer of hexylacrylate and dodecylacrylate (10 percent molar conversion of monomer) | 6 | 25 | 12 | −6.2° C. |
| Copolymer of hexylacrylate and docosylacrylate | 6 | 25 | 22 | 54.2° C. |
|  |  | 50 |  | 48.7° C. |
|  |  | 75 |  | 34.5° C. |
| Copolymer of decylacrylate and tetradecylacrylate | 10 | 50 | 14 | 3.7° C. |
| Copolymer of decylacrylate and octadecylacrylate | 10 | 25 | 18 | 42.4° C. |
| Copolymer of decylacrylate and octadecylacrylate | 10 | 50 | 18 | 31.1° C. |
| Copolymer of decylacrylate and octadecylacrylate | 10 | 75 | 18 | −1.1° C. |
| Copolymer of dodecylacrylate and docosylacrylate | 12 | 25 | 22 | 56.0° C. |
| Copolymer of dodecylacrylate and docosylacrylate | 12 | 50 | 22 | 45.9° C. |
| Copolymer of dodecylacrylate and docosylacrylate | 12 | 75 | 22 | 12.5° C. |
| Copolymer of tetradecylacrylate and octadecylacrylate | 14 | 25 | 18 | 41.9° C. |
| Copolymer of tetradecylacrylate and octadecylacrylate | 14 | 50 | 18 | 32.7° C. |
| Copolymer of tetradecylacrylate and octadecylacrylate | 14 | 75 | 18 | 25.7° C. |
| Methacrylic homopolymers | | | | |
| Poly(dodecylmethacrylate) | 12 | 100 | — | −34° C. |
| Poly(tetradecylmethacrylate) | 14 | 100 | — | −2° C. |
| Poly(hexadecylmethacrylate) | 16 | 100 | — | 20° C. |
| Poly(octadecylmethacrylate) | 18 | 100 | — | 34° C. |
| Methacrylic copolymers | | | | |
| Copolymer of tetradecylmethacrylate and methyl methacrylate | 18 | 50 | 1 | 0° C. |
| Copolymer of octadecylmethacrylate and methyl methacrylate | 18 | 50 | 1 | 30° C. |
|  |  | 59.5 |  | 32° C. |
|  |  | 69.5 |  | 28° C. |

The data in Table 2 illustrate that numerous side-chain crystallizable polymers are available, or can be prepared, with a wide range of melting points, from which a selection can be made and employed as an indicator material in time-temperature indicators having a desired activation temperature corresponding with the melting point of a selected polymer.

Thus, the polymers in Table 2 exhibit melting points ranging from a low of −34° C. for poly(dodecylmethacrylate) to a high of 56.0° C. for the copolymer of dodecylacrylate and docosylacrylate. The examples of polymers with intermediate melting points are well distributed throughout the range. Polymers with zero and sub-zero melting points can be employed in time-temperature indicators employed for monitoring host products intended to be maintained at zero or sub-zero temperatures.

The data in Table 2 also illustrate how a skilled person can provide a time-temperature indicator embodiment of the invention having a desired activation temperature by adapting the melting point of the indicator material in a number of different ways. For example, the chain length of the polymeric alkyl side chain, or chains, can be varied. Shorter alkyl chains provide lower melting points, and longer chains provide higher melting points.

If desired, the indicator material can comprise a copolymer of two or more monomers and the relative proportion, or proportions, of monomer units in the copolymer, as well as the chain lengths of the polymer side chains can be varied to provide a suitable melting point. As illustrated by the several examples of copolymers of decylacrylate and tetradecylacrylate in Table 2, a higher proportion of a monomer having a longer alkyl chain can provide a higher melting point, whereas a higher proportion of a monomer having a shorter alkyl chain can provide a lower melting point.

Furthermore, in making the polymer, the degree of polymerization of the monomer or monomers employed, can be controlled, thus controlling the molecular weight of the resultant polymer. Also, the degree of conversion of monomer to polymer can be limited, for example, by interrupting the polymerization reaction, as is described in O'Leary et al. The degree of conversion can be calculated as the ratio of the mass of polymer to the total mass of monomer starting material. As an example, the degree of conversion can be limited to be less than one hundred percent to yield a polymer with a melting point different from that of the fully converted polymer. This possibility is illustrated in Table 2 by the copolymer of hexylacrylate and dodecylacrylate. At 100 percent conversion, based on the combined mass of monomers employed, a product having a melting point of 7.6° C. is obtained. At 10 percent conversion, the product has a melting point of −6.2° C.

Another option for adjusting the characteristics of a side-chain crystallizable polymer for use in the practice of the invention is to introduce branching into the polymer structure by including one or more chain transfer agents, or other useful branching agents, in the polymerization process. One example of a suitable chain transfer agent is mercaptoethanol, which can be employed in any suitable proportion, for example, up to about 5 percent by weight based on the weight of monomer, or monomers, employed in the polymerization process. A branched polymer can have a higher melting point than the corresponding unbranched polymer. Also, some branched polymers can have less sharp melting points than the corresponding unbranched polymers, i.e. the melting point range of the branched polymer can be longer than that of the unbranched polymer.

A further option for adjusting the characteristics of a side-chain crystallizable polymer for use in the practice of the invention is to introduce crosslinking into the polymer structure by including one or more crosslinking agents in the polymerization process. A bifunctional acrylic or methacrylic ester, or other suitable compound, can be included in the polymerization process to function as a crosslinking agent and yield a crosslinked polymer product.

By way of example, a side-chain crystallizable polymer can be crosslinked to reduce the melt flow rate, or diffusion rate of the polymer. A relatively low crosslink density, for example from about 0.01 to about 0.09 intermolecular crosslinks per polymer chain, or weight average molecular weight, can be employed.

The presence of crosslinking or branching can reduce the crystallinity of a side-chain crystallizable polymer. Such structure can increase the melting point of the material. Crosslinking can increase the molecular weight of the side-chain crystallizable polymer and the higher molecular weight material can have a narrow melting point peak, as measured by differential scanning calorimetry. With a higher molecular weight, a side-chain crystallizable polymer can be more viscous.

The foregoing possibilities illustrate how the characteristics of a side-chain crystallizable polymer employed in the practice of the invention can be "tuned" to a particular application, in a number of ways. The number of carbon atoms in the side chain or chains can be varied. A copolymer can be employed and the lengths and proportions of the monomer units in the copolymer can be varied. Also, the degree of conversion of the monomer units in the polymerization process can be varied, to vary the molecular weight, or for other purposes, if desired. Moreover, the polymerization process can be modified to yield a polymer product having a controlled degree of branching and/or crosslinking.

For example, a side-chain crystallizable polymer can be crosslinked to reduce the melt flow rate of the polymer. A relatively low crosslink density, for example, from about 0.01 to about 0.09 intermolecular crosslinks per polymer chain, or weight average molecular weight, can be employed.

Side-chain crystallizable polymers useful in the practice of the invention are also described in U.S. Pat. No. 5,156,911 at column 5, lines 67 to column 7, line 13, which disclosure is incorporated by reference herein for all purposes. Some useful side-chain crystallizable polymers, and monomers for preparing side-chain crystallizable polymers, are also available from commercial suppliers, for example, Scientific Polymer Products, Inc., Ontario, N.Y., Sigma-Aldrich, Saint Louis, Mo., TCI America, Portland Oreg., Monomer-Polymer & Dajac Labs, Inc., Trevose, Pa., San Esters Corp., New York, N.Y., Sartomer USA, LLC, Exton Pa., and Polysciences, Inc.

Suitable side-chain crystallizable polymers include polymers and copolymers of methacrylates and acrylates, having linear aliphatic side chains capable of becoming crystalline at a temperature of interest to achieve the objectives of the invention, for example a temperature in the range of from about $-5°$ C. to about $60°$ C. The side chains can have at least 10 carbon atoms, for example from about 10 to about 22 carbon atoms. If desired, the side chains can have up to about 30 or more carbon atoms. Some examples of such polymers include poly(alkylmethacrylates) such as poly(hexadecylmethacrylate) and poly(octadecylmethacrylate), poly(alkylacrylates) such as poly(hexadecylacrylate) and poly(dodecylacrylate), copolymers such as a copolymer of hexadecylacrylate and octadecylmethacrylate, poly(hexyl-co-dodecylacrylate), a copolymer of tetradecylacrylate and octadecylacrylate, a copolymer of hexadecylmethacrylate and octadecylmethacrylate, and a copolymer of tetradecylacrylate and hexadecylacrylate. Mixtures of two or more of any of the side-chain crystallizable polymers described herein can also be employed.

Polymers described herein as having side-chain crystallizability and being useful in the practice of the invention, can any one or more of the temperature response, melting point, or molecular weight parameters described herein as useful in the practice of the invention, in addition to, or alternatively to, side-chain crystallizability.

Some examples of additional polymers useful in the practice of the invention have chains of interconnected monomer units X of formula:

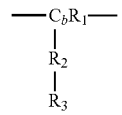

wherein:
$C_b$ is a backbone carbon atom;
$R_1$ is hydrogen, a substituted or unsubstituted hydrocarbon group having up to about six carbon atoms;
$R_2$ is an optional spacer unit; and
$R_3$ is a crystallizable group.
$R_2$ and $R_3$ together make up the side chain of the monomer unit.

Spacer unit $R_2$, if present, can be any suitable organic or inorganic group, for example an ester, amide, hydrocarbon, phenyl, or ethergroup. Optionally, spacer unit $R_2$ can be O, $CH_2$, (CO), O(CO) or $NR_4$, wherein $R_4$ is hydrogen or lower alkyl having from one to about six carbon atoms.

The crystallizable group $R_3$ can be, or can include, an aliphatic group having from 4 to about 30 carbon atoms, an aromatic group having from 6 to about 30 carbon atoms, a linear aliphatic group having at least 10 carbon atoms, a combination of at least one aliphatic group and at least one aromatic group, the combination having from 7 to about 30 carbon atoms, a $C_{14}$-$C_{22}$ acrylate, a $C_{14}$-$C_{22}$ methacrylate, an acrylamide, a methacrylamide, a vinyl ether, a vinyl ester, or a fluorinated aliphatic group having at least 6 carbon atoms, or a p-alkyl styrene group wherein the alkyl group has from about 8 to about 24 carbon atoms.

$R_3$ can be crystallizable or can include a crystallizable region. $R_3$ can be sufficiently crystallizable to provide the polymer a desired degree of crystallinity, as described herein, if desired.

The side chains in a molecule of a side-chain crystallizable polymer employed in the practice of the invention can all be the same, or some side chains can differ from other side chains in the polymer molecule. For example, the side chains can be of two or more different kinds, according to the nature of the monomers from which the polymer is formed. Alternatively, where the side chains differ, the spacer units can differ, or the crystallizable groups can differ or both the spacer units and the crystallizable groups can differ.

The polymer backbone of the side-chain crystallizable polymer can have an organic structure including a series of backbone carbon atoms $C_b$. Backbone carbon atoms $C_b$ can be connected directly to each other. Alternatively, one or more pairs of adjacent backbone carbon atoms $C_b$ can be interconnected through an intervening atom, or atoms, for example, an oxygen atom or the carbon atom or atoms in one, two or three methylene groups.

The polymer backbone can be substituted or unsubstituted and can employ or consist of saturated or unsaturated aliphatic hydrocarbon groups, aromatic hydrocarbon groups, ester groups, ether groups, amide groups, or other suitable organic groups. The side chains can be substituents in any of these groups that incorporates a backbone carbon atom $C_b$.

A side-chain crystallizable polymer employed in the practice of the invention can consist entirely or partially of monomer units X. For example, the polymer can contain from about 50 mole percent to about 100 mole percent of monomer units X.

If the side-chain crystallizable polymer contains less than 100 percent of X monomer units, the balance can be made up of Y monomer units or Z monomer units, or of both Y monomer units and Z monomer units, wherein Y is a polar or nonpolar monomer unit or a mixture of polar and nonpolar monomer units, and wherein Z is a polar monomer unit or a mixture of polar monomer units. A polar Y or Z monomer unit, if present, can include any suitable polar group, for example, an oxy group, a hydroxyl group, a carboxyl group, an ester group, an amine group or an amide group. Some examples of suitable polar monomer units include polyoxyalkylenes, acrylates, hydroxyethylacrylate, acrylamides and methacrylamide.

Some examples of suitable nonpolar "Y" units include linear and branched alkyl and aryl acrylates and methacrylates, alpha olefins, linear and branched alkyl vinyl ether and vinyl esters, maleic esters, itaconic acid esters, acrylamides, styrenes and substituted styrenes, acrylic acid, methacrylic acid and hydrophilic monomers.

Side-chain crystallizable polymers including polar groups, if used in, or as, transport materials that are supported in contact with a transport member in the practice of the invention, can exhibit adhesion to the transport member. Side-chain crystallizable polymers that exhibit limited adhesion can be useful to provide a slower rate of displacement of the indicator material along the transport member, above the activation temperature, if desired.

Side-chain crystallizable polymers employed in the practice of the invention can have any suitable heat of fusion, for example, a heat of fusion of at least about 20 Joule/g, at least about 20 Joule/g, or at least about 40 Joule/g.

Some further examples of polymers useful in time-temperature indicator embodiments of the invention include fluoroacrylate polymers, vinyl ester polymers, acrylamide polymers, substituted acrylamide polymers, maleimide polymers, polyalkylvinylether polymers, polyalkylethylene oxide polymers, polyamino acids, polyisocyanates, polyurethanes, polyesters, polyethers, and p-alkylstyrene polymers, having any one or more of the temperature response, melting point, molecular weight, or side-chain crystallinity parameters described herein as being useful in the practice of the invention.

A time-temperature indicator embodiment of the invention can employ, as transport material, any individual side-chain crystallizable polymer having any one or more of the chemical structural characteristics or physical characteristics that are described herein for indicator materials useful in a time-temperature indicator. The time-temperature indicator can employ a mixture of two or more such side-chain crystallizable polymers, if desired.

The monomer unit of a homopolymeric side-chain crystallizable polymer employed in the practice of the invention can include a side chain which is a straight-chain alkyl group, i.e. an n-alkyl group, if desired. Optionally, the side chain can have an even number of carbon atoms. The monomer unit of the polymer can consist solely of a suitable backbone unit and a single straight-chain alkyl group. Also, the backbone unit can consist solely of a single acrylate group, or of a single methacrylate group, or of another suitable group.

The monomer unit can include one or more groups in addition to a single alkyl group, for example, another alkyl group, optionally, a straight chain alkyl group, that does not adversely affect the crystallizability of the polymer.

Optionally, the monomer unit can include a functional group or functional groups, for example, one or more hydroxyl, halo, amino, nitro, phenyl, or unsaturated groups, located in a side chain, and/or the backbone of the monomer unit.

A copolymeric side-chain crystallizable polymer employed in the practice of the invention can include first monomer units that are similar to a homopolymer monomer unit described herein, if desired. The copolymer can also include second monomer units that are similar to a different homopolymer unit described herein, if desired, or that are unlike the homopolymer monomer units described herein.

Alternatively, the second monomer units can have one or more structural differences from the homopolymer monomer units described herein, for example, a different chain length, branching, a substituent group, unsaturation or one or more other structural differences. All the second monomer units can be similar to one another, if desired. Alternatively, two or more types of second monomer units can be employed, if desired. The different types of second monomer unit, if employed, can differ by chain length, by branching characteristics, by saturation, by substitution, or by one or more other structural characteristics.

Other side-chain crystallizable polymers can also be employed, if desired, some of which are described herein, and others of which will be known or apparent to a person of ordinary skill in the art, in light of this disclosure, or will become known or apparent in the future, as the art develops. Some illustrative and nonlimiting examples of the preparation and characterization of transport materials useful in the practice of the invention follow.

EXAMPLE 1

Stock Poly(hexadecylmethacrylate)

50 g of a solution of 30-35 wt % poly(hexadecylmethacrylate) in toluene (Sigma-Aldrich product number 182109), weight-average molecular weight of about 200,000 g/mol by gel permeation chromatography according to the supplier, is employed as received from the supplier. The toluene is removed by rotary film evaporation with mild heating, at about 50° C., for 3 hours. About 10 g of an opaque white polymeric material is isolated that is solid at room temperature and melts to become a clear viscous liquid when heated. The solid poly(hexadecylmethacrylate) has a melting point, measurable by differential scanning calorimetry, of about 25°

C. Poly(hexadecylmethacrylate) with a lower molecular weight can have a lower melting point, for example, a melting point of about 16° C.-21° C.

10 g of the isolated poly(hexadecylmethacrylate) is melted by heating and 0.1 g (about 1% by weight) of Oil Red O dye (Sigma-Aldrich) is dissolved in the molten poly(hexadecylmethacrylate) to render the molten polymer bright red. About 10 mg of the molten dyed poly(hexadecylmethacrylate) is applied to one end of each of four sample wicks formed of a white wicking material, Whatman, grade 2CHR cellulose paper.

The samples are immediately cooled below the polymer melting point and the red poly(hexadecylmethacrylate) solidifies into a bead at the end of each wick. The wicks are then assembled into white laminated structures each having an opaque outer surface provided with a viewing window, as described with reference to FIGS. 1-3 herein, to yield a set of four time-temperature indicator samples for testing. Each viewing window provides a view of the respective wick at a location about 4-10 mm distant from the red bead of poly(hexadecylmethacrylate).

EXPERIMENT 1

Exposure at Various Temperatures (Example 1 Polymer)

A first one of the four indicator samples prepared in Example 1 is placed in a water bath at 20° C. and is observed at intervals of about 1 week each for a period of 3 months. No advance of the dyed poly(hexadecylmethacrylate) along the wick towards the window is observable at the end of 3 months. The window remains white throughout the test.

A second one of the four indicator samples prepared in Example 1 is placed in a water bath at 30° C. and is observed at intervals of 2 to 5 days each. The dyed poly(hexadecylmethacrylate) advances slowly along the wick towards the window. The window is initially white, remains white for at least 20 days, and turns bright red at the end of about 1 month. The color change from white to bright red occurs rapidly, providing a usefully sharp end point signal.

A third one of the four indicator samples prepared in Example 1 is placed in a water bath at 37° C. and is observed daily. The dyed poly(hexadecylmethacrylate) advances along the wick towards the window more quickly than did the second sample along. The window is initially white, remains white for at least five days, and turns red at the end of about 1 week.

A fourth one of the four indicator samples prepared in Example 1 is placed in a water bath at 30° C. for about 2 weeks. The temperature is then increased to 37° C. The dyed poly(hexadecylmethacrylate) advances slowly along the wick when at 30° C. and more quickly at 37° C. when the polymer has a lower viscosity The window is initially white and turns red at the end of about 17 days when the indicator has been exposed to a temperature of 30° C. for about 14 days and to 37° C. for about three days. Thus, the end point response time for this sample is shorter than for the first indicator sample, but longer than for the third indicator sample, demonstrating that the dyed polymer is responding to cumulative temperature exposure over time. The test is stopped at this point.

Examination of the wicks of the second to fourth samples shows that, in each case, the indicator material exhibits a uniform red appearance on the wick. In contrast, a melted dyed alkane wax traveling along a paper wick exhibits chromatographic separation of the dye, and a non-uniform appearance with lower optical density than the dyed polymer.

EXAMPLE 2

Stock Poly(octadecylmethacrylate)

Example 1 is repeated with the difference that 50 g of a 30-35 wt % solution in toluene of poly(octadecylmethacrylate) (Sigma-Aldrich product number 182338) is used in place of the poly(hexadecylmethacrylate) used in Example 1. According to the supplier, the poly(octadecylmethacrylate) has a molecular weight of about 170,000 g/mol by gel permeation chromatography. The polymer has a melting point, measurable by differential scanning calorimetry, of about 32° C. to 34° C.

Four indicator samples are prepared as described in Example 1, using the polymer described in Example 2, with the difference that no opaque ink is applied to the outside of the indicator. Thus, the entire wick is exposed to view instead of just the window region being visible.

EXPERIMENT 2

Exposure at Various Temperatures (Example 2 Polymer)

The four samples from Example 2 are placed inside water baths, at the temperatures indicated below, with their wicks facing upwards with a web camera disposed to record the progress of the dyed polymer along the wick. The first indicator sample shows no dyed polymer displacement at 20° C. at the end of a period of 3 months.

The second indicator sample shows no dyed polymer displacement at 30° C. at the end of a period of 3 months.

The third indicator sample shows slow dyed polymer movement at 37° C. At the end of about 1 month the position of the dyed polymer is intermediate of the length of the wick, about where the viewing window is located. At the end of 3 months the dyed polymer moves further, almost to the end of the wick.

The fourth indicator sample shows no dyed polymer movement during 2 weeks of exposure at 30° C. When the temperature is increased to 37° C., the dyed polymer begins moving slowly along the wick. At the end of a total elapsed time of 6 weeks (2 weeks at 30° C. and 4 weeks at 37° C.) the dyed polymer reaches the intermediate wick position where the window is located. At this point the bath temperature is lowered to 20° C. At 20° C., the dyed polymer stops advancing. No further displacement is observable while the bath temperature remains at 20° C.

EXAMPLE 3

Synthesized Poly(octadecylmethacrylate)

Poly(octadecyl methacrylate) is prepared according to the method described by O'Leary et al. Octadecyl methacrylate is polymerized in solution in toluene using 2-2'-azobisisobutyronitrile (AIBN) as an initiator at an initiator concentration of 0.2 weight percent based on the weight of the octadecyl methacrylate monomer. The resultant polymer, poly(octadecylmethacrylate), is isolated from the solution by precipitation into methanol and rotary film evaporation as described in Example 1. The polymer has a melting point, measurable by differential scanning calorimetry, of about 32° C.-34° C.

Four indicator samples employing the polymer isolated in Example 3 are prepared and tested as in Experiment 2, with similar results.

EXAMPLE 4

Synthesized Poly(octadecylmethacrylate) Low MW

Poly(octadecylmethacrylate) is prepared and isolated by the method described in Example 3, with the difference that the initiator concentration is increased to 1.0 weight percent of monomer and a chain transfer agent (mercaptoethanol) is added at about 1 percent by weight of monomer during the polymerization. The poly(octadecylmethacrylate) polymer produced has a melting point of about 30-34° C. However, the molecular weight of this polymer is lower than that of the Example 3 polymer. Accordingly, the viscosity of the Example 4 polymer, at any given temperature above the melting point, is lower than that of the Example 3 polymer.

Four indicator samples employing the polymer isolated in Example 3 are prepared and tested using the procedure described in Experiment 2. At a test temperature of 37° C. the Example 4 samples respond more quickly than those of Examples 2 and 3. Webcam images of the indicator samples are captured at appropriate intervals, and analysis of the webcam images shows the dyed polymer of the third indicator sample of Example 4 to advance along the wick substantially faster than does the dyed polymer employed in the equivalent sample of Example 3.

EXAMPLE 5

Synthesized Hexadecylacrylate-Octadecylmethacrylate Copolymer

A random copolymer of hexadecylacrylate and octadecylmethacrylate is prepared according to the method described in O'Leary et al. The melting point of the resultant copolymer is between the melting points of the corresponding homopolymers, i.e. between about 21° C. and about 32° C.

Four time-temperature indicator samples employing the copolymer isolated in Example 5 are prepared and tested using the procedure described in Experiment 2.

Examples 6-13 describe the preparation and characterization of eight polymers, having various molecular weights. Examples 6-8 describe the preparation of three $C_{18}$ methacrylate homopolymers, Examples 9-11 describe the preparation of three $C_{16}$ methacrylate homopolymers, Example 12 describes the preparation of a $C_{14}$ acrylate homopolymer, and Example 13 describes the preparation of a $C_{16}/C_{18}$ methacrylate copolymer.

For each of Examples 6-13, four time-temperature indicator samples employing the polymer isolated in the example are prepared and tested using the procedure described in Experiment 2.

EXAMPLE 6

Synthesized Poly(octadecylmethacrylate) (Higher Molecular Weight)

Isolation. 25 grams of stock poly(octadecylmethacrylate) dissolved in toluene at 30 percent by weight obtained from Sigma Aldrich (St. Louis, Mo.) is isolated by precipitation in 350 mL of cold methanol, with constant agitation in an ice/water bath. The precipitated product is then separated from the precipitation medium by filtration using fluted filter paper. The precipitate is collected and allowed to dry overnight to remove volatiles by evaporation. The dry solid product is then ground to a fine powder using a mortar and pestle, enabling residual volatiles to escape. The molecular weight, as furnished by the supplier is shown in Table 3 herein.

EXPERIMENT 3

Polymer Characterization

The product of Example 6 is characterized by Fourier transform infrared spectrometry using a Perkin Elmer Spectrum 100 FT-IR Spectrometer to verify the to evaluate the purity of the polymer with respect to the presence of monomer. The absence of a peak at about 1600 $cm^{-1}$, which is usually associated with a carbon-carbon double bond indicates the presence of a negligible proportion of monomer, confirming substantially complete conversion of monomer to polymer.

Differential scanning calorimetry (DSC) thermal analysis is performed using a Mettler Toledo DSC822 instrument (Mettler-Toledo Inc., Columbus, Ohio) to determine the melt onset temperature and the melting temperature of the polymer. A sample of about 11.0 mg of the product of Example 6 is analyzed by exposing the sample to three temperature scans: a first scan of heating the sample at a rate of 10° C./minute from 0° C. to 80° C.; a second scan of cooling the sample at a rate of 10° C./minute from 80° C. to 0° C.; and a third scan of heating the sample at a rate of 10° C./minute from 0° C. to 80° C.).

Viscosity measurements are taken at various temperatures in a range of from about 25° C. to 100° C. using a Brookfield LV-E Digital Viscometer with a spindle s63 and a Brookfield THERMOSEL (trademark) (Brookfield Engineering Laboratories, Inc., Middleboro, Mass.) accessory and programmable controller.

The molecular weight is characterized by Impact Analytical (Midland, Mich.) using size exclusion chromatography according to Impact Analytical operating procedure SOP-SEP-004. The samples are analyzed using tetrahydrofuran (THF) as both the solvent and the eluent.

The results for the melting point, molecular weight and temperature-related viscosity characteristics of the polymer product of Example 6 are described in Table 3.

EXAMPLE 7

Synthesized Poly(octadecylmethacrylate) (Intermediate Molecular Weight)

Polymerization. 22 g of toluene is added to a 250 mL multi-neck reaction flask equipped with a water condenser, a temperature probe, a controller, and two separator addition funnels, for slow addition of the initiator and the monomer, respectively, to the reaction flask. The toluene is heated to reflux (110° C.) in the reaction flask using a heating mantle connected to the temperature controller, with agitation provided by an overhead mechanical stirrer.

A monomer feed containing 110 g of octadecylmethacrylate (from Tokyo Chemical Industry, Inc) and 68 g toluene (Sigma Aldrich) is thoroughly purged with a flow of nitrogen, carefully poured into the separator funnel, and then attached to the reaction flask assembly. An initiator feed containing 0.55 g benzoyl peroxide (MKBD1152 from Sigma Aldrich) and 20 g toluene is poured into a side-arm separatory addition funnel, which is then attached to the assembly. Both the monomer and initiator feeds are slowly added into the reaction flask over a period of two hours while the temperature is maintained at reflux (110° C.) under a flow of nitrogen.

After the monomer and initiator have been fed into the reaction flask, the solution is held at reflux for one hour with continued agitation and slow nitrogen purge. After one hour, a first chaser shot of initiator consisting of 0.15 g of benzoyl peroxide dissolved in 2.0 g of toluene is added directly to the reaction flask and the solution is held at reflux for a further hour. A second chaser shot of similar composition to the first is then added, and the solution is held at reflux for a further hour. A third chaser shot of similar composition to the first chaser shot is then added, and the solution is held at reflux for two hours. The solution is then allowed to cool to about 50° C., after which the polymerized product is removed for isolation.

Isolation. The powdered polymer product is isolated using the procedure described in Example 6.

Characterization. The powdered polymer product is characterized by Fourier transform infrared spectrometry analysis as described in Experiment 3, with similar results. The molecular weight, melt onset temperature, melting temperature, and viscosity of the polymer are determined as described in Experiment 3. The results are described in Table 3.

EXAMPLE 8

Synthesized Poly(octadecylmethacrylate) (Lower Molecular Weight)

Polymerization. Polymerization is carried out at a higher concentration, 50 percent solids versus 30 percent employed in Example 7, using a higher proportion of benzoyl peroxide initiator, 1.5 percent versus 0.5 percent, and 0.5 percent of the chain transfer agent 2-mercaptoethanol with a view to obtaining a lower molecular weight polymer having a lower viscosity than the polymer prepared in Example 7.

22 g of toluene is added to a 250 mL multi-neck reaction flask equipped with a water condenser, a temperature probe, a controller, and two separator funnels, for slow addition of the initiator and the monomer, respectively, to the reaction flask. The toluene is heated to reflux (110° C.) in the reaction flask using a heating mantle connected to the temperature controller, with agitation provided by an overhead mechanical stirrer.

A monomer feed containing 110 g of octadecylmethacrylate (Tokyo Chemical Industry, Inc), 68 g toluene (Sigma Aldrich), and 0.55 g of 2-mercaptoethanol (Sigma Aldrich) and an initiator feed containing 20 g toluene and 1.65 g benzoyl peroxide (Sigma Aldrich) are slowly added to the reaction flask over a 2-hr period, using the two separator funnels, while maintaining the temperature at reflux with continual agitation and nitrogen flow.

After adding the monomer feed and initiator feed, a chaser shot of 0.15 g 2,2'-azobis-2-methylpropionitrile (Sigma Aldrich) dissolved in 2.7 g toluene is added to the reaction solution to convert residual monomer. The solution is then held at reflux at 110° C. for one hour. A second chaser shot of similar composition to the first is added and the reaction solution is again held at reflux for one hour. A third, similar, chaser shot is then added and the reaction solution is held at reflux for a further hour. The reaction solution is allowed to rest at room temperature for about 16 hours. The reaction solution is heated to reflux (110° C.) and a fourth chaser shot of similar composition to the first is added, following which the solution is held at reflux at 110° C. for 2 hours. The product is allowed to cool to about 50° C. before isolation of the polymer.

Isolation. The polymer is isolated from the reaction solution by removal of solvent using a Yamato RE200 Rotary Evaporator, a Yamato BM100 Water Bath filled with water, employing a dial setting of 100, to set the water bath temperature to about 92° C., and a rotary vacuum pump operated under full vacuum for about 1.5 hr. The flask containing isolated polymer is cooled for 10 minutes in a dry ice/acetone bath. Once the polymer product solidifies, it is broken up and removed from the flask, ground to a fine powder, then stored at room temperature for subsequent characterization.

Characterization. The powdered polymer product is characterized by Fourier transform infrared spectrometry analysis as described in Experiment 3, with similar results. The molecular weight, melt onset temperature, melting temperature, and viscosity of the polymer are determined as described in Experiment 3. A sample of about 9.5 mg of the polymer is used for the DSC thermal analysis and spindle s18 is used in place of spindle s63 in determining viscosity. The results are described in Table 3.

EXAMPLE 9

Synthesized Poly(hexadecylmethacrylate) (Higher Molecular Weight)

Isolation. 25 grams of stock poly(hexadecylmethacrylate) dissolved in toluene at 30 percent by weight obtained from Sigma Aldrich is isolated by rotary evaporation for about one hour under full vacuum, and a powdered product is obtained, using the procedure and apparatus described in Example 8.

Characterization. The isolated polymer product is characterized by Fourier transform infrared spectrometry analysis by the method described in Experiment 3 with similar results.

The molecular weight, melt onset temperature, melting temperature, and viscosity of the polymer are determined as described in Experiment 3. A sample of about 11.0 mg of the polymer is used for the DSC thermal analysis and spindle s18 is used in place of spindle s63 in determining viscosity. The results are described in Table 3. The molecular weight, as furnished by the supplier is shown in Table 3 herein.

EXAMPLE 10

Synthesized Poly(hexadecylmethacrylate) (Intermediate Molecular Weight)

Polymerization. 22 g of toluene is added to a 250 mL multi-neck reaction flask equipped with a water condenser, a temperature probe, a controller, and two separator addition funnels, for slow addition of the initiator and the monomer, respectively, to the reaction flask. The toluene is heated to reflux (110° C.) in the reaction flask using a heating mantle connected to the temperature controller, with agitation provided by an overhead mechanical stirrer.

A monomer feed containing 110 g of hexadecylmethacrylate (Scientific Polymer Products) and 68 g toluene (Sigma Aldrich), and an initiator feed containing 20 g toluene and 0.55 g 2,2'-azobis-2-methylpropionitrile (Sigma Aldrich) are slowly added to the reaction flask, using the separator funnels, over a period of two hours while the temperature is maintained at reflux (110° C.), under a flow of nitrogen.

After the monomer and initiator have been slowly added to the reaction flask, the solution is held at reflux for one hour. After one hour, a first chaser shot of 0.15 g of 2,2'-azobis-2-methylpropionitrile dissolved in 2.7 g of toluene is added to the reaction flask and the solution is held at reflux for a further hour. A second, similar chaser shot is then added, and the solution is again held at reflux for one hour. A third, similar chaser shot is then added, and the solution is held at reflux (110° C.) for two hours. The solution is removed from the heat and allowed to cool to about 50° C., following which the polymerized product is removed for isolation.

Isolation. The polymerized product is isolated by rotary evaporation for about one hour under full vacuum, and obtained in powdered form, using the procedure and apparatus described in Example 8.

Characterization. The isolated polymer product is characterized by Fourier transform infrared spectrometry analysis by the method described in Experiment 3 with similar results.

The molecular weight, melt onset temperature, melting temperature, and viscosity of the polymer are determined as described in Experiment 3. A sample of about 11.7 mg of the polymer is used for the DSC thermal analysis and spindle s63 is used in determining viscosity. The results are described in Table 3.

EXAMPLE 11

Synthesized Poly(hexadecylmethacrylate) (Lower Molecular Weight)

Polymerization. Polymerization is carried out using 1.5 percent of a benzoyl peroxide initiator versus 0.5 percent azobis-2-methylpropionitrile, and 0.5 percent of the chain transfer agent 2-mercaptoethanol, with a view to obtaining a polymer having a lower molecular weight and lower viscosity than the polymer prepared in Example 7.

22 g of toluene is added to a 250 mL multi-neck reaction flask equipped with a water condenser, a temperature probe, a controller, and two separator addition funnels, for slow addition of the initiator and the monomer, respectively, to the reaction flask. The toluene is heated to reflux (110° C.) in the reaction flask using a heating mantle connected to the temperature controller, with agitation provided by an overhead mechanical stirrer.

A monomer feed containing 110 g of hexadecylmethacrylate (Scientific Polymer Products), 68 g toluene (Sigma Aldrich), and 0.56 g 2-mercaptoethanol (Sigma Aldrich), and an initiator feed containing 40 g toluene and 1.65 g 2,2'-azobis-2-methylpropionitrile (Sigma Aldrich) are slowly added to the reaction flask, using the separator funnels, over a period of two hours while the temperature is maintained at reflux (110° C.), under a flow of nitrogen.

After the monomer and initiator have been slowly added to the reaction flask, the solution is held at reflux for one hour. After one hour, a first chaser shot of 0.13 g of 2,2'-azobis-2-methylpropionitrile dissolved in 2.5 g of toluene is added to the reaction flask and the solution is held at reflux for a further hour. A second, similar chaser shot is then added, and the solution is again held at reflux for one hour. A third, similar chaser shot is then added, and the solution is held at reflux (110° C.) for one hour. A fourth, similar chaser shot is then added, and the solution is held at reflux (110° C.) for two hours. The solution is removed from the heat and allowed to cool to about 50° C., following which the polymerized product is removed for isolation.

Isolation. The polymerized product is isolated by rotary evaporation for about one hour under full vacuum, and obtained in powdered form, using the procedure and apparatus described in Example 8.

Characterization. The isolated polymer product is characterized by Fourier transform infrared spectrometry analysis by the method described in Experiment 3 with similar results.

The molecular weight, melt onset temperature, melting temperature, and viscosity of the polymer are determined as described in Experiment 3. A sample of about 9.3 mg of the polymer is used for the DSC thermal analysis and spindle s18 is used in place of spindle s63 in determining viscosity. The results are described in Table 3.

EXAMPLE 12

Synthesized Poly(tetradecylacrylate) (Low Molecular Weight)

Polymerization. 22 g of toluene is added to a 250 mL multi-neck reaction flask equipped with a water condenser, a temperature probe, a controller, and two separator addition funnels, for slow addition of the initiator and the monomer, respectively, to the reaction flask. The toluene is heated to reflux (110° C.) in the reaction flask using a heating mantle connected to the temperature controller, with agitation provided by an overhead mechanical stirrer.

A monomer feed containing 110 g of tetradecylacrylate (Tokyo Chemical Industry, Co., Portland, Oreg.), 68 g toluene, and 0.59 g 2-mercaptoethanol, and an initiator feed containing 20 g toluene and 1.65 g benzoyl peroxide are slowly added to the reaction flask, using the separator funnels, over a period of two hours, with continuous agitation, while the temperature is maintained at reflux (110° C.), under a flow of nitrogen.

After the monomer and initiator feeds have been slowly added to the reaction flask, the solution is held at reflux for one hour. After one hour, a first chaser shot of 0.13 g of 2,2'-azobis-2-methylpropionitrile dissolved in 2.9 g of toluene is added to the reaction flask and the solution is held at reflux for a further hour. A second, similar chaser shot is then added, and the solution is again held at reflux for one hour. A third, similar chaser shot is then added, and the solution is again held at reflux for one hour. A fourth, similar chaser shot is then added, and the solution is held at reflux for two hours. The solution is removed from the heat and allowed to cool to about 50° C., following which the polymerized product is removed and staged for isolation.

Isolation. The polymerized product is isolated by rotary evaporation for about 1.5 hr under full vacuum, and obtained in powdered form, using the procedure and apparatus described in Example 8.

Characterization. The isolated polymer product is characterized by Fourier transform infrared spectrometry analysis by the method described in Experiment 3 with similar results.

The molecular weight, melt onset temperature, melting temperature, and viscosity of the polymer at temperatures in a range of from about 30° C. to about 100° C. are determined as described in Experiment 3. A sample of about 8.4 mg of the polymer is used for the DSC thermal analysis and spindle s18 is used in determining viscosity. The results are described in Table 3.

EXAMPLE 13

Synthesized Hexadecylmethacrylate-Octadecylmethacrylate Copolymer

Polymerization. 22 g of toluene is added to a 250 mL multi-neck reaction flask equipped with a water condenser, a temperature probe, a controller, and two separator addition funnels, for slow addition of the initiator and the monomer, respectively, to the reaction flask. The toluene is heated to reflux (110° C.) in the reaction flask using a heating mantle connected to the temperature controller, with agitation provided by an overhead mechanical stirrer.

A monomer feed containing 55 g of hexadecylmethacrylate, 55 g octadecylmethacrylate, 68 g toluene, and 0.58 g 2-mercaptoethanol, and an initiator feed containing 40 g toluene and 1.65 g 2,2'-azobis-2-methylpropionitrile are slowly added to the reaction flask, using the separator funnels, over a Table 3 shows the isolation method, the melt onset temperature, the melt peak temperature, the viscosity range, i.e. high, medium or low, the range of viscosities obtained, the temperature range in which the viscosities are obtained, and the molecular weights obtained for the polymer products of Examples 6-13. Higher viscosities are obtained at lower temperatures and vice versa.

TABLE 3

Physical Properties of Polymers Prepared in Examples 6-13

| Sample | Isolation Method | Melt Onset | Melt Peak | Viscosity Range Viscosity in cP Temperature | Molecular Weight (Mw) |
|---|---|---|---|---|---|
| Ex. 6 $C_{18}$ polymer | Precipitation | 29° C. | 33° C. | High 10,000 to 60,000 40° C. to 100° C. | 170,000 |
| Ex. 7 $C_{18}$ polymer | Precipitation | 32° C. | 36° C. | Medium 1500 to 28,000 40° C. to 100° C. | 64,200 |
| Ex. 8 $C_{18}$ polymer | Rotary Evaporation | 38° C. | 42° C. | Low 200 to 1900 40° C. to 100° C. | 15,700 |
| Ex. 9 $C_{16}$ polymer | Precipitation | 13° C. | 18° C. | High 9000 to 58,000 40° C. to 100° C. | 200,000 |
| Ex. 10 $C_{16}$ polymer | Rotary Evaporation | 18° C. | 22° C. | Medium 600 to 12,000 40° C. to 100° C. | 33,500 |
| Ex. 11 $C_{16}$ polymer | Rotary Evaporation | 20° C. | 25° C. | Low 100 to 1,500 40° C. to 100° C. | 8,700 |
| Ex. 12 $C_{14}$ polymer | Rotary Evaporation | 15° C. | 20° C. | Low 60 to 900 30° C. to 100° C. | 11,100 |
| Ex. 13 $C_{16}/C_{18}$ copolymer | Rotary Evaporation | 26° C. | 31° C. | Low 100 to 3,500 30° C. to 100° C. | 10,300 | period of two hours, with continuous agitation, while the temperature is maintained at reflux (110° C.), under a flow of nitrogen.

After the monomer and initiator feeds have been slowly added to the reaction flask, the solution is held at reflux for one hour. After one hour, a first chaser shot of 0.13 g of 2,2'-azobis-2-methylpropionitrile dissolved in 2.7 g of toluene is added to the reaction flask and the solution is held at reflux for a further hour. A second, similar chaser shot is then added, and the solution is again held at reflux for one hour. A third, similar chaser shot is then added, and the solution is again held at reflux for one hour. The solution is allowed to sit at room temperature overnight. the following day, after about 16 hours, a fourth, similar chaser shot is then added, and the solution is held at reflux for about two hours. The product is allowed to cool to about 50° C., and then staged for isolation.

Isolation. The polymerized product is isolated by rotary evaporation for about one hour under full vacuum, and is obtained in powdered form, using the procedure and apparatus described in Example 8.

Characterization. The isolated polymer product is characterized by Fourier transform infrared spectrometry analysis by the method described in Experiment 3 with similar results.

The molecular weight, melt onset temperature, melting temperature, and viscosity of the polymer at temperatures in a range of from about 30° C. to about 100° C. are determined as described in Experiment 3. A sample of about 10.3 mg of the polymer is used for the DSC thermal analysis and spindle s18 is used in determining viscosity. The results are described in Table 3.

Figure 9:
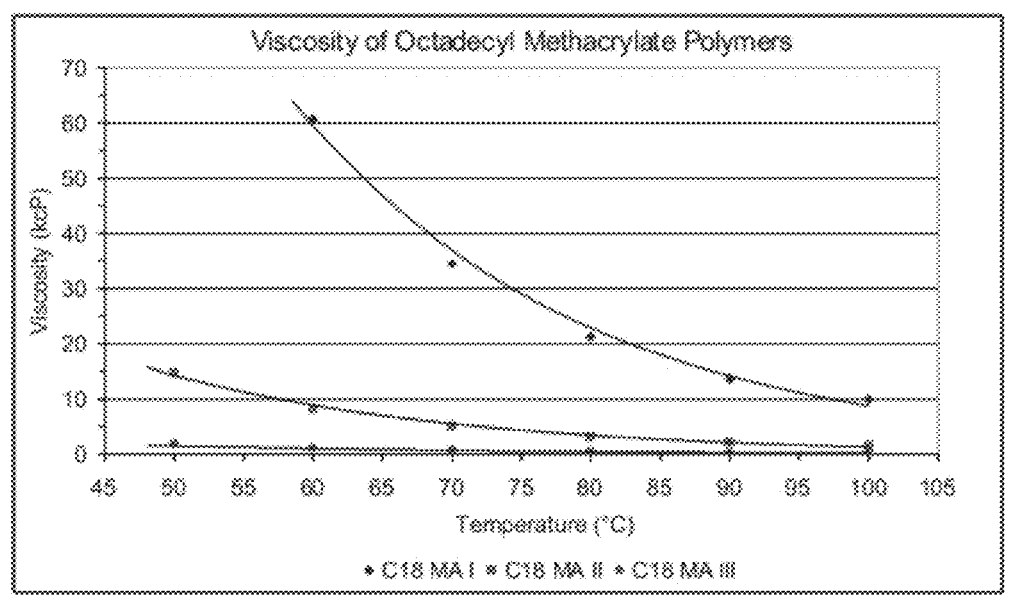
FIG. 9 shows temperature-viscosity curves for three synthetic polymeric materials useful in the practice of the invention.

FIG. 9 shows temperature-related viscosity curves for three octadecylmethacrylate homopolymers that can be prepared by the methods described in Examples 6-8. The viscosity curves can be obtained using the procedure described in Experiment 3.

As shown in FIG. 9, the Example 6 homopolymer, which has a relatively high molecular weight of about 170,000 Da, exhibits a relatively high viscosity of about 60,000 cP at a temperature of about 60° C. As the temperature increases, the viscosity of the Example 6 homopolymer decreases and is about 10,000 cP at about 100° C.

The Example 7 homopolymer, which has an intermediate molecular weight of about 64,200 Da, exhibits an intermediate viscosity of about 28,000 cP at a temperature of about 40° C. As the temperature increases, the viscosity declines substantially, and is about 9,000 cP at about 60° C. At 100° C., the viscosity of the Example 7 homopolymer has a relatively low value of about 1,500 cP.

The Example 8 homopolymer, which has a relatively low molecular weight of about 15,700 Da, exhibits a relatively low viscosity of about 1,900 cP at about 35° C. The viscosity also declines with increasing temperature and is about 800 cP at about 60° C., and about 200 cP at about 100° C.

Figure 10:
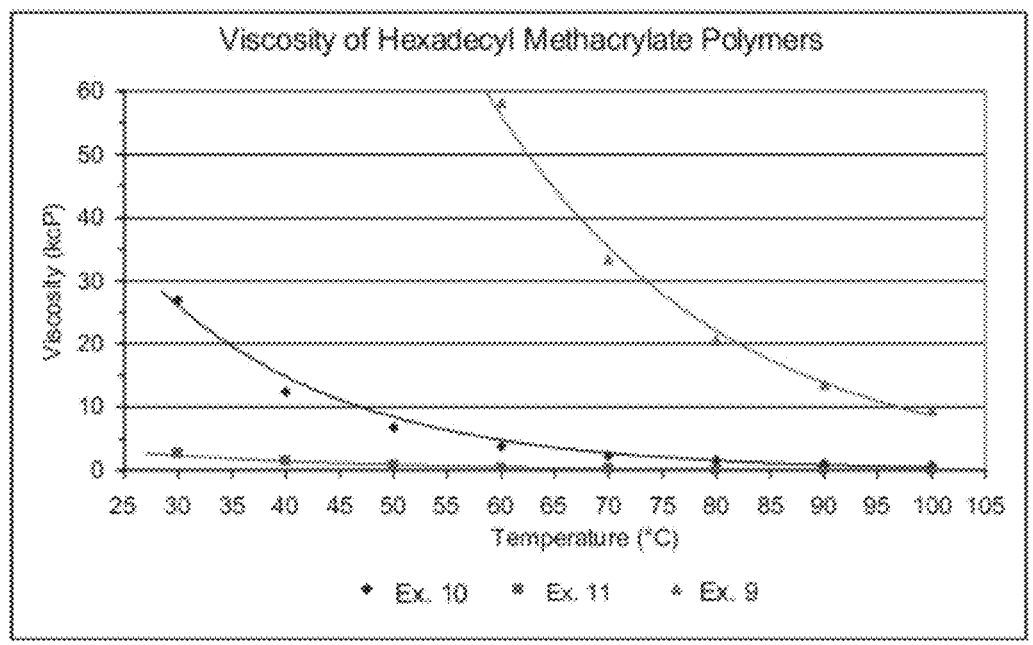
FIG. 10 shows temperature-viscosity curves for three further synthetic polymeric materials useful in the practice of the invention.

FIG. 10 shows temperature-related viscosity algorithms for three hexadecylmethacrylate homopolymers that can be prepared by the methods described in Examples 9-11. The viscosity curves can be obtained using the procedure described in Experiment 3. As shown in FIG. 10, the Example 9 homopolymer, which has a relatively high molecular weight of about 200,000 Da, exhibits a relatively high viscosity of about 58,000 cP at a temperature of about 60° C. As the temperature increases, the viscosity of the Example 9 homopolymer decreases and is about 9,000 cP at about 100° C.

The Example 10 homopolymer, which has an intermediate molecular weight of about 33,500 Da, exhibits an intermediate viscosity of about 12,000 cP at a temperature of about 40° C. The viscosity decreases substantially to about 3,000 cP as the temperature increases to about 60° C. At 100° C. the viscosity has a relatively low value of about 1,000 cP.

The Example 11 homopolymer, which has a relatively low molecular weight of about 8,700 Da, exhibits a relatively low viscosity of about 1,500 cP at about 40° C., As the temperature increases, the viscosity of the Example 11 homopolymer also decreases and is about 300 cP at about 60° C., and is somewhat lower at 100° C.

The temperature-viscosity curves shown in FIGS. 9 to 13 for the polymers of Examples 6-13 are all smooth curves, free of discontinuities or inflexions in temperature ranges of interest that appear to relate viscosity with temperature in a predictable manner.

Figure 11:
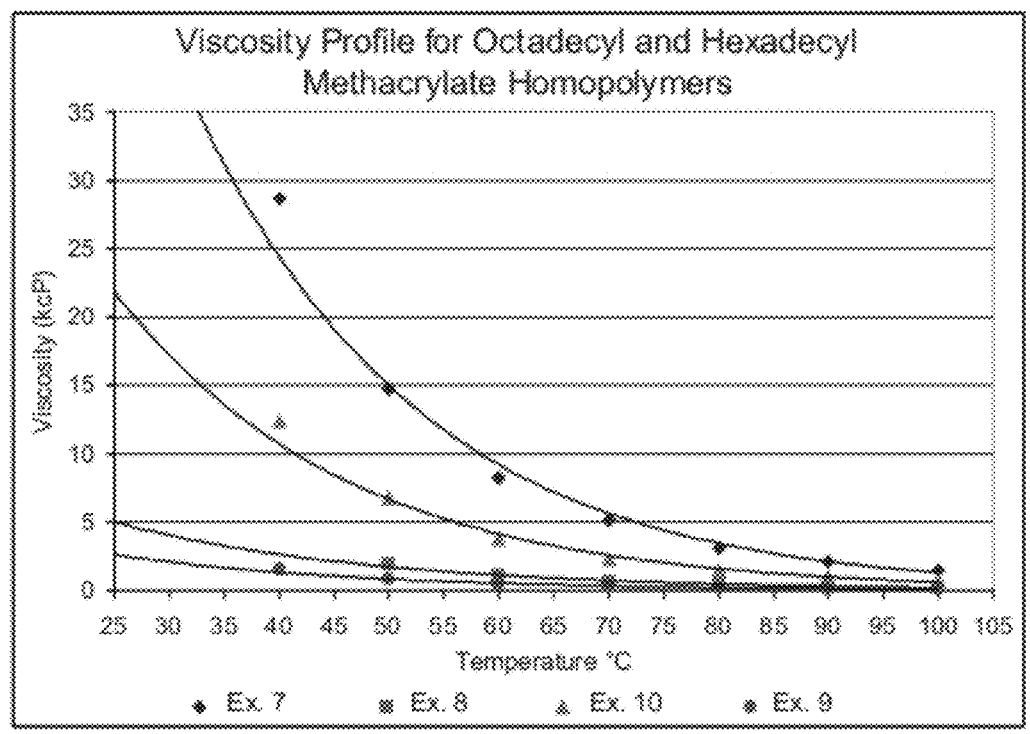
FIG. 11 shows portions of four of the temperature-viscosity curves shown in FIGS. 9 and 10 to a larger scale.

FIG. 11 employs a larger scale for viscosity on the y-axis. FIG. 11 shows temperature-viscosity curves for the intermediate and lower molecular weight homopolymers of Examples 6, 7, 9 and 10 with this larger y-axis scale, enabling the temperature-viscosity characteristics of these particular polymers to be better understood. The homopolymers of Examples 8 and 11, which have relatively high viscosities, are omitted from FIG. 11.

The temperature-viscosity curves shown in FIGS. 9-11 for Examples 6, 7, 9 and 10 illustrate indicator material behavior that can be useful in time-temperature indicator embodiments of the invention. Each example exhibits a viscosity that progressively decreases with increasing temperature throughout a temperature range of interest, for example, a range of from 25° C. to 60° C., to 70° C., or to a higher temperature, or a range of from 35° C. to 60° C. A number of other temperature ranges within which the viscosity of a sample decreases with increasing temperature can be read from FIG. 11, also. Each curve shown in FIG. 11 declines smoothly and predictably throughout a temperature range of interest, between viscosities that can provide useful flow rates on a transport member, for example, any of the wick members illustrated in the accompanying drawings.

The curves shown in FIG. 11 suggest that each of the polymers of Examples 6, 7, 9 and 10 can be useful for monitoring cumulative temperature changes over time by reading or recording the flow of the polymer on or through a support such as a transport member. At lower temperatures, each polymer has a higher viscosity and will flow more slowly. At higher temperatures, each polymer has a lower viscosity and will flow more quickly. Thus, the distance each polymer advances on or through the support is indicative of the sum of the exposure time at each temperature that the time-temperature indicator experiences during a time frame of interest, for example, the time from the manufacture, or initial distribution, of a commercial host product to the purchaser, or user, of the product. The polymers of Examples 6, 7, 9 and 10 each appear to be useful as indicator materials, or as components of indicator materials, in time-temperature indicator embodiments of the invention.

Figure 12:
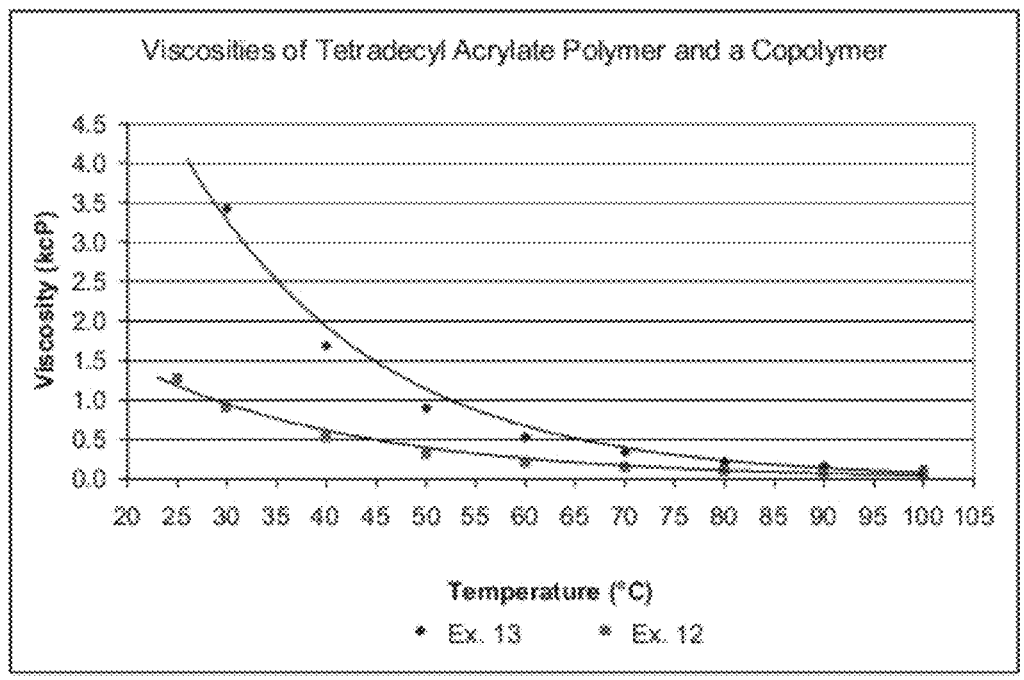
FIG. 12 shows temperature-viscosity curves for two more synthetic polymeric materials useful in the practice of the invention.

FIG. 12 shows temperature-related viscosity curves for a tetradecylacrylate homopolymer prepared by the method described in Example 12 and for a copolymer of hexadecylmethacrylate and octadecylmethacrylate prepared by the method of Example 13. The viscosity curves can be obtained using the procedure described in Experiment 3. A larger scale is used for viscosity on the y-axis, than in some other figures covering a range of 0 to 4.5 kcP, i.e. 0 to 4,500 cP.

As shown in FIG. 12, the Example 12 polymer, which has a relatively low molecular weight of about 11,100 Da, exhibits a viscosity of about 1,269 cP at about 25° C. As the temperature increases, the viscosity of the Example 12 polymer decreases and is about 534 cP at about 40° C., and about 62 cP at about 100° C.

Also in FIG. 12, the Example 13 copolymer, which also has a relatively low molecular weight of about 10,300 Da, exhibits a viscosity of about 3,420 cP at about 30° C. As the temperature increases, the viscosity of the Example 13 copolymer decreases and is about 1,690 cP at about 40° C., and about 114 cP at about 100° C.

Figure 13:
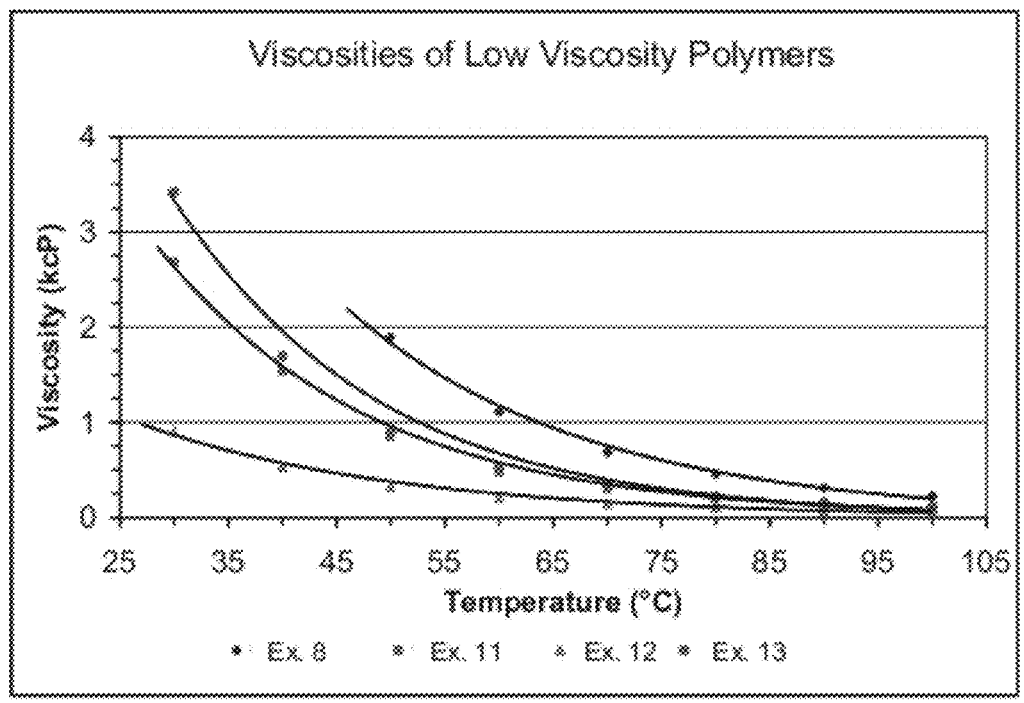
FIG. 13 shows portions of four of the temperature-viscosity curves shown in FIGS. 9, 10 and 12 to a larger scale.

FIG. 13 also uses a larger viscosity scale, covering a range of from 0 to 4 kcP in this figure, and brings the temperature-viscosity graphs of the low-viscosity hexadecylmethacrylate polymer of Example 9 and the low-viscosity octadecylmethacrylate polymer of Example 11 together with the Example 12 polymer and the Example 13 copolymer, for comparison.

The graphs in FIG. 13 show that the viscosity of the Example 8 polymer (poly(octadecylmethacrylate)) is greater than that of any of the other three polymers throughout the temperature range examined. The viscosity of the Example 13 copolymer is initially greater and is then close to that of the Example 11 polymer (poly(hexadecylmethacrylate)). The viscosity of the Example 12 polymer (poly(tetradecylacrylate)) is less than that of any of the other three polymers throughout most of the temperature range examined.

EXPERIMENT 4

Exposure to Two Temperatures (Example 11 Polymer)

A sample of the low molecular weight poly(hexadecyl methacrylate) product of Example 11 is conditioned at a temperature of 15° C. The procedure of Experiment 1 is repeated with this sample with the difference that the temperature of the water bath is set to 35° C. for an initial period of about 3.5 hr and is then raised to a temperature of 50° C. for about 3.5 hr. The distance traveled by the polymer along the wick is observed at various time intervals and recorded. The results are shown in FIG. 14.

Figure 14:
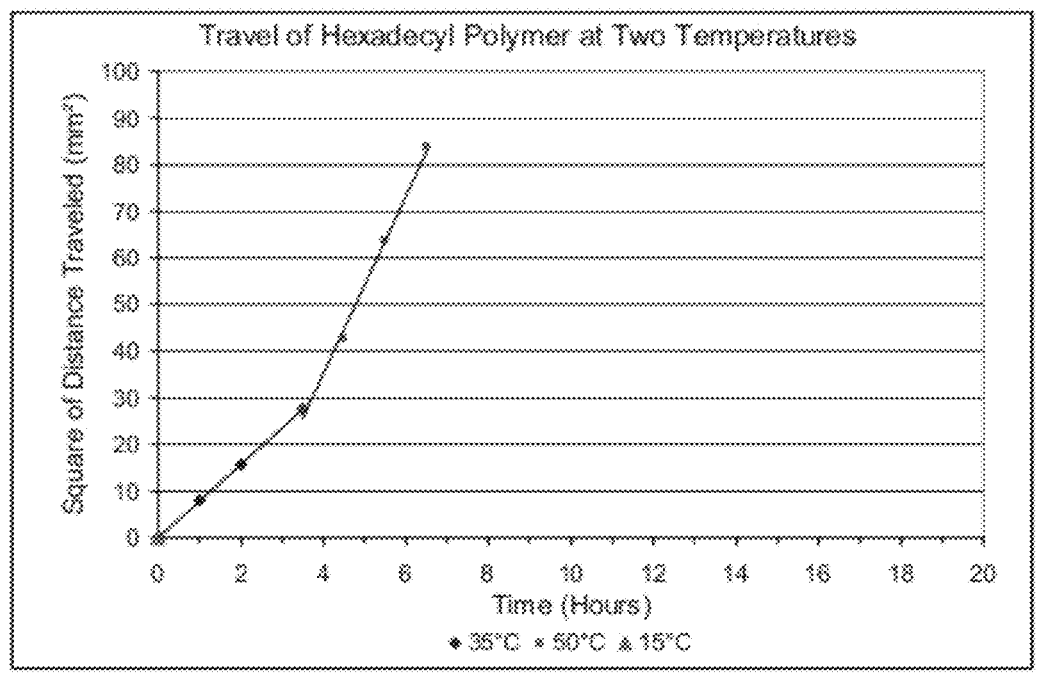
FIG. 14 shows a plot of the square of the distance traveled versus time at various temperatures for one of the synthetic polymeric materials for which temperature-viscosity curves are shown in FIG. 9.

Referring to FIG. 14, the square of the distance traveled on the y-axis is plotted against time on the x-axis for the Example 11 polymer examined in Experiment 4, yielding a straight line that changes in slope at the point where the temperature is increased. FIG. 14 illustrates that the square of the displacement of the polymer along the wick, i.e. the distance traveled, can be proportional to time, independently of temperature.

Figure 15:
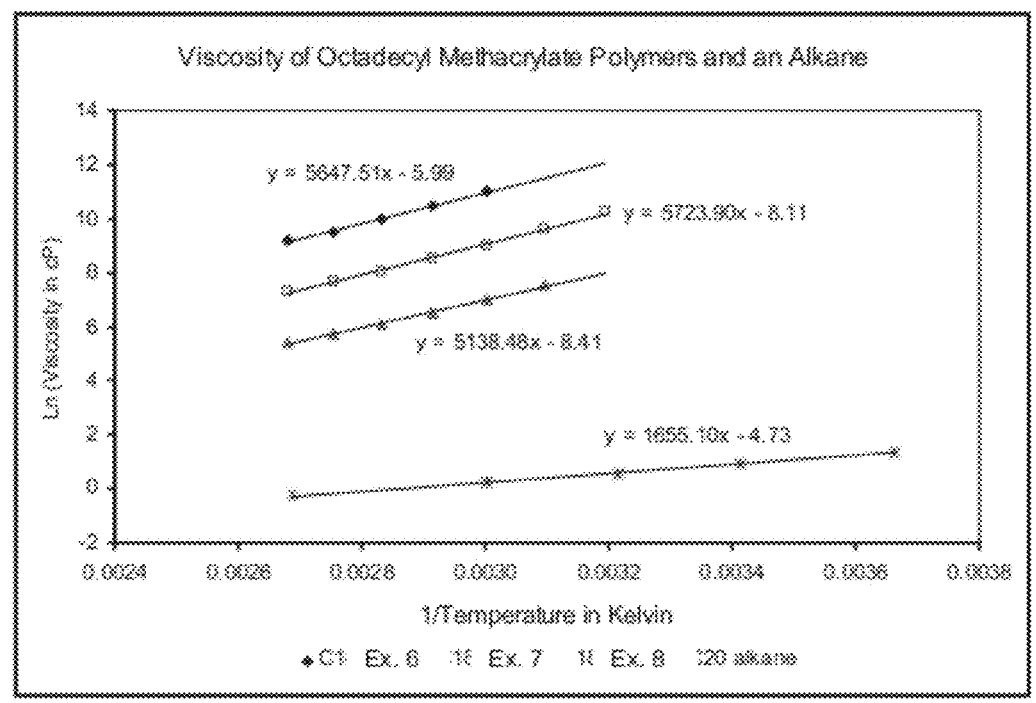
FIG. 15 shows logarithmic plots of viscosity against the reciprocal of temperature for the three synthetic polymeric materials for which temperature-viscosity curves are shown in FIG. 9, and for an alkane wax, for comparative purposes.

The graphs shown in FIG. 15 illustrate some differences in temperature-related viscosity properties that can be exhibited between indicator materials such as the side-chain crystallizable polymers of Examples 6, 7 and 8, and, for comparison, an alkane.

Referring to FIG. 15, the reciprocal of temperature in kelvin is plotted on the x-axis in a range of from 0.0024/K to 0.0038/K. The temperatures corresponding to these reciprocal values are about 417 K (143.5° C.) and about 263 K (−10° C.). The natural logarithm, to the base e of the viscosity in centipoise is plotted on the y-axis. Four graphs are shown, one for each of the four indicator materials.

The three uppermost graphs plot changes in liquid state viscosity with temperature for each of the Examples 6, 7 and 8 polymers, respectively, reading down from the top of the figure. The temperature-viscosity data points shown for Examples 6, 7 and 8 are the same as appear in FIG. 9. The graphs commence, on the x-scale, approximately at 0.0027, which is the reciprocal of 373 K, about 100° C., and terminate approximately at 0.0032, which is the reciprocal of 313 K, about 40° C. As shown in Table 3, the melting points are, respectively, for the Example 6 polymer, 33° C., for the Example 7 polymer, 36° C., and for the Example 8 polymer, 42° C.

The lowermost graph in FIG. 15 plots changes in the liquid state viscosity with temperature for the $C_{20}$ alkane, icosane, melting point 36.7° C. The data points for icosane are as shown in Table 3, column 5, rows 6-10 of Lee et al. Bull. Korean Chem. Soc. 2003, vol. 24, no. 11 "Viscosity and Diffusion Constants Calculation of n-alkanes by Molecular Dynamics Simulation" ("Lee et al." herein), and the icosane graph corresponds with the third graph from the top of the figure in FIG. 6 of Lee et al. The icosane graph also commences on the x-scale at approximately 0.0027, which is the reciprocal of 373 K, about 100° C., and terminates approximately at 0.0037, which is the reciprocal of 270 K, about −3° C. The values beyond 0.0032 (reciprocal of 311 K (38° C.)) appear to be theoretical extrapolations to temperatures below the melting temperature of icosane, and are not of interest. Also appearing in FIG. 15, adjacent each graph, is a linear equation describing the relationship between the x coordinate and the y coordinate for each graph. The viscosity activation energy for each polymer and the alkane can be obtained in kcal/mol by multiplying each x numerator by a conversion factor of 0.001987. The so-calculated viscosity activation energies are shown in Table 4, together with viscosity and melting point data for each of the four indicator materials. The viscosity data in Table 4 for the Examples 6-8 polymers are for the lowest and highest data points plotted for the respective graph in FIG. 15. The viscosity data for icosane are for the lowest data point plotted for the corresponding graph and for an x value of 0.0032 (reciprocal of 311 K (38° C.)).

TABLE 4

Physical Properties of Examples 6-8 Polymers Compared with an Alkane (Icosane)

| Indicator Material | Molecular Weight (Mw) | Melting Temp. | Viscosity (cP) High | Viscosity (cP) Low | Viscosity Activation Energy (kcal/mole) |
|---|---|---|---|---|---|
| Ex. 6 | 170,000 | 33° C. | 60,790 | 10,010 | 11.2 |
| Ex. 7 | 64,200 | 36° C. | 28,670 | 1,500 | 11.4 |
| Ex. 8 | 15,700 | 42° C. | 1,892 | 226 | 10.2 |
| Icosane | 282.5 | 36.7° C. | 1.79 | 0.767 | 3.3 |

All four graphs in FIG. 15 show viscosity increasing with the temperature reciprocal plotted on the x-axis, which is consistent with the decrease in viscosity with temperature shown in FIGS. 9-11. However, the viscosity for the alkane, icosane, is much lower than the polymer viscosities and remains under 5 cP.

As shown by the lowermost graph in FIG. 15, the liquid state viscosity of icosane changes little with temperature, decreasing modestly from a high value of 1.79 cP at a temperature of 38° C. to a low value of 0.767 cP as the reciprocal of temperature increases.

The data in Table 4, and FIG. 15, show that each of the polymers of Examples 6, 7 and 8 have viscosities that can change substantially with temperature. This property enables the polymers to be used as indicator materials to monitor and/or record cumulative time-temperature exposure, with reasonable accuracy, over a range of temperatures, by geometric displacement of the molten indicator material. Each polymer shows a comparatively large difference between its high and its low viscosity values, the difference being in excess of 1,600 cP for the Example 8 polymer, and being several tens of thousand cP for each of the polymers of Examples 6 and 7.

The viscosity activation energy is a useful indicator of the rate of change of viscosity with temperature. Viscosity activation energies for the four indicator materials, calculated as described herein, are shown in the last column of Table 4.

In contrast to the polymers of Examples 6, 7 and 8, the viscosity of the exemplary alkane, icosane, changes little with temperature, showing a difference of only about one cP between the high value and the low value. This viscosity difference is at least three orders of magnitude less than the viscosity differences shown by the polymers of Examples 6, 7 and 8. This difference between the alkane, icosane, and the polymers of Examples 6, 7 and 8 is reflected in the viscosity activation energy for icosane, 3.3 kcal/mol, which is much lower than the values for the polymers of Examples 6, 7 and 8, which are all above 10 kcal/mol.

These data suggest that the ability of liquid icosane to monitor and/or record cumulative time-temperature exposure quantitatively, with reasonable accuracy, over a range of temperatures, by geometric displacement of liquid indicator material would be comparatively limited.

The particularly low viscosity icosane exhibits at all temperatures examined suggests that liquefied icosane may advance relatively rapidly on a transport member and may have only limited ability to monitor/and or record temperature exposure over some longer time intervals. In addition, the small change in viscosity with temperature shown by icosane suggests that liquefied icosane may show a relatively small difference in geometric displacement on a transport member at different temperatures, and may thus have a limited ability to monitor/and or record cumulative time-temperature exposure, over some wider temperature ranges, quantitatively, and with reasonable accuracy. Further, the apparent limits on the ability of icosane to monitor and/or record heat exposures over some longer ranges of time or wider ranges of temperature, also suggest a limited ability of icosane to monitor and/or record larger cumulative time-temperature exposures, quantitatively, with reasonable accuracy.

Lee et al. also describe temperature-viscosity relationships and activation energies for several other alkanes, namely dodecane ($C_{12}$), dotriacontane ($C_{32}$), and tetratetracontane ($C_{44}$). Tetratetracontane, with a viscosity of 27.8 cP at 311 K, exhibits the highest viscosity described by Lee et al. as well as the largest difference from its low viscosity (6.21 cP) at 373 K, namely 21.6 cP, and the highest viscosity activation energy of the four alkanes for which Lee et al. gives data, namely 5.36 kcal/mol.

However, these values are also substantially smaller than those for the polymers of Examples 6, 7 and 8 These lower values suggest that the usefulness of tetratetracontane, and the other alkanes described by Lee et al., as indicator materials in cumulative time-temperature indicators, may be limited.

EXPERIMENT 5

Constant Temperature Exposure of a Copolymer and an Alkane Wax

For some commercial purposes, a time-temperature indicator that provides little or no response to ordinary room temperatures, and that can signal the elapse of a cumulative time-temperature exposure equivalent to exposure to a temperature of about 35° C. for 7 hr, can be useful.

In this experiment, a side-chain crystallizable polymer, the hexadecylmethacrylate-octadecylmethacrylate copolymer prepared in Example 13, and an alkane wax are tested for their usefulness as indicator materials that can meet this criterion.

In Experiment 5, ten temperature-activated time-temperature indicator samples are prepared by applying 9.5 mg of a red-dyed polymer to each of ten paper wicks, following the procedure described in Experiment 1. 9.5 mg of the hexadecylmethacrylate-octadecylmethacrylate copolymer prepared in Example 13 are used to provide good flow characteristics on the wick, without excess. The polymer has a melting temperature of 26° C. and a molecular weight of 10,300 Da. When exposed to a constant temperature of about 35° C., for 7 hr, the dyed polymer travels an average distance of about 6 mm along each paper wick supporting it. Thus, a time-temperature indicator employing the dyed Example 13 copolymer, and configured with the dyed Example 13 copolymer placed on a wick about 6 mm from a viewing window, would apparently have a response time at 35° C. of about 7 hr. After 7 hr, the dyed polymer can be expected to appear in the viewing window, signaling the elapse of the designated, or predetermined, time-temperature indicator exposure.

In general, alkane waxes having melting points at temperatures of interest for time-temperature indicator embodiments of the invention have a lower viscosity and a significantly greater wicking rate (the rate of travel along a wick), than a side-chain crystallizable polymer having a comparable melting point. Thus, n-octadecane has a melting temperature of 27° C., which is reasonably close to the 26° C. melting temperature of the Example 13 copolymer, and is therefore selected for use as a comparative indicator material in this experiment. However, a 9.5 mg aliquot of n-octadecane, when deposited on one of the sample wicks employed in this experiment, and maintained at 35° C., can overrun, or flood, a 6 mm long channel relatively quickly, for example, in 2-3 hr, because octadecane has a relatively low viscosity when melted.

Other alkane waxes that may provide different wicking rates may have melting temperatures rendering them unsuitable for the described commercial objective. For example, n-heptadecane, which has one less carbon atom than n-octadecane, has a melting temperature of 21° C., and n-nonadecane, which has one more carbon atom than n-octadecane, has a melting temperature of 32-34° C. These melting temperatures are significantly different from the 26° C. melting temperature of the Example 13 copolymer.

Because n-octadecane has a relatively high wicking rate, for comparative test purposes, the quantity of indicator material employed is reduced, and the travel distance to the viewing window is increased, in an attempt to simulate with an alkane wax indicator response characteristics similar to those of the Example 13 copolymer. Accordingly, ten alkane wax samples are prepared by applying 1.5 mg of n-octadecane to each of ten paper wicks, following the procedure described in Experiment 1, including dyeing the alkane wax red for visibility.

The alkane wax and polymer samples are tested under similar conditions in a Hart Scientific water bath with the temperature controlled to maintain 35° C. The progress of the dyed polymer along the wicks is recorded with a web camera at suitable time intervals over about seventy-two hours. The average rates of travel of the alkane wax samples and the polymer samples are plotted from the camera images in units of distance squared versus time. The results are shown graphically in FIG. 16.

Average times in hours, for each group of ten samples to travel three distances, 4.0 mm, 6.1 mm and 8.2 mm, are shown in Table 5. The standard deviations and relative standard deviations ("RSD"), are also shown in Table 5, for each of the three travel distances. The relative standard deviation is the standard deviation expressed as a percentage of the mean of the individual travel distances of the ten samples in a group.

TABLE 5

| Times to Travel Fixed Distances | | | | | | |
|---|---|---|---|---|---|---|
| Travel | Average (hr.) | | Standard. Deviation | | RSD (%) | |
| Distance (mm) | Polymer | Alkane Wax | Polymer | Alkane Wax | Polymer | Alkane Wax |
| 4.0 | 1.5 | 0.75 | 0.3 | 0.5 | 22 | 67 |
| 6.1 | 7.0 | 3.5 | 1.6 | 1.6 | 23 | 46 |
| 8.2 | 16.0 | 7.0 | 2.2 | 3.5 | 14 | 51 |

Referring to Table 5, the data show that the alkane wax samples, using 1.5 mg of octadecane, yield the same average response time, 7 hr, traveling over a distance of 8.2 mm, as the polymer samples yield using 9.5 mg of hexadecylmethacrylate-octadecylmethacrylate copolymer traveling over a distance of 6.1 mm.

At 6.1 mm, the polymer standard deviation is the same as that of the alkane wax. At 4 mm and 8.2 mm the polymer standard deviations are much lower than those of the alkane wax, showing less variability in the distances traveled by the individual polymer samples. The relative standard deviations in the last two columns of Table 5 show the greater variability of the alkane wax results, versus the polymer results, more clearly. At each distance, the polymer relative standard deviation is much lower than the alkane wax relative standard deviation, being about half as much for the 6.1 mm distance and less than a third as much for the 4 mm and 8.2 mm distances. In this test, the polymer samples appear to respond with less variability and, therefore, greater consistency between samples, than do the alkane wax samples.

Accordingly, time-temperature indicators employing the tested polymer would appear to perform with significantly more consistency between samples than would time-temperature indicators employing the tested alkane wax. Low variability and good consistency from one unit to the next can be commercially valuable attributes of a time-temperature indicator. The relatively high variability of the alkane wax samples suggests that time-temperature indicators employing the alkane wax may behave unpredictably, with one indicator in a batch responding differently from the next, which could be unsatisfactory for some commercial applications.

Figure 16:
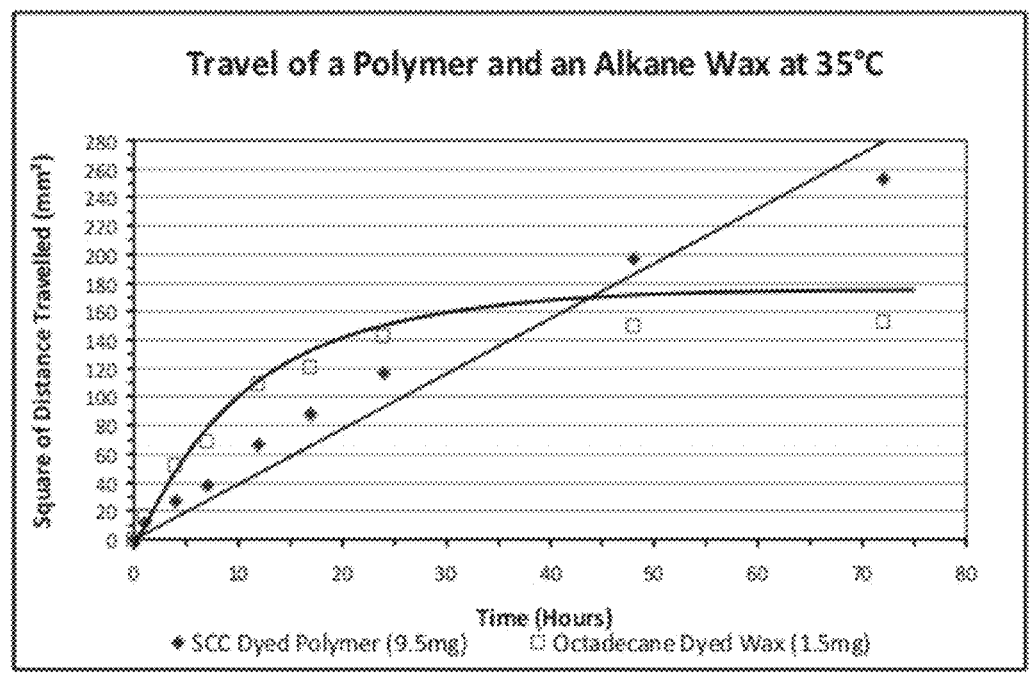
FIG. 16 shows a plot of the square of the distance traveled versus time at a fixed temperature for one of the synthetic polymeric materials for which temperature-viscosity curves are shown in FIG. 12 and an alkane wax.

Referring now to FIG. 16, data points for the polymer samples are shown with squares (labeled "SCC Dyed Polymer" in FIG. 16), and data points for the alkane wax samples are shown with diamonds (labeled "Octadecane Dyed Wax" in FIG. 16). These data show that the alkane wax response follows a curve which is briefly approximately linear, early in the test period, and then bends away to the right, as the progress of the alkane wax slows. Finally, the alkane wax exhibits only gradual progress after about twenty-five hours and appears to approach a plateau. The changing relationship of the square of the distance traveled by the alkane wax with time suggests that correlating the geometric displacement of the alkane wax with cumulative time-temperature exposure may be difficult. Also, the slow advance of the alkane wax sample in the later stages of the test period may be difficult to record and measure in a low cost commercial embodiment of time-temperature indicator. Thus, incremental heat exposure after about twenty-five hours may not be accurately monitored.

These results and the variability from one alkane wax sample to the next discussed, in connection with Table 5, suggest the alkane wax may not be a useful indicator material in a cumulative time-temperature indicator.

In contrast, the response of the polymer samples is close to linear throughout the test period, with a consistent advance along the wick continuing after twenty-five hours. The response of the polymer samples appears to be progressive, measurable and consistent throughout the test period. These data suggest the polymer tested could be suitable for monitoring cumulative time-temperature exposure.

Figure 17A:
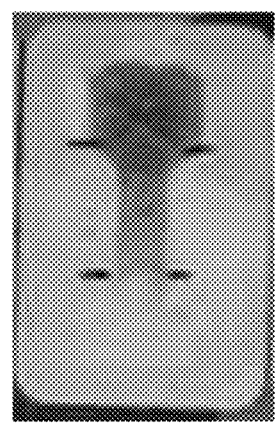
FIG. 17A shows an image of a test time-temperature indicator employing the alkane wax used to generate one of the plots shown in FIG. 16.
Figure 17B:
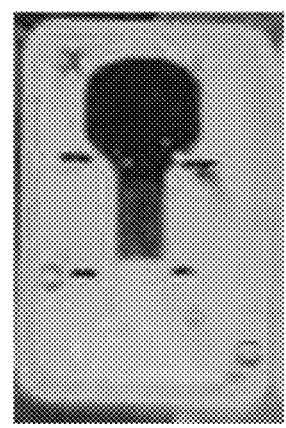
FIG. 17B shows an image of a test time-temperature indicator employing the synthetic polymeric material used to generate the other plot shown in FIG. 16.

FIGS. 17A and 17B, respectively, show images of one of the dyed alkane wax indicator samples and of one of the dyed polymer indicator samples that are employed in Experiment 5, after exposure at 35° C. for 12 hr. In each sample shown, the indicator material can be seen to have advanced materially to a point where the front of the advancing material is in the vicinity of a benchmark, which is indicated by two dark dashes in the lower portion of each image.

The dyed alkane wax in FIG. 17A can be seen to have poor optical density and low contrast with the white wick and surrounding laminate of the indicator sample. In comparison, the dyed polymer in FIG. 17B has good optical density and contrasts well with the white wick and surrounding laminate of the indicator sample. Also, the dyed alkane wax exhibits an ill-defined U-shaped front. This front is typically a pink/red color in the Experiment 5 indicator samples, rather than red. In contrast, the dyed polymer exhibits a uniformly shaped, well defined, straight front which is typically an intense red in the Experiment 5 indicator samples.

The weak color and ill-defined front exhibited by the alkane wax suggests the alkane wax would give a poor signal in a time-temperature indicator. In contrast, the strong color and well-defined front exhibited by the dyed polymer suggest the dyed polymer will give a good signal in a time-temperature indicator, providing a distinct change in appearance, or signal, as the polymer emerges into a viewing window having a white background.

One useful application for a time-temperature indicator embodiment of the invention is to monitor the ambient temperature exposure of a drug that is relatively stable at refrigerated temperatures but deteriorates rapidly at room temperature and even more rapidly at higher temperatures. A side-chain crystallizable polymer such as one of the polymers of Examples 11, 12 or 13 can be employed as an indicator material or indicator material component for such an indicator, if desired.

Embodiments of time-temperature indicator according to the invention can have any configuration of time-temperature indicator described herein, and/or shown in the accompanying drawings, and can employ any one of the indicator materials described herein, together with any one of the transport members described herein, or shown in the accompanying drawings, as being useful in the practice of the invention.

Time-temperature indicator 11 and other time-temperature indicator embodiments of the invention can have a low profile and can be configured as a label, as shown in the drawings, or alternatively as a tag, a card, or other device suitable for association with a host product or host product packaging or container, as an insert or attachment or in another suitable manner. Such a time-temperature indicator can be a flexible label that can conform with a flat surface, or a curved, or otherwise shaped, surface. The time-temperature indicator can be formed of a supple, or pliable material, or have a supple or pliable substrate, for example, a synthetic polymeric film material. The substrate can include a pressure-sensitive adhesive for attaching the time-temperature indicator to a host product, a package, or container, which adhesive can be protected with a liner before attachment, if desired. Such time-temperature indicator embodiments of the invention can be mass-produced using sheet or roll stock materials, if desired.

Time-temperature indicator embodiments of the invention, in some cases, can have other physical profiles and/or can be relatively substantial in size, if desired, to serve a particular purpose, if the time-temperature indicator can provide adequate thermal communication with the ambient environment, and, possibly, a host product, to serve its intended purpose.

Time-temperature indicators according to the invention can be employed in a radio frequency identification ("RFID") tag with a visual environmental condition monitor such as is described and claimed in U.S. Pat. No. 7,209,042 to Martin et al.

Time-temperature indicators according to the invention also, if desired, can be employed in combination with a freeze indicator or a threshold indicator or both a freeze indicator and a threshold indicator, for example, as is described in U.S. Pat. No. 7,490,575 to Taylor et al.

Time-temperature indicators according to the invention can usefully be employed to assure the freshness of a wide range of temperature-sensitive or perishable host products, including temperature-sensitive health care products, for example, vaccines, drugs, medicaments, pharmaceuticals, medical devices and prophylactics; biological materials for industrial or therapeutic uses, for example cultures, organs and other human or animal body parts, blood and perishable blood products; diagnostic devices, kits and ingredients containing perishables; batteries and battery containing devices and appliances; foodstuffs including fresh or prepared fish, meats, dairy products, fruits, vegetables, baked goods, desserts and the like; food service products, including restaurant service foods; gourmet products; perishable animal foods; cut and uncut flowers; cosmetics, for example cosmetics containing biologicals or other labile ingredients; beauty aids; perishable munitions and ordnance; and perishable decontamination packs and products.

A time-temperature indicator according to the invention can be associated with a host product in any desired manner for example by adhering, tying, looping, stapling or otherwise affixing the time-temperature indicator or a label incorporating the time-temperature indicator to a desired host product, either directly to a host product or to a package containing the host product or to a package, carton, box or other container containing a multiplicity of host product items.

In summary, the invention can provide a temperature-activatable time-temperature indicator that can monitor, and/or record, cumulative time-temperature exposure above a threshold temperature, over an extended time period and/or a wide temperature range, quantitatively, and with reasonable accuracy, without requiring special storage conditions before use, or requiring external intervention for activation.

The monitoring and/or recording can be effected by geometric displacement of an indicator material that melts at, or near, the threshold temperature to flow, on or through, a transport member, generating an optically detectable signal. The time-temperature indicator can be configured to have heat response characteristics suitable for monitoring a variety of host products having a variety of heat response characteristics, by variation of a number of parameters. For example, any one of the mechanical arrangement of the time-temperature indicator, the chemical nature of the indicator material, and the molecular weight of a polymeric indicator material can be varied to correlate a cumulative time-temperature exposure value, at the expiry of which the time-temperature indicator can generate an end point signal, with a likely condition of the host product to be monitored.

Disclosures Incorporated. Unless it is incorporated elsewhere herein, the entire disclosure of each United States patent and patent application, of each foreign or international patent publication, of any other publication and of any unpublished patent application identified in this specification is hereby incorporated by reference herein, in its entirety, for all purposes. Should there appear to be conflict between the meaning of a term employed in the description of the invention in this specification and the usage in material incorporated by reference from another document, the meaning of the term as used herein is intended to prevail. Any reference to an "invention" in any incorporated disclosure is to be understood to refer to the invention described, or claimed, in the disclosure incorporated.

About the Description. The detailed description herein is to be read in light of and in combination with the preceding background and invention summary descriptions wherein partial or complete information regarding the best mode of practicing the invention, or regarding modifications, alternatives or useful embodiments of the invention may also be set forth or suggested, as will be apparent to one skilled in the art.

The terms "include," "have," "has," and "contain," and their various grammatical forms, are to be understood as being open-ended and not to exclude additional, unrecited elements or method steps.

Throughout the description, where compositions, instruments, devices, apparatus, systems, or processes are described as having, including, or comprising specific components or elements, or in the case of processes, specific steps, it is contemplated that compositions, instruments, devices, apparatus, systems, or processes according to the present invention can also consist essentially of, or consist of, the recited components, elements or steps.

In the application, where an element or component is said to be included in and/or selected from a list or group of recited elements or components, it should be understood that the element or component can be any one of the recited elements or components, or can be selected from a group or list consisting of two or more of the recited elements or components. Also, the invention includes the employment in combination of an element or component recited herein in one group or list of elements or components, with an element or component recited herein in another group or list of elements or components, unless a skilled person would understand the combination to be impractical, in light of this disclosure.

The use of the singular herein is intended to include the plural (and vice versa) unless the context indicates otherwise.

Also, where the term "about", "approximate", "approximately", or a similar term, is used before a quantitative value, the specific quantitative value itself is to be understood to be included, and to be explicitly recited, unless the description specifically states otherwise.

With regard to processes, it is to be understood that the order of steps or order for performing certain actions is immaterial so long as the described process remains operable. Moreover, two or more steps or actions may be conducted simultaneously, unless the context indicates otherwise. In addition, any proportions recited herein are to be understood to be proportions by weight, based upon the weight of the relevant composition, unless the context indicates otherwise.

The description of the background of the invention herein may include insights, discoveries, understandings or disclosures, or associations together of disclosures, that were not known in the relevant art prior to the present invention but which are provided by the invention. Some such contributions of the invention may have been specifically pointed out as being attributable to the invention, and other such contributions of the invention will be apparent from their context. Merely because a document may have been cited in this application, no admission is made that the field of the document, which may be quite different from that of the invention, is analogous to the field or fields of the present invention.

The description of the invention is to be understood as including combinations of the various elements of the invention, and of their disclosed or suggested alternatives, including alternatives disclosed, implied or suggested in any one or more of the various methods, products, compositions, systems, apparatus, instruments, aspects, embodiments, examples described in the specification or drawings, if any, and to include any other written or illustrated combination or grouping of elements of the invention or of the possible practice of the invention, except for groups or combinations of elements that are incompatible with, or contrary to the purposes of the invention, as will be or become apparent to a person of ordinary skill.

Scope of the Invention. The present invention includes the examples and embodiments described herein and other specific forms of the invention that embody the spirit or essential characteristics of the invention or of the respective described examples or embodiments. The foregoing examples and embodiments are in all respects intended to be illustrative of the invention described herein. It is to be understood that many and various modifications of the invention, or of an example or embodiment of the invention described herein will be apparent to those of ordinary skill in the relevant art, or may become apparent as the art develops, in the light of the foregoing description. Such modifications are contemplated as being within the spirit and scope of the invention or inventions disclosed herein.

The invention claimed is:

1. A temperature-activatable time-temperature indicator comprising an optically readable, thermally sensitive indicator element, the indicator element
    being thermally inactive below a base temperature and being thermally responsive at or above an activation temperature to record irreversibly with respect to time cumulative ambient temperature exposure of the time-temperature indicator to temperatures above the activation temperature, the activation temperature being in the range of from about −10° C. to about 50° C. and being equal to or greater than the base temperature, and
    including an optically detectable indicator material,
    wherein the indicator material comprises a synthetic polymeric material having a molecular weight of at least about 2,000 Da and a viscosity at, or near, the activation temperature, when the indicator material is liquid, of at least about 50 cP, and
    wherein the time-temperature indicator is configured to be associated with a host product to monitor the historical exposure of the host product to ambient temperatures.

2. A time-temperature indicator according to claim 1 wherein the indicator element has a thermal response algorithm related to a time-temperature quality characteristic of the intended host product.

3. A time-temperature indicator according to claim 1 wherein the thermal response of the indicator element to temperature comprises an optically readable geometric displacement of the indicator material, the indicator material displacement correlating quantitatively with the cumulative ambient temperature exposure of the time-temperature indicator above the activation temperature.

4. A time-temperature indicator according to claim 3 wherein the indicator material is a solid at or below the base temperature and is a viscous liquid at or above the activation temperature.

5. A time-temperature indicator according to claim 4 wherein the indicator element comprises a transport member supporting the indicator material and the indicator material displacement is a displacement with respect to the transport member.

6. A time-temperature indicator according to claim 5 wherein the transport member extends to an optical reading location and the indicator material displacement comprises optically detectable displacement of the indicator material along the transport member.

7. A time-temperature indicator according to claim 6 wherein the time-temperature indicator has an optical reading direction for reading the state of the time-temperature indicator and comprises a reservoir of the indicator material and a mask to conceal the reservoir in the optical reading direction, the transport member extending away from the reservoir.

8. A time-temperature indicator according to claim 7 wherein the indicator material displacement along the transport member, in response to exposure to an ambient temperature in the range of from about the activation temperature to about 5° C. above the activation temperature, proceeds at a rate selected from the group consisting of: a rate of from about 0.005 mm/hr to about 5 mm/hr; a rate of from about 0.05 mm/hr to about 1 mm/hr; and a rate of from about 0.1 mm/hr to about 0.5 mm/hr.

9. A time-temperature indicator according to claim 5 wherein the indicator material displacement along the transport member, at a temperature at least about 10° C. above the activation temperature, proceeds at a rate selected from the group consisting of: a rate of at least about 0.5 mm/hr; a rate of at least about 2 mm/hr; a rate of at least about 5 mm/hr; and a rate of at least about 10 mm/hr.

10. A time-temperature indicator according to claim 5 wherein the transport member is absorbent and the indicator material is absorbable by the transport member.

11. A time-temperature indicator according to claim 10 wherein the indicator element comprises multiple reservoirs of solid indicator material, and the transport member is configured to provide multiple equal length indicator material flow paths, extending one from each reservoir to a common viewing location permitting viewing of displaced indicator material, wherein, at or above the activation temperature, indicator material can flow from multiple ones of the reservoirs to the viewing window to provide an end point indication at the viewing window.

12. A time-temperature indicator according to claim 10 wherein the indicator element comprises a ring of indicator material, the transport member comprises a disc-shaped wick, the ring of indicator material extending around the perimeter of the disc-shaped wick, at or near the outer peripheral edge of wick, and the time-temperature indicator comprises a viewing window disposed approximately centrally of the ring of indicator material wherein the indicator material, when liquid, can flow inwardly of the ring towards the viewing window.

13. A time-temperature indicator according to claim 10 wherein the time-temperature indicator comprises a viewing surface and the indicator element is configured for indicator material, when liquid, to flow to the viewing surface in a direction transverse to the viewing surface and to emerge at the viewing surface from the transverse direction.

14. A time-temperature indicator according to claim 13 wherein the transport member and the reservoir are configured with cross-sectional shapes and cross-sectional dimensions permitting the indicator material, when liquid, to flow transversely to the viewing surface towards the entire area of the viewing surface.

15. A time-temperature indicator according to claim 10 wherein the indicator element displays a flow of indicator material, when liquid, along a linear flow path in response to an appropriate temperature exposure over time, and the time-temperature indicator comprises multiple markings spaced along the flow path, to indicate the progress of the indicator material along the flow path.

16. A time-temperature indicator according to claim 15 wherein the indicator material comprises a transport material and an optically distinctive material.

17. A time-temperature indicator according to claim 16 wherein the optically distinctive material is selected from the group consisting of colorants, dyes, pigments, fluorescent materials, optical phase modifying materials, liquid crystals, infrared-reflecting materials, ultraviolet-reflecting materials, -infrared-absorbing materials, ultraviolet-absorbing materials, optically refractive materials, optically diffractive materials, holographic materials and mixtures of two or more of the foregoing optically distinct materials.

18. A time-temperature indicator according to claim 17 wherein the indicator material viscosity is in a range selected from the group consisting of: at least about 100 cP, not greater than about 500 cP, not greater than about 5,000 cP, not greater than about 100,000 cP; from about 50 cP to about 5,000 cP; from about 100 cP to about 500 cP.

19. A time-temperature indicator according to claim 18 wherein the indicator material has a viscosity activation energy above 10 kcal/mol.

20. A time-temperature indicator according to claim 19 wherein the synthetic polymeric material has a molecular weight in a range selected from the group consisting of: at least about 5,000 Da, from about 2,000 Da to about 50,000 Da, from about 5,000 Da to about 20,000 Da, from about 5,000 Da, to about 100,000 Da, not greater than about 50,000 Da, not greater than about 100,000 Da, and not greater than about 300,000 Da.

21. A time-temperature indicator according to claim 20 wherein the synthetic polymeric material has a melting temperature range selected from the group consisting of: a range of not more than about 30° C.; a range of not more than about 10° C.; a range of not more than about 5° C.; and a range of not more than about 2° C.

22. A time-temperature indicator according to claim 16 wherein the synthetic polymeric material has side chain crystallinity.

23. A time-temperature indicator according to claim 22 wherein the synthetic polymeric material comprises a methacrylate polymer, a methacrylate copolymer, an acrylate polymer, or an acrylate copolymer of a monomer unit comprising a crystallizable linear aliphatic side chain having at least 10 carbon atoms.

24. A time-temperature indicator according to claim 22 wherein the synthetic polymeric material is selected from the group consisting of a poly(alkylmethacrylate), poly(hexadecylmethacrylate), poly(octadecylmethacrylate), a poly(alkylacrylate), poly(hexadecylacrylate), poly(dodecylacrylate), a copolymer of hexadecylacrylate and octadecylmethacrylate, poly(hexyl-co-dodecylacrylate), a copolymer of tetradecylacrylate and octadecylacrylate, a copolymer of hexadecylmethacrylate and octadecylmethacrylate, and a copolymer of tetradecylacrylate and hexadecylacrylate.

25. A time-temperature indicator according to claim 22 wherein the synthetic polymeric material comprises a polymer including a chain of interconnected monomer units each monomer unit having the formula:

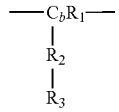

wherein:
$C_b$ is a backbone carbon atom;
$R_1$ is hydrogen, or a substituted, or unsubstituted, hydrocarbon group having up to six carbon atoms;
$R_2$ is a spacer unit and is optional;
$R_3$ comprises a crystallizable group; and
$R_2$ and $R_3$ together constitute a side chain of the monomer unit.

26. A time-temperature indicator according to claim 25 wherein the spacer unit $R_2$, if present, is selected from the group consisting of O, $CH_2$, (CO), O(CO), $NR_4$ wherein $R_4$ is hydrogen or lower alkyl having from one to six carbon atoms, an ester group, an amide group, a hydrocarbon group, a phenyl group, and an ether group, and wherein the ester group, amide group, hydrocarbon group, phenyl group, or ether group has up to six carbon atoms.

27. A time-temperature indicator according to claim 26 wherein $R_3$ is a crystallizable group selected from the group consisting of: an aliphatic group having from 4 carbon atoms to about 30 carbon atoms; an aromatic group having from 6 carbon atoms to about 30 carbon atoms; a linear aliphatic group having at least 10 carbon atoms; a combination of at least one aliphatic group and at least one aromatic group, the combination having from 7 carbon atoms to about 30 carbon atoms; a $C_{14}$-$C_{22}$ acrylate; a $C_{14}$-$C_{22}$ methacrylate; an acrylamide; a methacrylamide; a vinyl ether; a vinyl ester; a fluorinated aliphatic group having at least 6 carbon atoms; and a p-alkyl styrene group wherein the alkyl group has from about 8 carbon atoms to about 24 carbon atoms.

28. A time-temperature indicator according to claim 27 wherein the backbone carbon atoms $C_b$ are connected directly to each other, or one or more pairs of adjacent backbone carbon atoms $C_b$ are interconnected through an intervening oxygen atom, or through an intervening carbon atom.

29. A time-temperature indicator according to claim 28 wherein the polymer is selected from the group consisting of a fluoroacrylate polymer, a vinyl ester polymer, an acrylamide polymer, a substituted acrylamide polymer, a maleimide polymer, an alkylvinylether polymer, a polyalkylethylene oxide polymer, a polyamino acids, a polyisocyanate, a polyurethane, a polyester, a polyether, and a p-alkylstyrene polymer.

30. A time-temperature indicator according to claim 1 wherein the activation temperature is in a range selected from the group consisting of: from about 5° C. to about 50° C.; from about 10° C. to about 40° C.; and from about 20° C. to about 30° C.

31. A time-temperature indicator according to claim 30 wherein the activation temperature is in a range of from about −10° C. to about 5° C. or from about −3° C. to about 5° C.

32. A time-temperature indicator according to claim 31 wherein the activation temperature exceeds the base temperature by a temperature in a range selected from the group consisting of: from about 1° C. to about 50° C.; from about 3° C. to about 20° C.; and from about 5° C. to about 15° C.

33. A time-temperature indicator according to claim 32 wherein the base temperature is in a range selected from the group consisting of: from about −5° C. to about 40° C.; from about 0° C. to about 30° C.; and from about 10° C. to about 20° C.

34. A time-temperature indicator according to claim 33 configured to record irreversibly a cumulative temperature exposure of at least 1.5 degree-days at a temperature, or temperatures, above the activation temperature, and to exhibit an end point at the end of the cumulative temperature exposure, wherein the end is not optically present prior to the elapse of the cumulative temperature exposure.

35. A time-temperature indicator according to claim 1 wherein the indicator material is hydrophobic.

36. A time-temperature indicator according to claim 1 wherein the viscosity of the indicator material decreases with increasing temperature, optionally, throughout a temperature range of from 35° C. to 60° C.

37. A temperature-activatable time-temperature indicator configured to be associated with a host product to monitor the historical exposure of the host product to ambient temperatures, the time-temperature indicator comprising:
an optically readable, thermally sensitive indicator element, the indicator element being thermally inactive at or below a base temperature, being thermally responsive at or above an activation temperature, the activation temperature being in the range of from about −10° C. to about 50° C. and being equal to or greater than the base temperature, and comprising an optically detectable indicator material, the indicator material being in a solid state at or below the base temperature, being in a liquid state at or above the activation temperature and comprising a synthetic polymeric material having side chain crystallinity and having a molecular weight of at least about 2,000 Da, the indicator element further comprising a dye dissolved in the synthetic polymeric material; and the time-temperature indicator further comprising
a transport member supporting the indicator material;
wherein the indicator material contrasts optically with the transport member and the indicator response comprises displacement of the indicator material with respect to the transport member.

38. A temperature-activatable time-temperature indicator for monitoring past exposure of a host product to ambient temperatures, the time-temperature indicator comprising an optically readable, thermally sensitive indicator element, the indicator element being inactive below a base temperature and being thermally responsive at or above an activation temperature to record irreversibly with respect to time cumulative ambient temperature exposure above the activation temperature, the activation temperature being in the range of from about −10° C. to about 50° C. and being equal to or greater than the base temperature wherein the indicator element comprises a side-chain crystallizable polymer having a melting temperature equal to or greater than the activation temperature of the time-temperature indicator and having a molecular weight of at least about 2,000 Da and wherein liquid-flow related movement of the side-chain crystallizable polymer when liquid can be read optically.

39. A time-temperature indicator according to claim 38 wherein the side-chain crystallizable polymer has a weight average molecular weight in a range selected from the group consisting of: from about 1,000 Da to about 300,000 Da; from about 1,500 Da to about 100,000 Da; and from about 2,000 Da to about 50,000 Da.

40. A time-temperature indicator according to claim 38 wherein the indicator material has a viscosity at the activation temperature in a range selected from the group consisting of: at least 100 cP, from about 50 cP to about 5,000 cP; and from about 100 cP to about 500 cP.

41. A time-temperature indicator according to claim 40 comprising a transport member to support the indicator material wherein the indicator material can flow across, along, or through, the transport member, in response to exposure to an ambient temperature in the range of from about the activation temperature to about 5° C. above the activation temperature, at a rate selected from the group consisting of: a rate of from about 0.005 mm/hr to about 5 mm/hr; a rate of from about 0.05 mm/hr to about 1 mm/hr; and a rate of from about 0.1 mm/hr to about 0.5 mm/hr with respect to the transport member.

42. A time-temperature indicator according to claim 41 comprising a substrate supporting the indicator element, the time-temperature indicator being configured as a label, a flexible label, a tag, a package insert, or a package component, and being suitable for association with the host product.

\* \* \* \* \*